US012565575B2

(12) United States Patent
Estour et al.

(10) Patent No.: US 12,565,575 B2

(45) Date of Patent: Mar. 3, 2026

(54) CYCLODEXTRIN DIMERS AND THEIR USES THEREOF AS CHEMICAL SCAVENGERS

(71) Applicants: Centre national de la recherche scientifique, Paris (FR); INSTITUT NATIONAL DES SCIENCES APPLIQUEES DE ROUEN NORMANDIE, Saint-Etienne-du-Rouvray (FR); Université de Rouen-Normandie, Mont Saint-Aignan (FR); Etat Français représenté par le Délégué Général pour l'Armement, Paris (FR)

(72) Inventors: François Estour, Rouen (FR); Michaël Bosco, Belfort (FR)

(73) Assignees: Centre national de la recherche scientifique, Paris (FR); INSTITUT NATIONAL DES SCIENCES APPLIQUEES DE ROUEN NORMANDIE, Saint-Etienne-du-Rouvray (FR); Université de Rouen-Normandie, Mont Saint-Aignan (FR); Etat Français représenté par le Délégué Général pour l'Armement, Paris (FR)

( * ) Notice: Subject to any disclaimer, the term of this patent is extended or adjusted under 35 U.S.C. 154(b) by 1031 days.

(21) Appl. No.: 17/641,294

(22) PCT Filed: Sep. 9, 2020

(86) PCT No.: PCT/EP2020/075204

§ 371 (c)(1),
(2) Date: Mar. 8, 2022

(87) PCT Pub. No.: WO2021/048208

PCT Pub. Date: Mar. 18, 2021

(65) Prior Publication Data

US 2022/0372252 A1 Nov. 24, 2022

(30) Foreign Application Priority Data

Sep. 11, 2019 (FR) ....................................... 1910022

(51) Int. Cl.
*C08L 5/16* (2006.01)
*C11D 3/22* (2006.01)

(52) U.S. Cl.
CPC ................ *C08L 5/16* (2013.01); *C11D 3/222* (2013.01)

(58) Field of Classification Search
CPC ..... C08L 5/16; C11D 3/222; C11D 3/222514; C08B 37/0012
See application file for complete search history.

(56) References Cited

PUBLICATIONS

Aime et al., Published Nov. 20, 2008, Organic & Biomolecular Chemistry, vol. 7, pp. 370-379 (Year: 2008).*

Bettinetti et al., Published May 5, 2006, Journal of Pharmaceutical and Biomedical Analysis, vol. 41, Issue 4, pp. 1205-1211 (Year: 2006).*

(Continued)

*Primary Examiner* — Renee Claytor
*Assistant Examiner* — Jaret J Crews
(74) *Attorney, Agent, or Firm* — WCF IP

(57) ABSTRACT

This invention concerns a compound having the following formula (1):

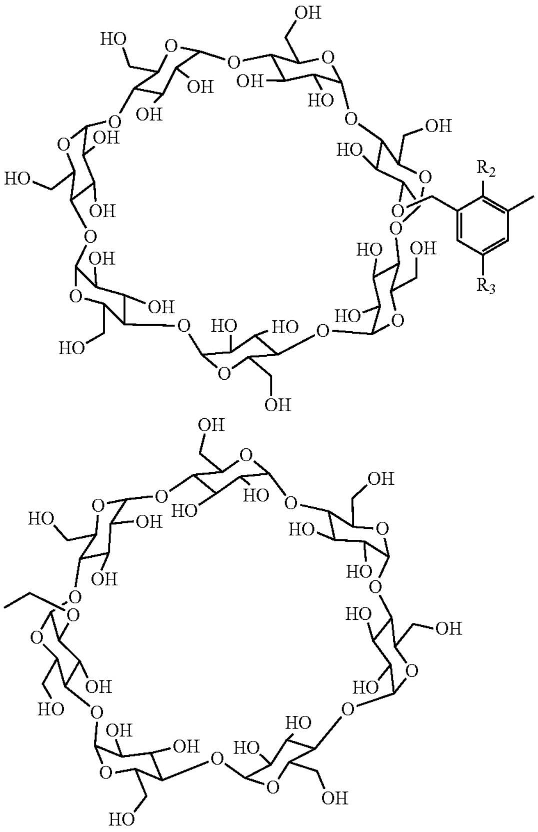

wherein either $R_1$ is a —Y-Nu group and $R_2$ is H, or $R_1$ is H and $R_2$ is a —Y-Nu group and H, wherein Y is, inter alia, —O—$(CH_2)_m$—, and m is 1, 2, or 3.

12 Claims, 7 Drawing Sheets

(56) References Cited

PUBLICATIONS

Muller et al., Published Jan. 15, 2011, Toxicology Letters, vol. 200, Issues 1-2, pp. 53-58 (Year: 2011).*

Ito Shogo et al., "Facile synthesis of novel cyclodextrin dimer capsules and their inclusion ability towards aromatic guests in a nonpolar solvent", Tetrahedron Letters,vol. 57, No. 47, Oct. 13, 2016 (Oct. 13, 2016), p. 5243-5245.

Shimaru Y et al, "Synthesis of Secondary Face-to-face Cyclodextrin Dimers Linked at Each 2-position", Tetrahedron Letters, Elsevier Ltd, Amsterdam, NL,vol. 38, No. 21, May 26, 1997 (May 26, 1997), p. 3743-3744.

Mamoru Kamiya et al, "Inclusion effects of cyclodextrins on photodegradation rates of parathion and paraoxon in aquatic medium", CHEMOSPHERE.,vol. 28, No. 11, Jun. 1, 1994 (Jun. 1, 1994), p. 1961-1966.

* cited by examiner

CYCLODEXTRIN DIMERS AND THEIR USES THEREOF AS CHEMICAL SCAVENGERS

This invention concerns novel cyclodextrin dimers, as well as methods for their preparation. It also concerns their uses, in particular as chemical scavengers.

Organophosphate neurotoxic agents are irreversible inhibitors of acetylcholinesterases, key enzymes in cholinergic neurotransmission. This family of compounds includes chemical weapons and the strongest pesticides. In the vent that organophosphate neurotoxins are spread in the atmosphere, taking the necessary measures to protect civilian or military personnel is a matter of the greatest urgency. Despite all the recent progress, chemical warfare defence still has undeniable gaps.

The possible use of chemical weapons during a conflict or terrorist attacks, as well as the possibility of a chemical disaster involving them, not to mention the risk of exposure to organophosphate pesticides, all raise the difficult issue of collectively managing this type of intoxication. Above all, it is necessary to avoid the spread of the toxic agent. Thus, the ideal solution would be to have a ready-to-use decontamination device suited to the needs of those who will use it, and in particular of the first responders, who must be equipped with fast, easy-to-use tools. As it currently stands, the available technology does not meet these criteria.

Taking into account the clear weaknesses of known-art decontamination devices, it is necessary to develop a new technology that is accessible to emergency services.

The use of chemical scavengers having a structure based on a cyclodextrin motif could provide, at a reasonable cost, a decontamination device sufficiently versatile to be used before the neurotoxic agent(s) in question have even been identified. Moreover, it could overcome the stability issues associated with bioscrubbers, as well as the risks of immunogenicity associated with their use. Additionally, in the context of developing a decontamination system that is applicable to various surfaces, these macrocyclic structures are easier to immobilise than proteins on a textile support.

Thus, the objective of this invention is to provide novel cyclodextrin derivative compounds that can be used as chemical scavengers.

Therefore, the objective of this invention is to provide novel cyclodextrin derivative compounds having elevated catalytic activity on chemical weapons, in particular soman, sarin, cyclosarin, or tabun.

As such, this invention concerns a compound having the following formula (I):

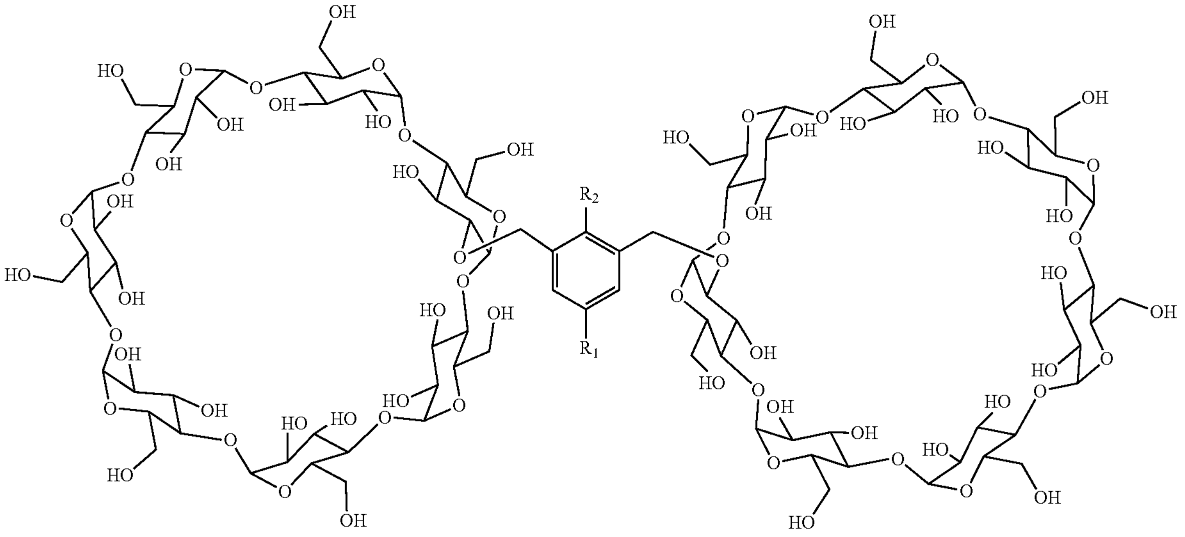

wherein either $R_1$ is a group of the formula —Y-Nu and $R_2$ is H; or $R_1$ is H and $R_2$ is a group of the formula —Y-Nu;

Y is a linker selected from the group consisting of the following groups:

—O—$(CH_2)_m$—, wherein m is 1, 2, or 3, preferably 1 or 3;

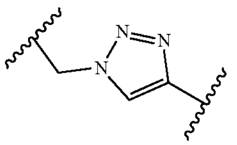 [SMILES: *Cn1cc(*)nn1]

—$(CH_2)_p$—NH—C(=O)—$(CH_2)_q$—, wherein p is 0 or 1 (preferably 1), and q is 0, 1, or 2 (preferably 0 or 2);

—CONH—$(CH_2)_r$—, wherein r is 1, 2, or 3, preferably 1 or 3;

—O—$(CH_2)_s$—C≡C—$(CH_2)_r$, wherein s is 1, 2, 3, 4, 5, or 6 (preferably 1), and t is 0, 1, 2, or 3 (preferably 0);

Nu has the following formula (II):

(II)

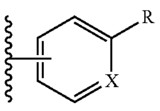

wherein either R is COOH, and X is C—I═O, or R is CH═N—OH, and X is N or $N^+$—($C_1$-$C_6$)alkyl, or R is CO—NH—OH, and X is N.

A preferred group of compounds according to the invention consists of compounds of the formula (I) as defined above, in which Y is a linker having the formula —O—$(CH_2)_m$—, and m is 1, 2, or 3, preferably 1 or 3.

Another preferred group of compounds according to the invention consists of compounds of the formula (I) as defined above, in which Y is a linker having the formula —$(CH_2)_p$—NH—C(═O)—$(CH_2)_q$—, p is 0 or 1 (preferably 1), and q is 0, 1, or 2 (preferably 0 or 2).

In one embodiment, in the formula (I), Nu has the formula (II) as defined above, wherein R is COOH and X is C—I═O.

Such a moiety exists in two forms that are in equilibrium in an aqueous solution, as shown schematically below:

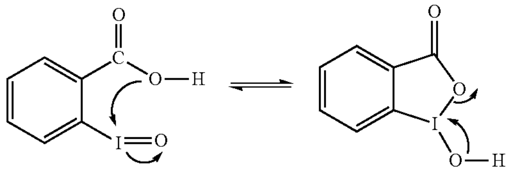 [SMILES: O=Ic1ccccc1C(=O)O ; O=C1OI(O)c2ccccc21]

Thus, this moiety may also be represented by the formula (I-a) below:

(I-a)

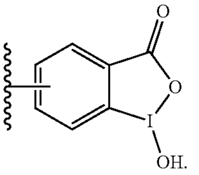

Preferably, compounds according to the invention have formula (I), as defined above, wherein Y is a linker having the formula —O—$(CH_2)_m$—, wherein m is 1, 2, or 3 (preferably 1 or 3), and Nu has the formula (II) as defined above, wherein R is COOH and X is C—I═O.

In one embodiment, in the formula (I), Nu has the formula (II) as defined above, wherein R is CO—NH—OH and X is N.

Preferred compounds according to the invention have the aforementioned formula (I), wherein Y is a linker having the formula —$(CH_2)_p$—NH—C(═O)—$(CH_2)_q$—, wherein p is 0 or 1 (preferably 1), and q is 0, 1, or 2 (preferably 0 or 2), and wherein Nu is of the formula (II) as defined above, wherein R is CO—NH—OH, and X is N.

In one embodiment, compounds according to the invention have formula (I), as defined above, wherein $R_1$ is H and $R_2$ is —Y-Nu, and Y is a linker having the formula —O—$(CH_2)_m$—, wherein m is 1, 2, or 3, preferably 1 or 3.

In one embodiment, the compounds according to the invention have the formula (I) as defined above, in which $R_1$ is —Y-Nu, Y is a linker having the formula —O—$(CH_2)_m$—, m is 1, 2, or 3, preferably 1 or 3, and $R_2$ is H.

In one embodiment, the compounds according to the invention have the formula (I) as defined above, in which $R_1$ is —Y-Nu, Y is a linker having the formula —$(CH_2)_p$—NH—C(═O)—$(CH_2)_q$—, p is 0 or 1 (preferably 1), q is 0, 1, or 2 (preferably 0 or 2), and $R_2$ is H.

Preferably, in the aforementioned formula (I), —Y-Nu corresponds to one of the following formulae (III), (IV) (V), or (VI):

(III)

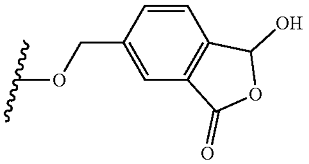

(IV)

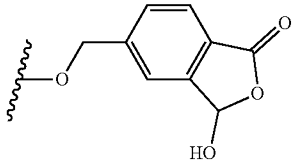

(V)

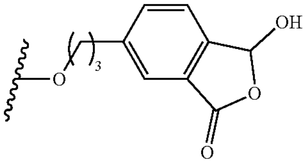

(VI)

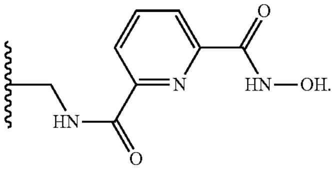

In one embodiment, in the formula (I) as defined above, $R_1$ is H, and $R_2$ has one of the formulae (III), (IV), or (V) as defined above.

In one embodiment, in the formula (I) as defined above, $R_1$ has one of the aforementioned formulae (III), (IV), or (V), and $R_2$ is H.

Preferably, the compounds according to the invention have the formula (I), wherein $R_1$ has the formula (VI), and $R_2$ is H.

This invention also concerns a method for preparing compounds of formula (I), the method comprising a step of reacting β-cyclodextrin with a reagent having the following formula (VII):

(VII)

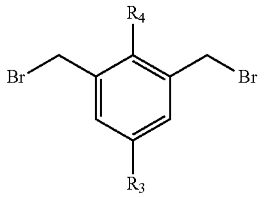

wherein either $R_4$ is H and $R_3$ is selected from the group consisting of —O—$CH_2$—CH═$CH_2$, —$CH_2$—$N_3$, and $COOR_5$, wherein $R_5$ is a ($C_1$-$C_6$)alkyl, trityl, or benzyl group;

either $R_4$ is H and $R_3$ is selected from the group consisting of —O—$CH_2$—CH═$CH_2$, —$CH_2$—$N_3$, and $COOR_5$, wherein $R_5$ is a ($C_1$-$C_6$)alkyl, trityl, or benzyl group, and $R_3$ is H;

to obtain a compound having the following formula (VIII):

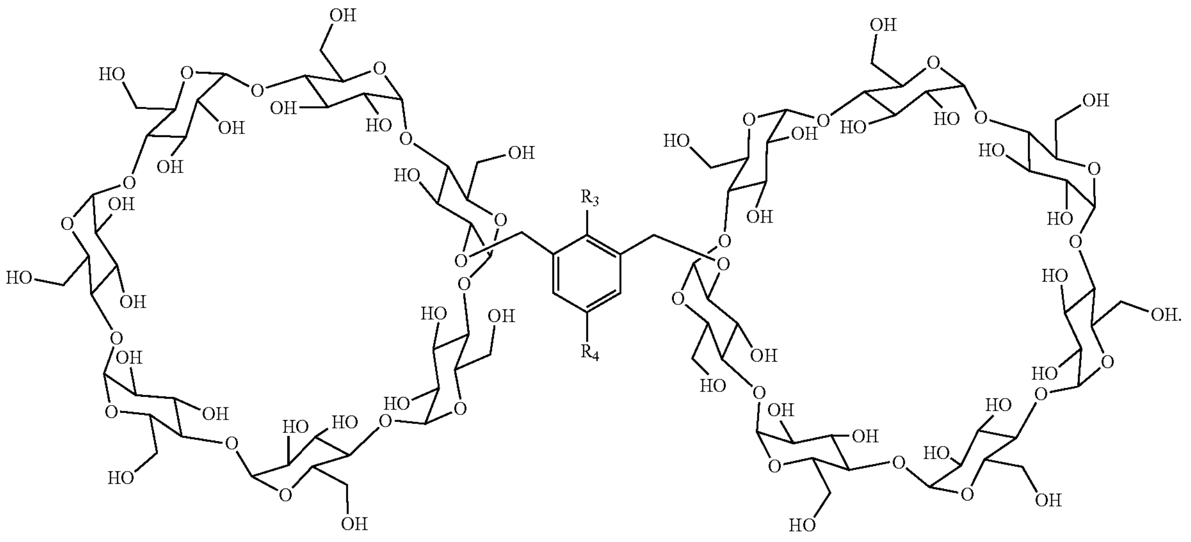

Preferred compounds of formula (VII) include the following compounds:

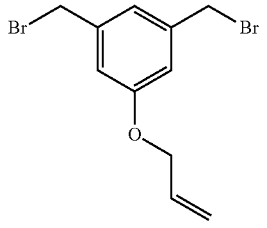

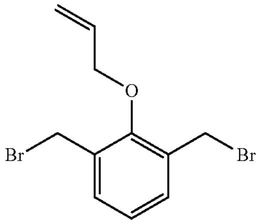

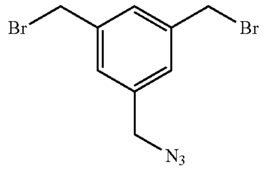

-continued

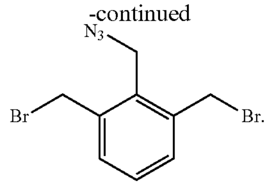

Preferably, the aforementioned step is carried out in a solvent selected from the group consisting of aprotic polar solvents such as dimethylformamide and dimethylsulphoxide, in particular dimethylsulphoxide (DMSO).

Preferably, the aforementioned step is carried out in the presence of a strong base such as lithium hydroxide, sodium hydroxide, potassium hydroxide, caesium hydroxide, and preferably sodium hydroxide.

Preferably, the aforementioned step is carried out at a temperature between 40° C. and 60° C., preferably between 50° C. and 55° C.

Preferably, the aforementioned step is carried out for a duration between 1 and 3 h, preferably between 1 h 45 min and 2 h 45 min.

In one embodiment, the aforementioned compound of formula (VIII) undergoes a step of protecting hydroxyl moieties, e.g. comprising reacting it with acetic anhydride ($Ac_2O$) in the presence of pyridine at room temperature (RT) for 4 days.

This step may also be carried out by means of a reaction with acetic anhydride ($Ac_2O$) in the presence of 4-(dimethylamino)pyridine (DMAP) or acetyl chloride (AcCl) in the presence of pyridine.

This step allows for the compounds of the aforementioned formula (VIII) into compounds of the formula (IX):
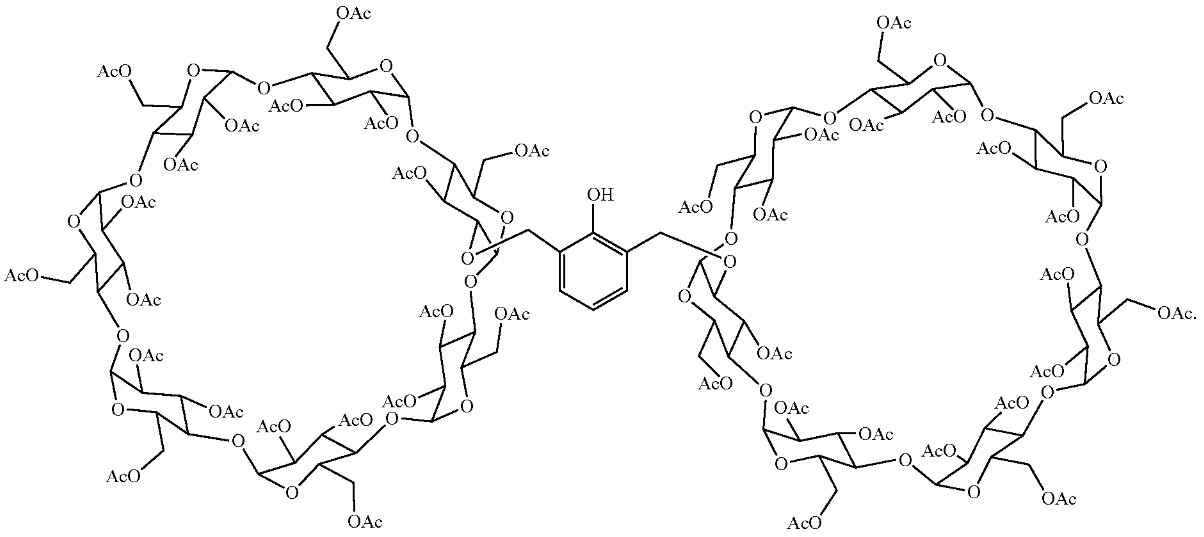
wherein $R_3$ and $R_4$ are as defined supra in formula (VIII).
Preferred compounds of formula (IX) include the following compounds:
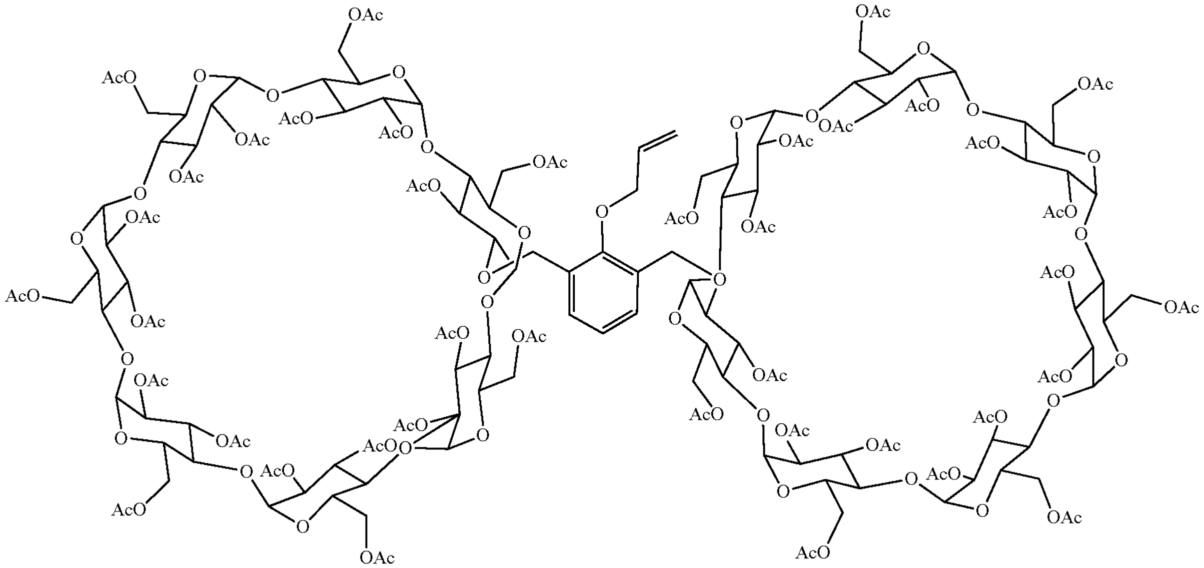

-continued

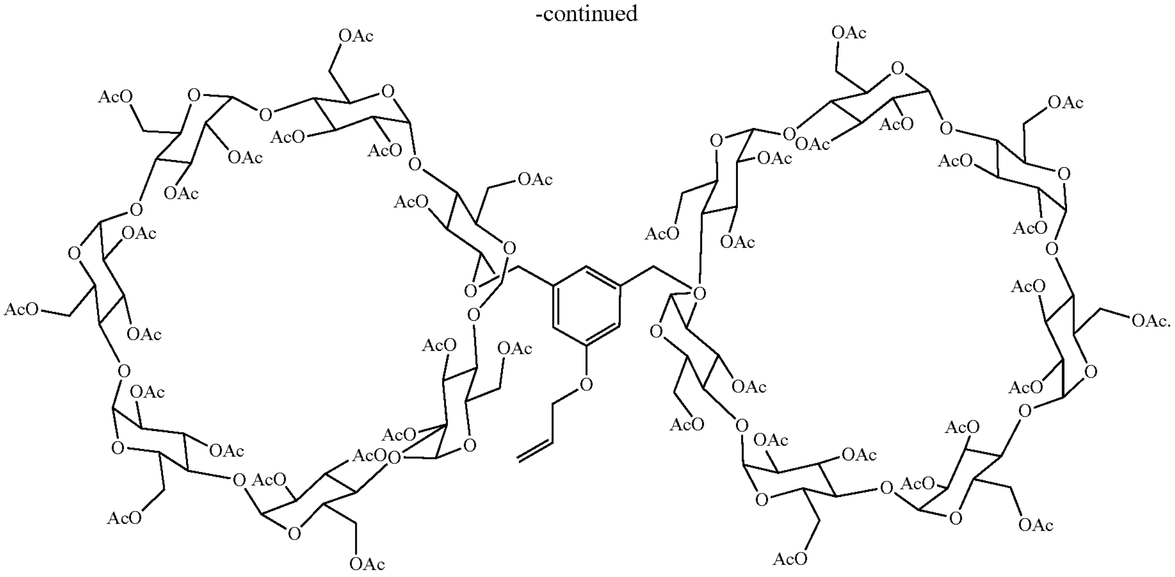

In one embodiment, the aforementioned compound of the formula (IX) undergoes a step of deprotecting the phenol moieties, e.g. comprising reacting it with 1,3-dimethylpyrimidine-2,4,6(1H,3H,5H)-trione and $Pd(PPh_3)_4$ in the presence of THE at reflux for 1 h.

This step allows for the compounds of the aforementioned formula (IX) into compounds of the formula (X):

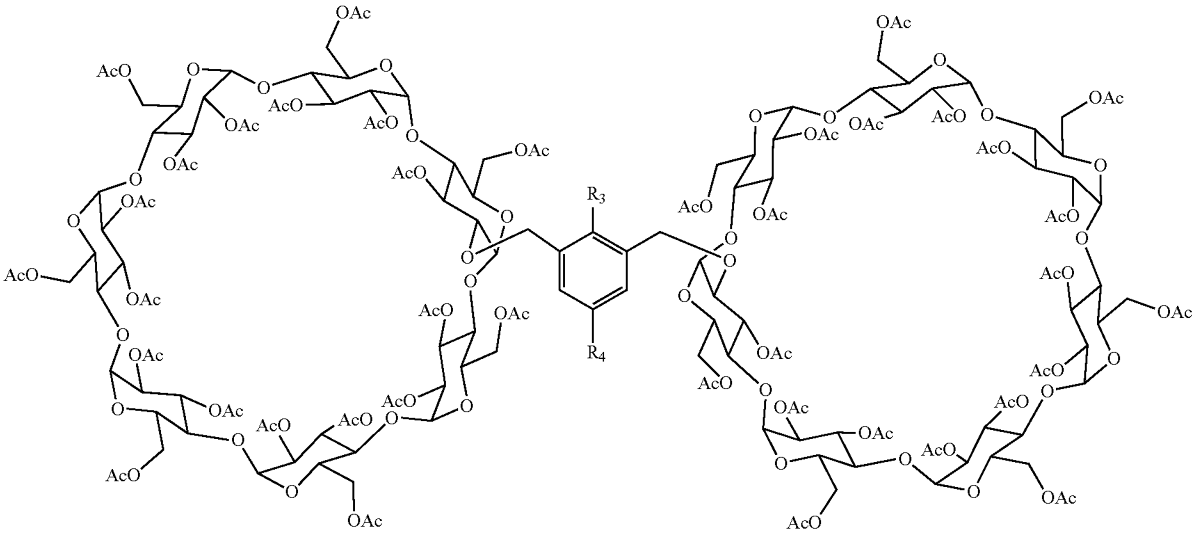

wherein either $R'_4$ is H and $R'_3$ is —OH;

or $R'_4$ is —OH and $R'_3$ is H.

This invention also concerns intermediates having the formula (X):

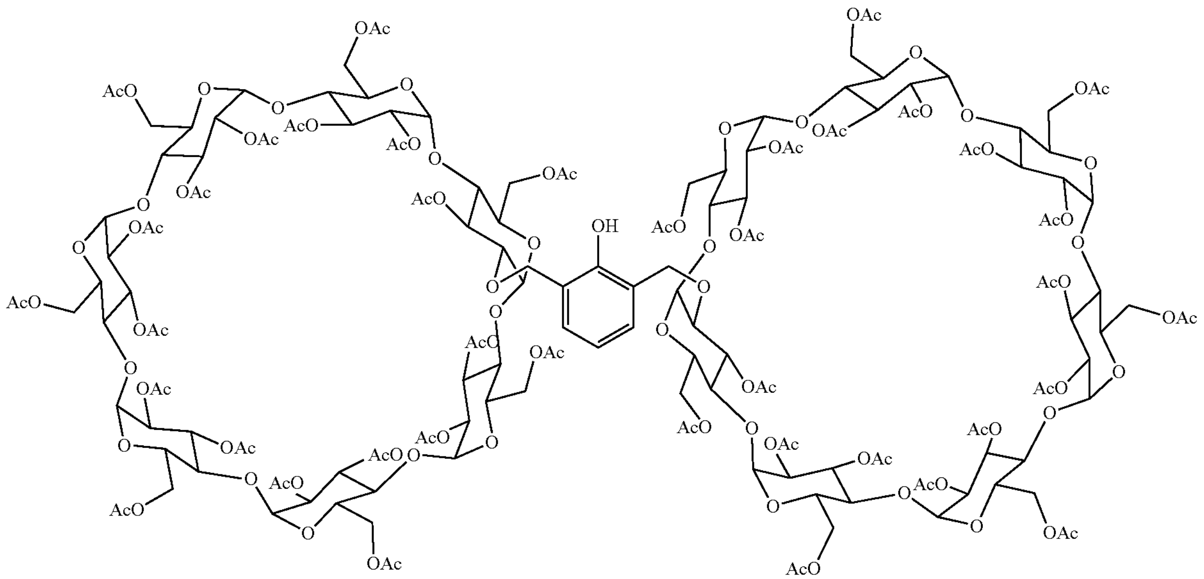

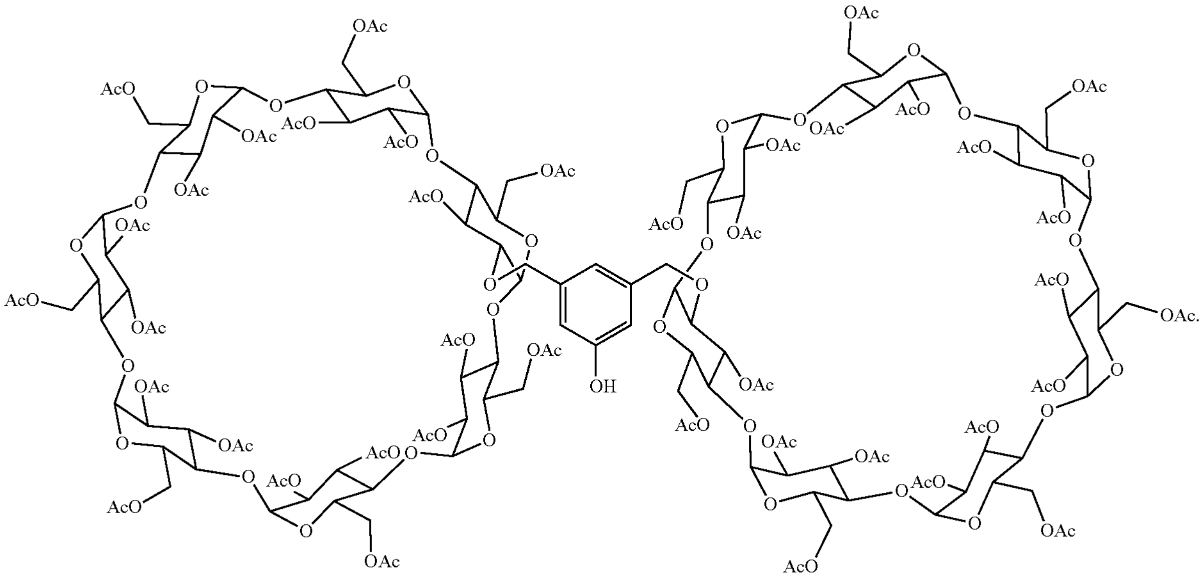

Intermediates of the formula (X) are used to prepare compounds of formula (I) according to the invention.

This invention also concerns a method for preparing compounds of the formula (I) as defined above, wherein $R_1$ is H and $R_2$ has one of the aforementioned formulae (III), (IV), or (V), based on the compound of the aforementioned formula (X-1).

Thus, this invention concerns a method for preparing compounds of formula (I) as defined above, wherein $R_1$ is H and $R_2$ has one of the aforementioned formulae (III), (IV), or (V), comprising reacting the compound of the aforementioned formula (X-1) with a reagent selected from methyl 5-bromomethyl-2-iodobenzoate, methyl 4-bromomethyl-2-iodobenzoate, or methyl 4-(3-bromopropyl)-2-iodobenzoate, to obtain a compound of the following formula (XI-1):

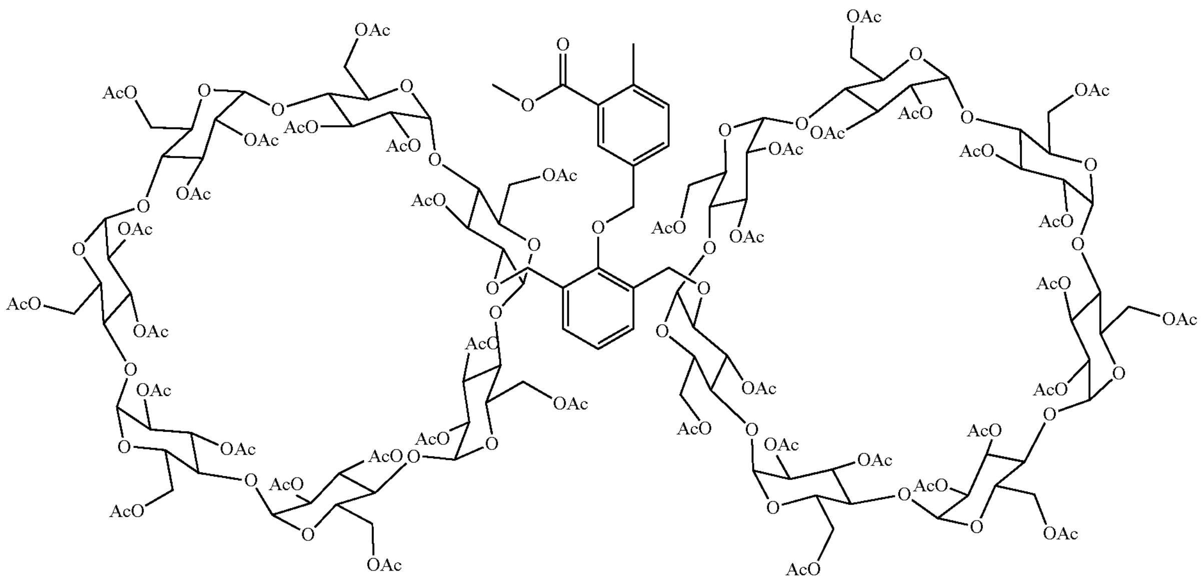
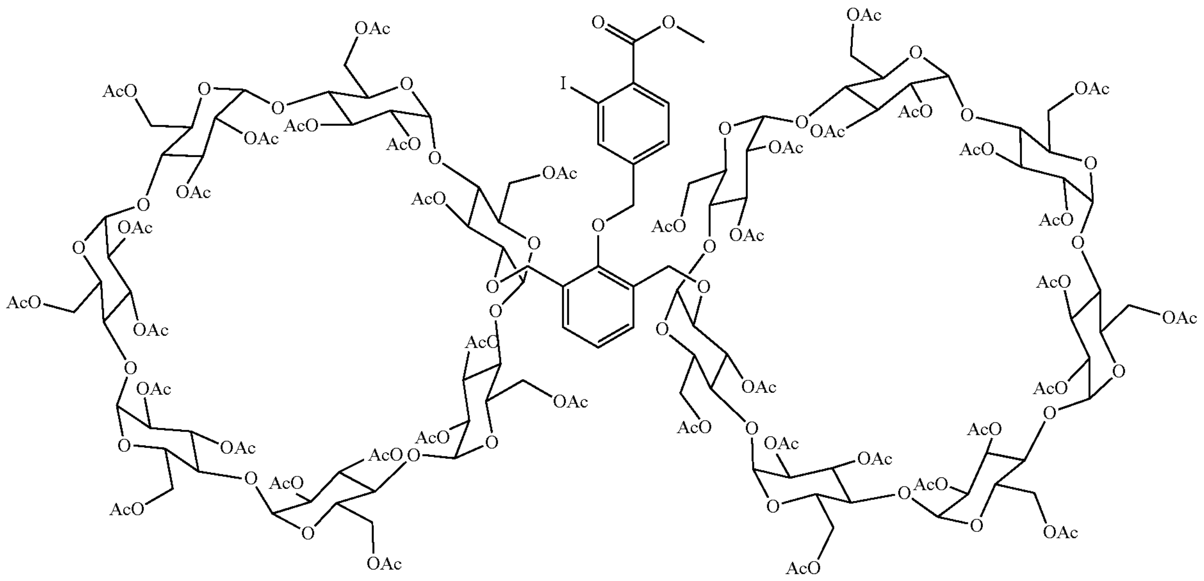

-continued

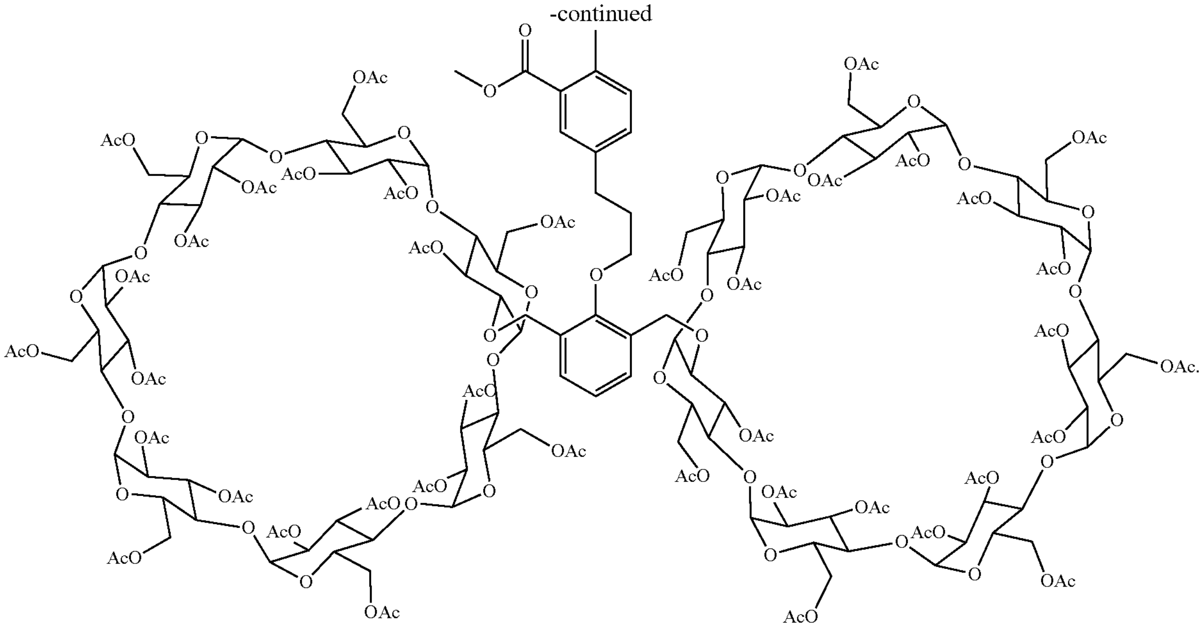

Preferably, this step is carried out in the presence of a base such as sodium carbonate, potassium carbonate, or caesium carbonate, and preferably potassium carbonate.

Preferably, this step is carried out in a solvent selected from the group consisting of polar aprotic solvents such as acetonitrile or acetone, and preferably acetone.

Preferably, this step is carried out at a temperature between 50° C. and 70° C., preferably between 55° C. and 60° C.

Preferably, this step is carried out for a duration between 14 and 18 h, preferably between 15 and 17 h.

In one embodiment, the compound of formula (XI-1) undergoes a step of deprotection in order to obtain the aforementioned compounds of formula (I), which have the following general sub-formula (XII-1):

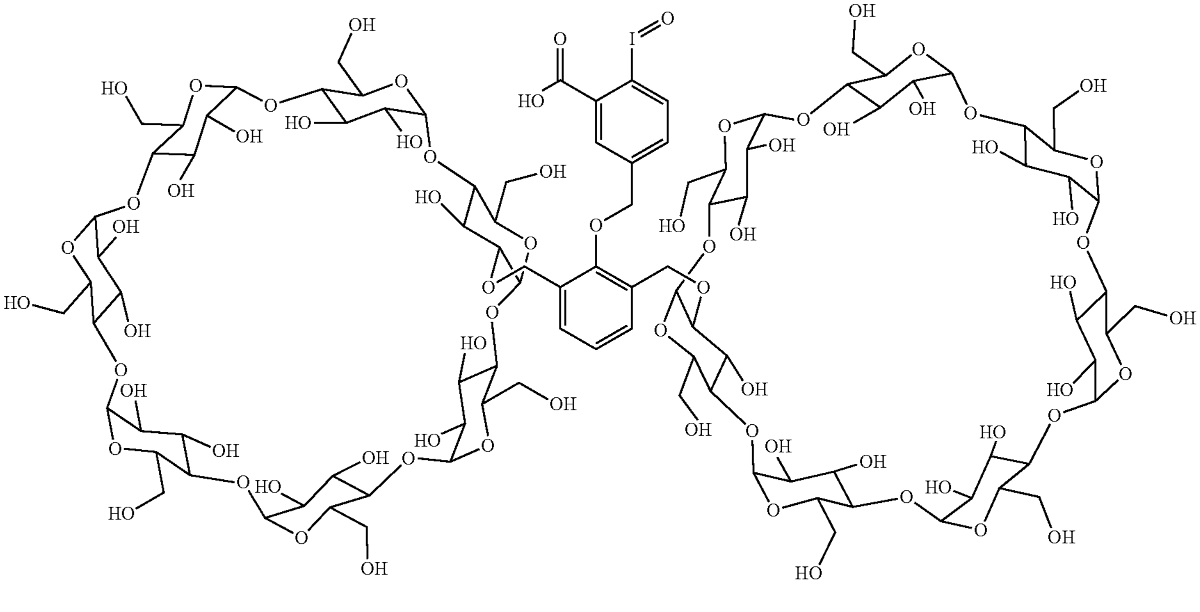

-continued

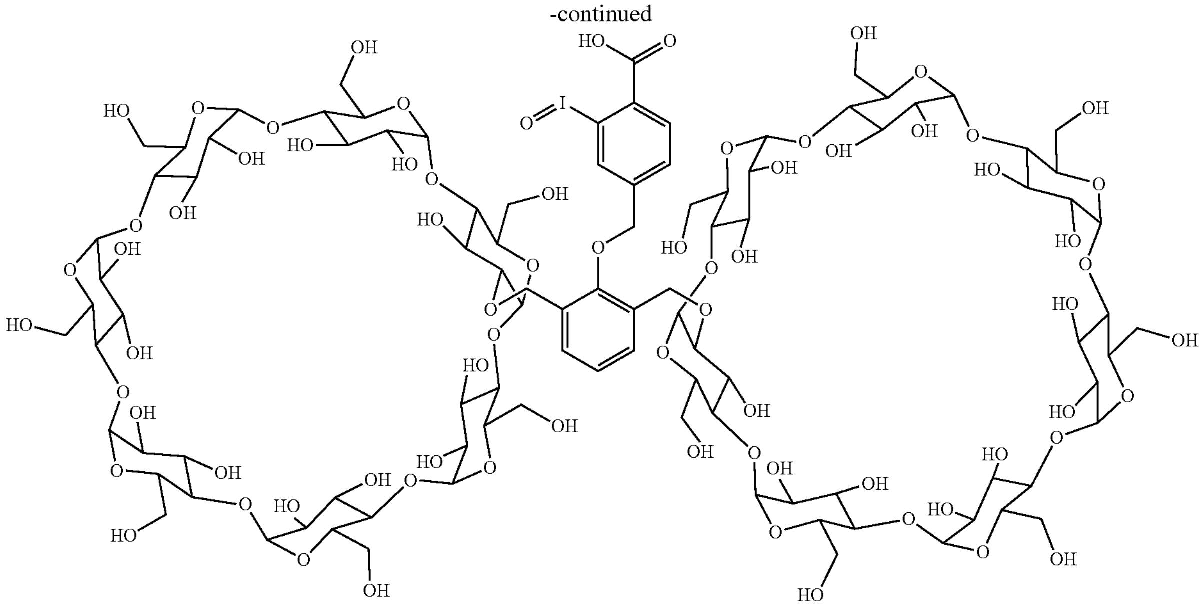

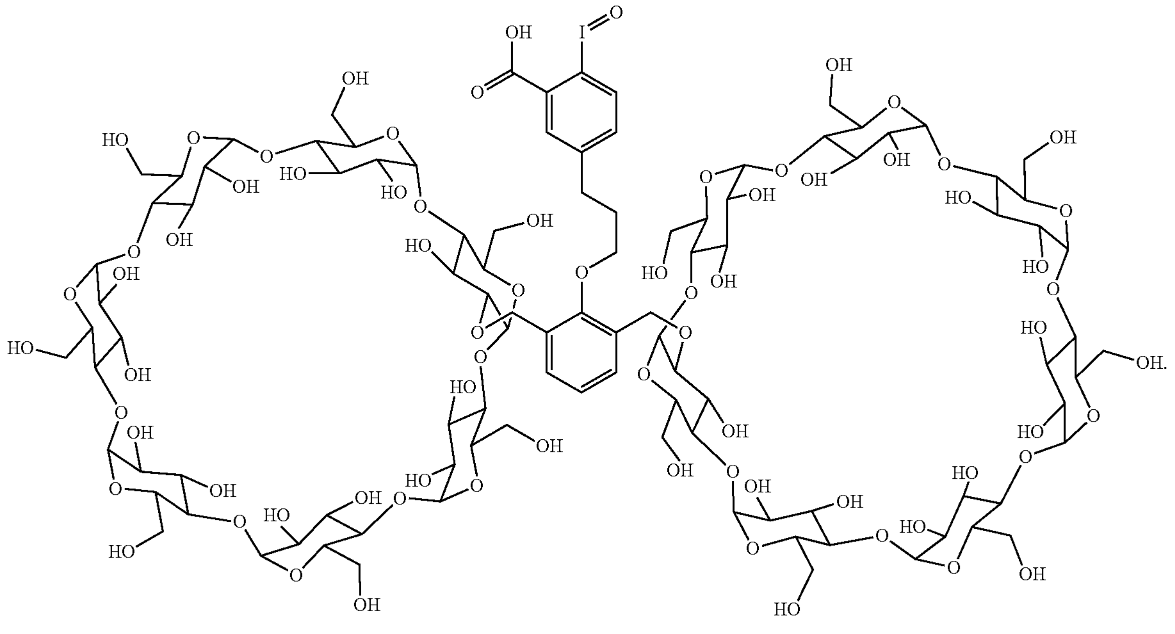

This invention also concerns a method for preparing compounds of the formula (I) as defined above, wherein $R_1$ has one of the aforementioned formulae (III), (IV), or (V), based on the compound of the aforementioned formula (X-2), and $R_2$ is H.

Thus, this invention concerns a method for preparing compounds of formula (I) as defined above, wherein $R_1$ has one of the aforementioned formulae (III), (IV), or (V), and $R_2$ is H, comprising reacting the compound of the aforementioned formula (X-2) with a reagent selected from methyl 5-bromomethyl-2-iodobenzoate, methyl 4-bromomethyl-2-iodobenzoate, or methyl 4-(3-bromopropyl)-2-iodobenzoate, to obtain a compound of the following formula (XI-2):

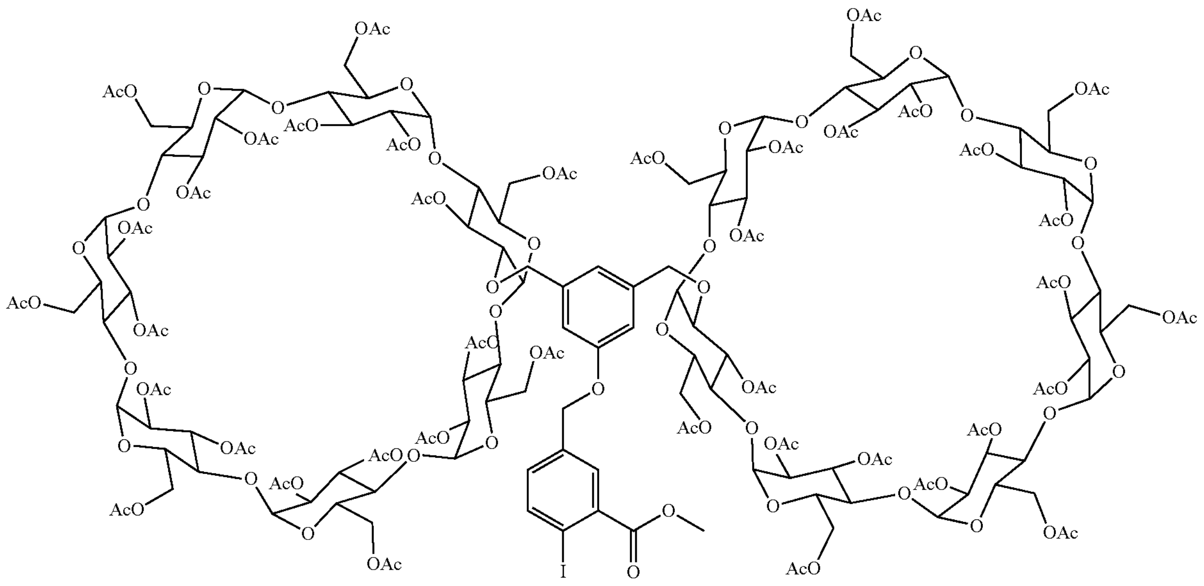
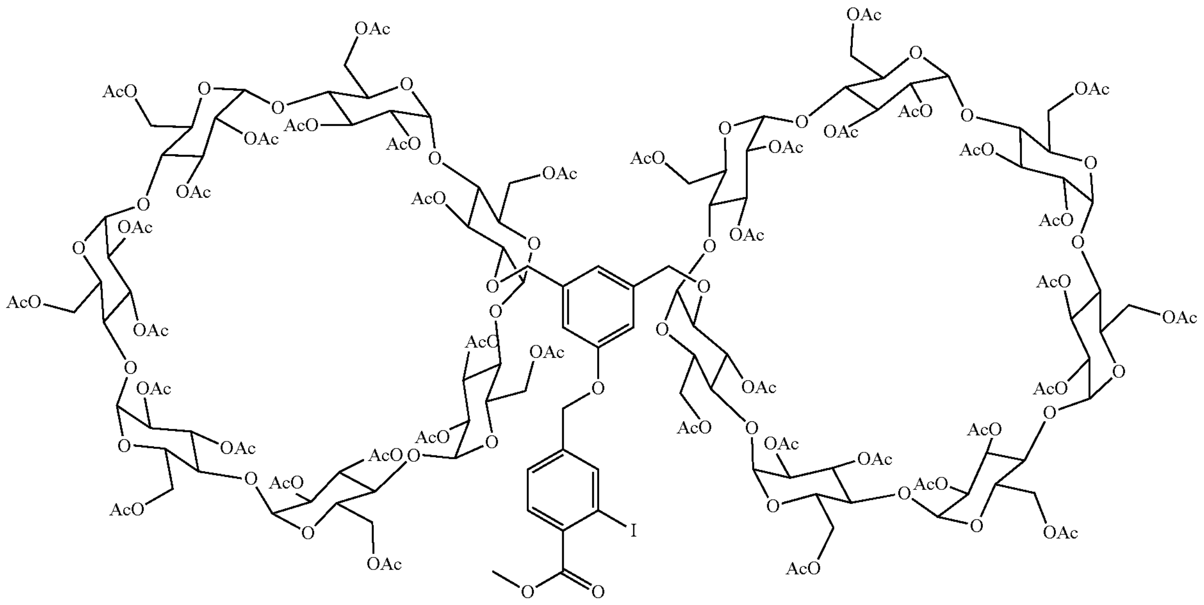

-continued

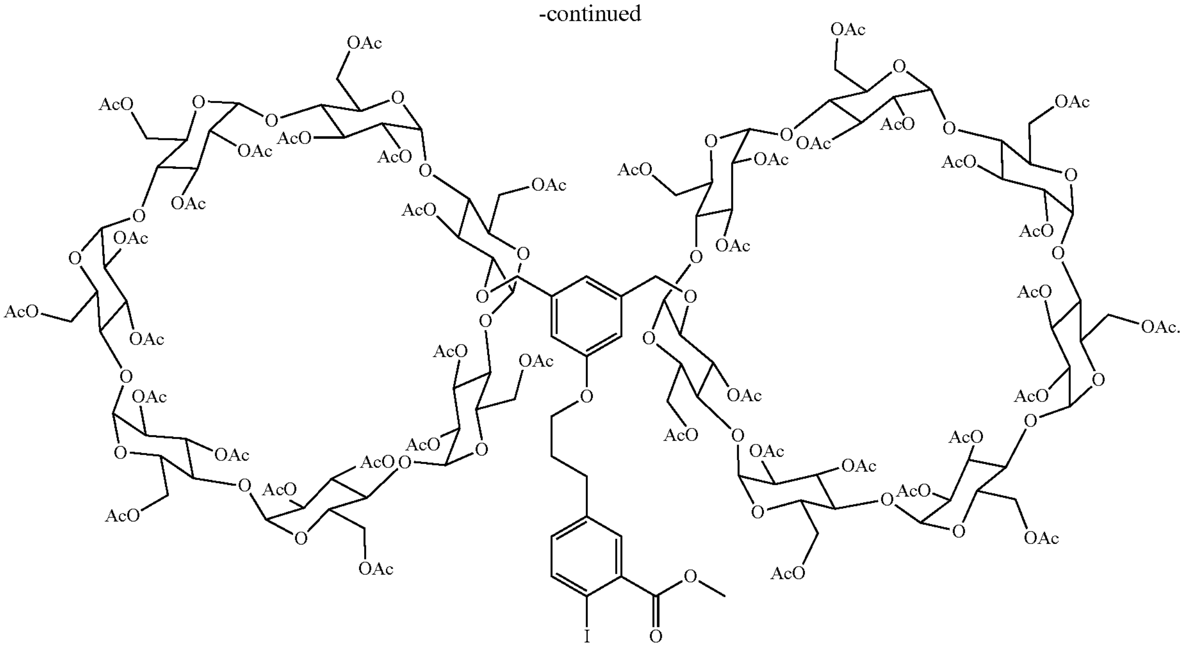

Preferably, this step is carried out in the presence of a base such as sodium carbonate, potassium carbonate, or caesium carbonate, and preferably potassium carbonate.

Preferably, this step is carried out in a solvent selected from the group consisting of polar aprotic solvents such as acetonitrile or acetone, and preferably acetone.

Preferably, this step is carried out at a temperature between 50° C. and 70° C., preferably between 55° C. and 60° C.

Preferably, this step is carried out for a duration between 14 and 18 h, preferably between 15 and 17 h.

In one embodiment, the compound of formula (XI-2) undergoes a step of deprotection in order to obtain the aforementioned compounds of formula (I), which have the following general sub-formula (XII-2):

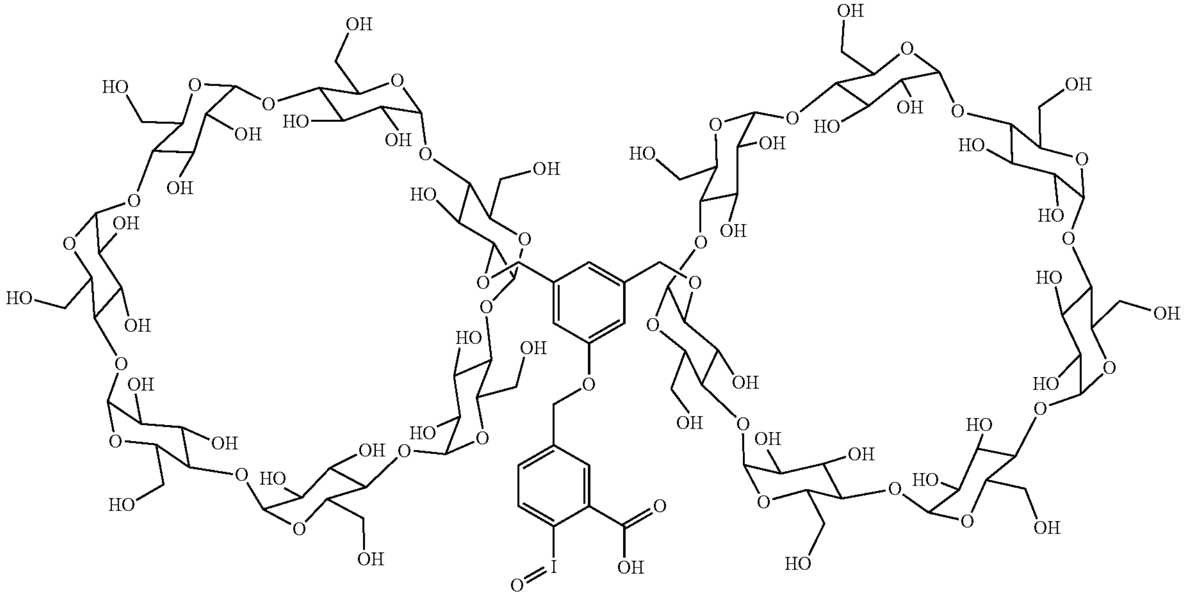

-continued

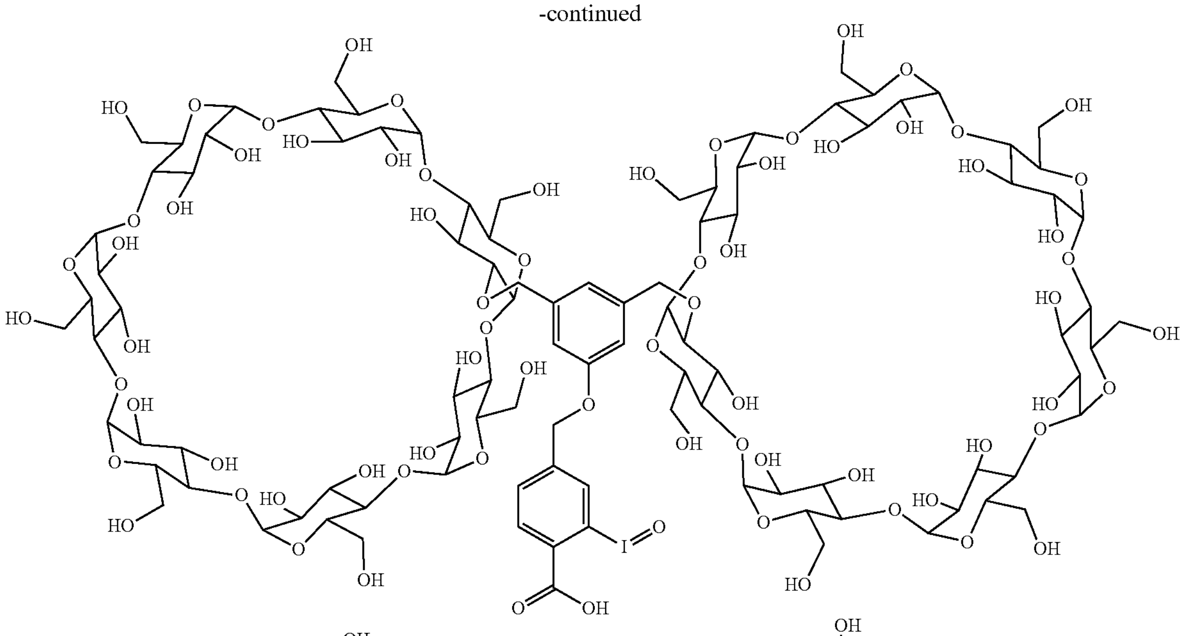

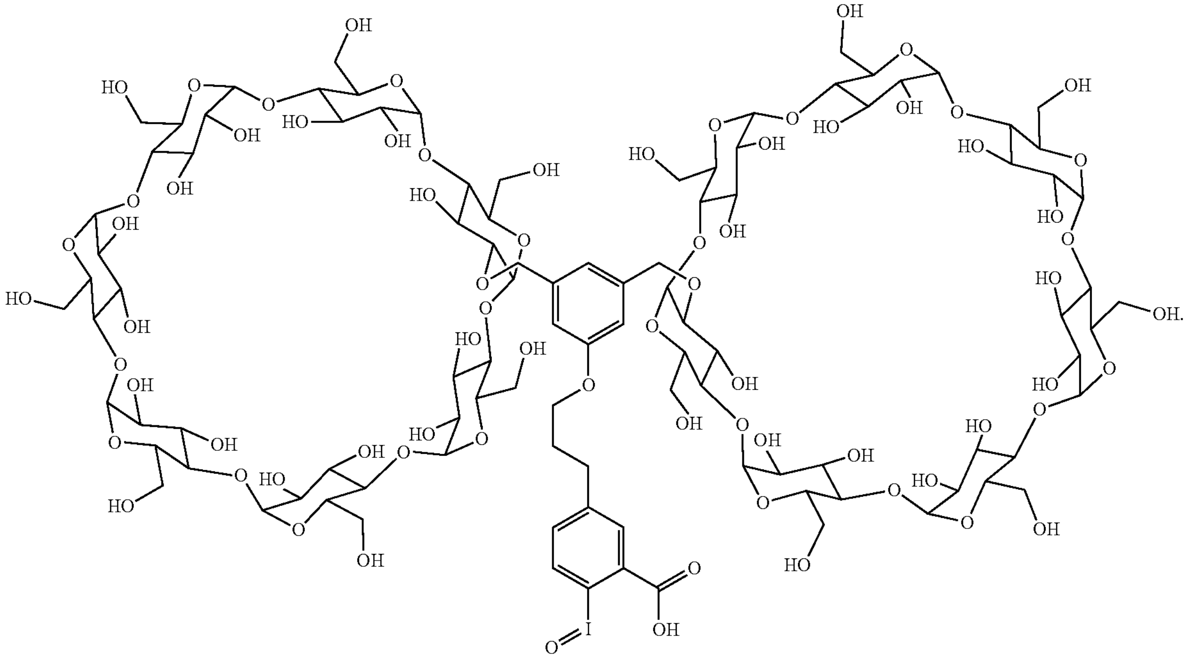

This invention also concerns the use of the compound of the formula (I) as defined above as a chemical scavenger in the context of decontaminating the surfaces of objects, skin, or mucous membranes contaminated by organophosphate neurotoxic agents.

This invention also concerns the use of the compound of formula (I) as defined above to reduce the inhibition of acetylcholinesterase activity by organophosphate neurotoxic agents.

Examples of organophosphate neurotoxic agents include soman, sarin, cyclosarin, or tabun, as well as 'novichok' agents.

This invention also concerns a method for modifying a textile surface by immobilising a compound of formula (I) as defined above on that surface, wherein the method comprises a step (a) of contacting the textile surface with the compound of formula (I) and with a coupling agent selected from the group consisting of 1,2,3,4-butanetetracarboxylic acid, succinic acid, citric acid, oxalic acid, and mixtures thereof, in the presence of a catalyst or crosslinking agent selected from the group consisting of cyanamide, N,N,N',N'-tetramethyl-O—(N-succinimidyl)uronium tetrafluoroborate, O—[N-succinimidyl)-1,1,3,3-tetramethyluronium tetrafluoroborate (TSTU), O-(5-norbornene-2,3-dicarboximido)-N,N,N',N'-tetramethyluronium tetrafluoroborate (TNTU), and 4-(4,6-dimethoxy-1,3,5-triazin-2-yl)-4-methylmorpholinium chloride, to obtain a textile surface on which the compound of formula (I) is immobilised.

In one embodiment, the coupling agent used in the method according to the invention is 1,2,3,4-butanetetracarboxylic acid.

In one embodiment, the catalyst used in the method according to the invention is cyanamide.

In one embodiment, the textile surface is a surface in which the textile is selected from the group consisting of natural or artificial cellulosic fibres. Examples of such textiles include cotton, linen, hemp, viscose, cellulose acetate, and polyvinyl alcohol.

In one embodiment, the method according to the invention comprises an additional step following the aforementioned step (a), i.e. a step (b) of rinsing the textile surface on which the dimer of formula (I) is immobilised.

EXAMPLES

Example 1: Synthesis of Various Cyclodextrin Dimers as Scavengers—Synthesis of 'SUD' Compounds (S1-3)

1-(Allyloxy)-3,5-bis(2'$^{A}$-{3'$^{A}$,6'$^{A}$-di-O-acetyl-hexakis-[2',3',6'-tri-O-acetyl]-cyclomalto-heptaosoxy}-methyl)-benzene S5

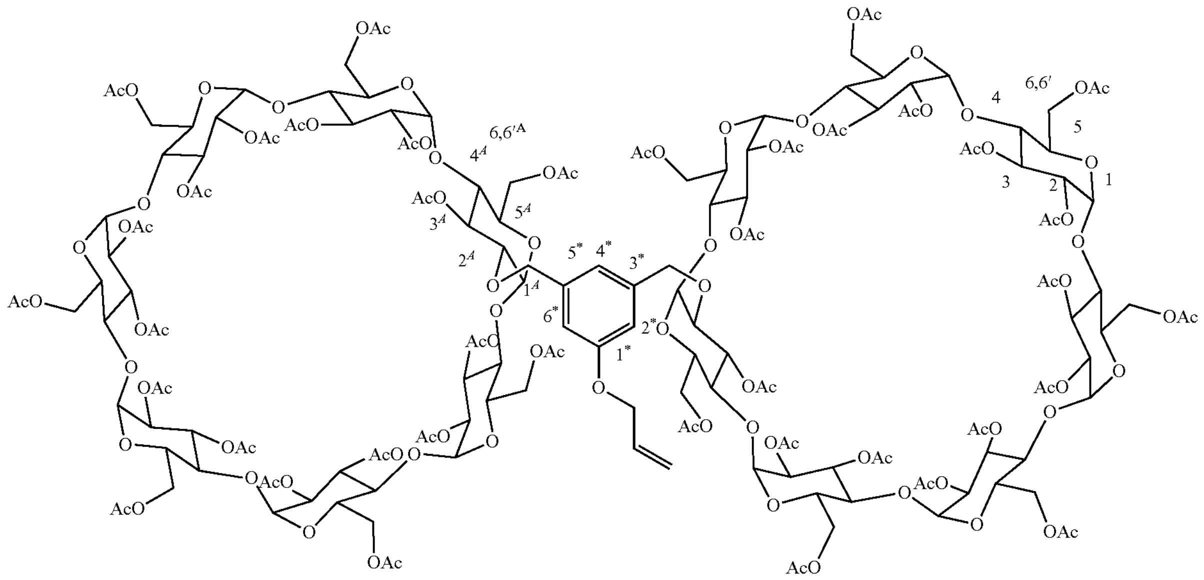

This invention also concerns a modified textile surface on which a cyclodextrin dimer of formula (I) as defined above is immobilised.

In one embodiment, the modified textile surface comprises a textile surface as defined above, on which a cyclodextrin dimer as defined above is immobilised.

This invention also concerns a modified textile surface obtained by the method as defined above.

Thus, this invention also concerns the use of a modified textile surface as defined above to trap and break down organophosphate neurotoxic agents.

This invention also concerns the use of a modified textile surface as defined above as a self-decontaminating textile.

Figure 1:
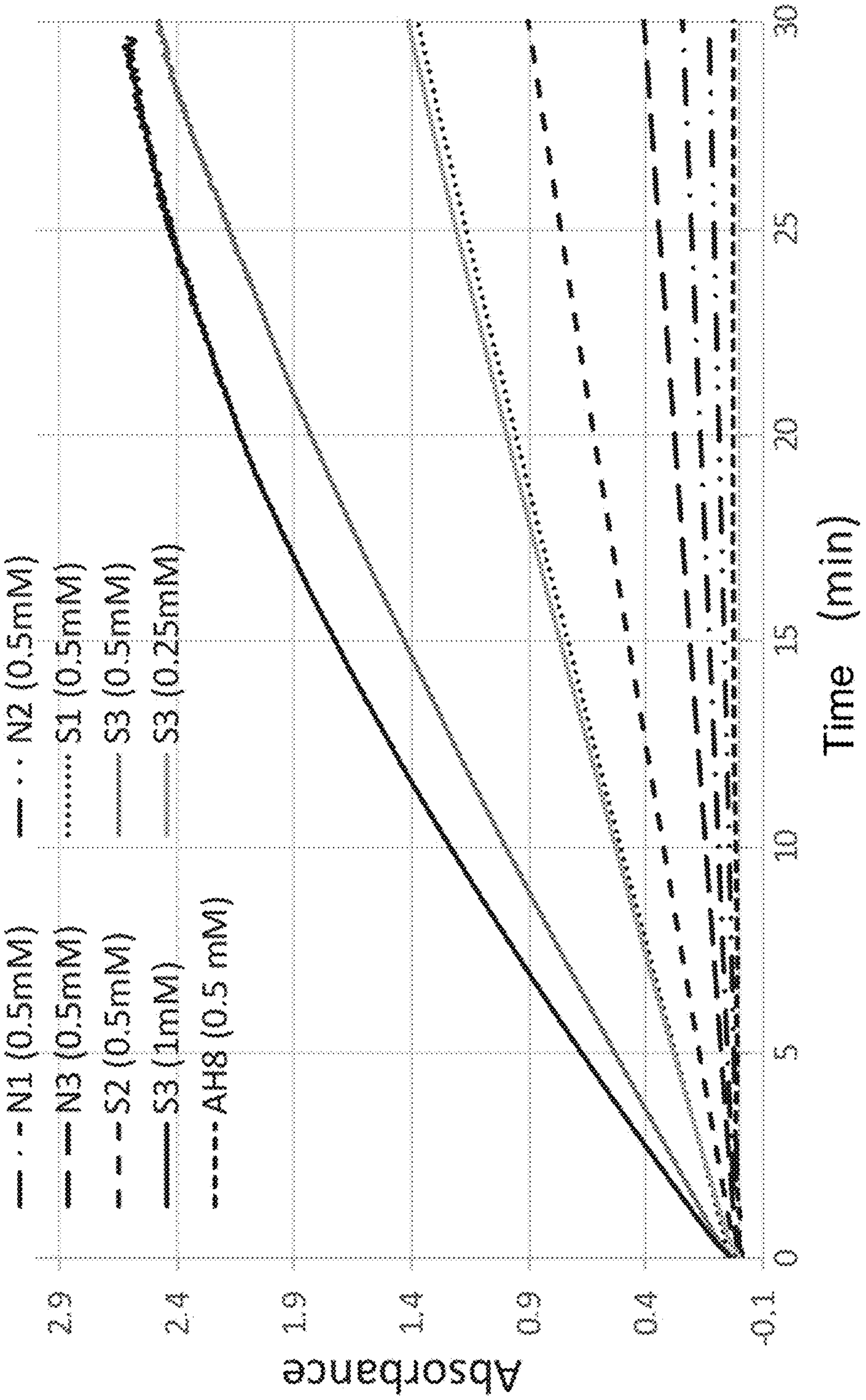
FIG. 1 shows the hydrolysis kinetics of methyl-paraoxon.

In a 100 mL flask under an argon atmosphere, β-cyclodextrin (2.27 g, 2 mmol, 2 eq.) was dissolved in 15 mL of anhydrous DMSO. The medium was heated to 55° C., then sodium hydroxide (800 mg, 20 mmol, 20 eq.) was added to the medium once all of the cyclodextrin was dissolved. Half an hour later, 1-(allyloxy)-3,5-bis(bromomethyl)benzene (320 mg, 1 mmol, 1 eq.), dissolved in 5 mL anhydrous DMSO, was added dropwise to the medium for 5 min. After two hours of stirring at 55° C., the medium was allowed to return to RT. Then the medium was transferred dropwise to 1 L acetone with vigorous stirring. The precipitate obtained was recovered by filtration on a Büchner funnel. The precipitate was rinsed with 200 mL acetone. The precipitate was dried under high vacuum (vane pump). In a 100 mL flask under an argon atmosphere, the dried product was dissolved in freshly distilled pyridine (23.4 mL, 289 mmol). The medium was cooled by an ice bath. Then, acetic anhydride (23.4 mL, 248 mmol) was added dropwise to the medium. The medium was allowed to return to RT and left to stir for 4 d. The reaction was stopped by evaporating the solvents under high vacuum (vane pump). The crude product was dissolved in 400 mL dichloromethane. The organic phase obtained was successively washed with 200 mL water, 200 mL of a saturated aqueous ammonium chloride solution, 200 mL of a saturated sodium chloride solution, then dried over sodium sulphate, filtered, and concentrated under reduced pressure. The residue was purified on 600 mL silica gel using a mixture of cyclohexane and acetone as eluents (1/1, v/v) to provide the product in the form of a white solid (1.337 g, 325 μmol, yield=32.5%).

Rf 0.14 (Acetone/Cyclohexane, 1/1, v/v).

RMN $^1H$ (300 MHz, $CDCl_3$) δ 6.81 (s, 2H, H-2*), 6.65 (s, 1H, H-4*), 6.03 (ddt, J=17.2, 15.8, 5.2 Hz, 1H, OCH2CH═CH2), 5.39 (dd large, J=17.2, 1.4 Hz, 1H, OCH2CH═CH2trans), 5.39-5.19 (m, 13H, 12xH-3, OCH2CH═CH2cis), 5.23 (t, J=10.0 Hz, 2H, 2xH-3A), 5.10 (d, J=3.8 Hz, 2H, 2xH-1), 5.08 (d, J=3.7 Hz, 2H, 2xH-1), 5.05 (d, J=3.7 Hz, 4H, 4xH-1), 5.04 (d, J=3.8 Hz, 2H, 2xH-1), 4.99 (d, J=4.0 Hz, 2H, 2xH-1), 4.82 (dd, J=10.0, 3.9 Hz, 2H, 2xH-2), 4.83-4.69 (m, 12H, 10xH-2, 2xH-1A), 4.63-4.40 (m, 20H, 14xH-6, OCH2CH═CH2, 2xOCH2benz), 4.38-3.90 (m, 26H, 14xH-6', 10xH-5, 2xH-5A), 4.02 (dd large, J=9.5, 2.3 Hz, 2H, 2xH-5), 3.80-3.53 (m, 12H, 12xH-4), 3.58 (t, J=10.0 Hz, 2H, 2xH-4A), 3.31 (dd, J=10.0, 2.9 Hz, 2H, 2xH-2A), 2.10, 2.09, 2.07, 2.06, 2.05, 2.04, 2.03 (s, 102H, 34xCOCH3), 1.99 (s, 12H, 4xCOCH3), 1.86 (s, 6H, 2xCOCH3).

RMN $^{13}C$ (75 MHz, $CDCl_3$) δ 171.0, 170.9, 170.84, 170.82, 170.77, 170.61, 170.55, 170.50, 170.49, 170.46, 170.4, 170.3, 169.6, 169.5, 169.44, 169.40, 169.3 (s, 40C, 40xCOCH3), 159.3 (1C, C-1*), 139.7 (2C, 2xC-3*), 133.0 (1C, OCH2CH═CH2), 119.0 (1C, C-4*), 117.7 (1C, OCH2CH═CH2), 113.5 (2C, 2xC-2*), 98.5 (2C, 2xC-1A), 97.3, 97.1, 97.0, 96.7, 96.6, 96.5 (s, 12C, 12xC-1), 78.8 (2C, 2xC-4), 78.3 (2C, 2xC-2A), 77.8 (2C, 2xC-4A), 76.9, 76.7, 76.6, 76.5, 76.2 (s, 10C, 10xC-4), 72.8 (2C, 2xC-3A), 72.7 (2C, 2xCH2benz), 71.4 (2C, 2xC-3), 70.9, 70.8, 70.6, 70.24, 70.15, 69.9, 69.7, 69.6, 69.51, 69.45 (s, 36C, 10xC-3, 12xC-2, 14xC-5), 68.8 (1C, OCH2CH═CH2), 63.0, 62.6 (14C, 14xC-6), 21.00, 20.96, 20.85, 20.8 (s, 38C, 38xCOCH3), 20.6 (2C, 2xCOCH3).

TOF-HRMS (ESI+) calculated for $[C_{175}H_{230}NaO_{111}]^+$: 4130.2251, found: 4130.2217.

3,5-Bis(2'$^A$-{3'$^A$,6'$^A$-di-O-acetyl-hexakis-[2',3',6'-tri-O-acetyl]-cyclomalto-heptaosoxy}-methyl)phenol S6 anhydrous THF. The medium was degassed for 10 min under an argon flow. Then, tetrakis(triphenylphosphine) palladium (36 mg, 31 μmol, 0.3 eq.) and dimethylbarbituric acid (161 mg, 1.03 mmol, 10 eq.) were added to the medium. The medium was then brought to reflux. Following one hour of stirring at 75° C., the medium was allowed to return to RT, and the reaction was stopped by adding 7.5 mL of a saturated aqueous sodium bicarbonate solution. The medium was extracted with 100 mL ethyl acetate. The organic phase obtained was washed three times with 10 mL water, 15 mL of a saturated sodium chloride solution, dried over anhydrous sodium sulphate, filtered, and concentrated under reduced pressure. The residue was purified on 75 mL silica gel using a mixture of acetone and cyclohexane as eluents (1/1, 11/10, 6/5, v/v) to provide the product (356 mg, 87.5 μmol, yield=85%) in the form of a yellow solid.

Rf 0.25 (Acetone/Cyclohexane, 6/4, v/v).

RMN $^1H$ (300 MHz, $CDCl_3$) δ 8.14 (s, 1H, OH phenolic), 6.77 (s, 2H, H-2*), 6.44 (s, 1H, H-4*), 5.41-5.18 (m, 14H, 14xH-3), 5.13-5.00 (m, 10H, 10xH-1), 4.98 (d, J=3.8 Hz, 2H, 2xH-1), 4.88 (d, J=3.0 Hz, 2H, 2xH-1A), 4.84-4.68 (m, 12H, 12xH-2), 4.62-4.39 (m, 18H, 14xH-6, 2xCH2benz), 4.37-3.99 (m, 28H, 14xH-6', 14xH-5), 3.80-3.60 (m, 12H, 12xH-4), 3.56 (t, J=9.3 Hz, 2H, 2xH-4A), 3.37 (dd, J=10.0, 3.0 Hz, 2H, 2xH-2A), 2.10, 2.08, 2.07, 2.06, 2.05, 2.04, 2.03 (s, 102H, 34xCOCH3), 2.00 (s, 6H, 2xCOCH3), 1.91 (s, 6H, 2xCOCH3), 1.84 (s, 6H, 2xCOCH3).

RMN $^{13}C$ (75 MHz, $CDCl_3$) δ 171.0, 170.87, 170.85, 170.82, 170.80, 170.7, 170.54, 170.51, 170.48, 170.46, 170.45, 170.3, 169.7, 169.6, 169.54, 169.51, 169.48, 169.46 (s, 40C, 40xCOCH3), 157.8 (C-1*), 139.5 (2C, 2xC-3*), 115.9 (C-4*), 113.7 (2C, 2xC-2*), 99.0 (2C, 2xC-1A), 97.2, 97.1, 96.87, 96.85, 96.7, 96.6 (s, 12C, 12xC-1), 78.13 (2C, 2xC-4), 78.09 (2C, 2xC-4A), 78.0 (2C, 2xC-2A), 77.0, 76.9, 76.8, 76.41, 76.37 (s, 10C, 10xC-4), 73.0 (2C, 2xCH2benz), 72.5 (2C, 2xC-3A), 71.1, 71.0, 70.9, 70.8, 70.7, 70.6, 70.4, 70.3, 70.1, 69.9, 69.8, 69.7, 69.6 (s, 38C, 12xC-3, 12xC-2, 14xC-5), 62.8, 62.7, 62.5 (s, 14C, 14xC-6), 21.0, 20.87, 20.85, 20.8 (s, 38C, 38xCOCH3), 20.7 (2C, 2xCOCH3).

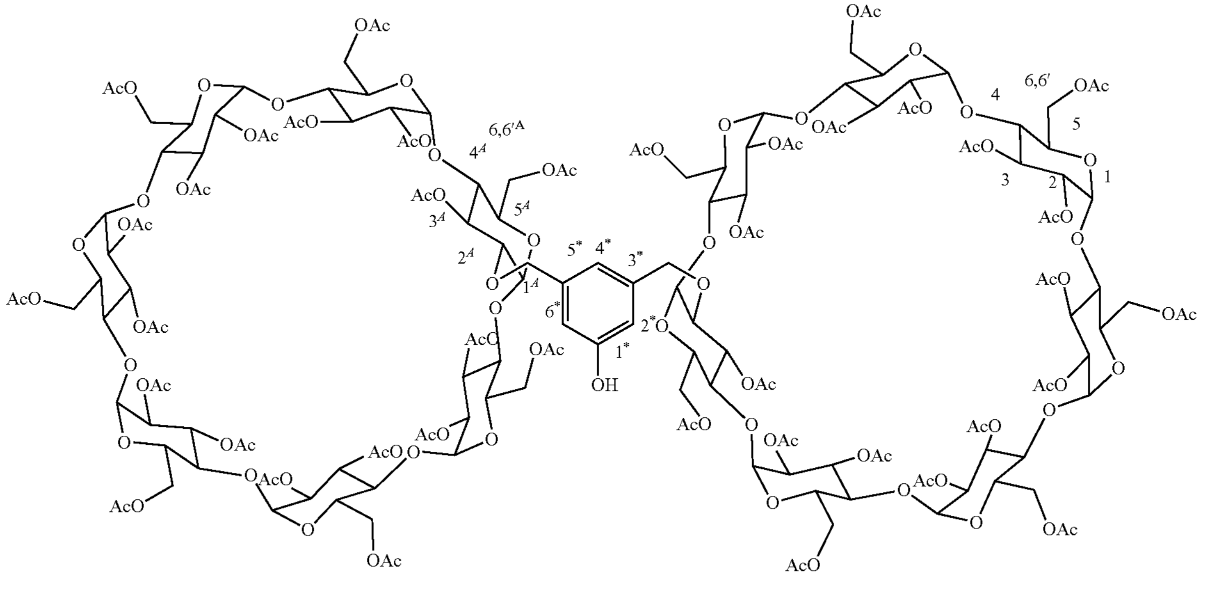

In a 50 mL flask under an argon atmosphere, compound S5 (425 mg, 103.4 μmol, 1 eq.) was dissolved in 7.5 mL of TOF-HRMS (ESI+) calculated for $[C_{172}H_{226}NaO_{111}]^+$: 4090.1937, found: 4090.2034.

Methyl 5-{[3,5-Bis(2'$^A$-{3'$^A$,6'$^A$-di-O-acetyl-hexakis-[2',3',6'-tri-O-acetyl]-cyclomalto-heptaosoxy}methyl)phenoxy)methyl}-2-iodobenzoate S7

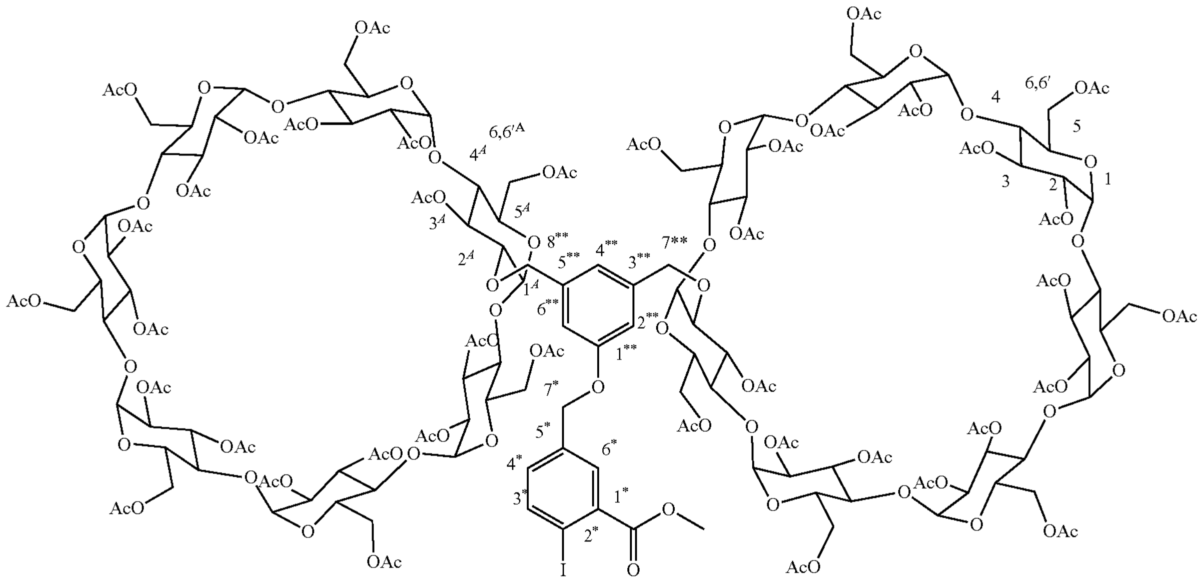

In a 50 mL flask under an argon atmosphere, compound S6 (350 mg, 86 μmol, 1 eq.) was dissolved in 15 mL of distilled acetone. Then, methyl 5-(bromomethyl)-2-iodobenzoate (61 mg, 172 μmol, 2 eq.) was added to the medium, followed by potassium carbonate (47.5 mg, 70.2 μmol). The medium was heated to 60° C. After 16 h of stirring at 60° C., the medium was allowed to return to RT. The solid was extracted by filtration. The filtrate was concentrated under reduced pressure. The residue was purified on 80 mL silica gel using a mixture of cyclohexane and acetone as eluents (1/1, v/v) to provide the product in the form of a cream-white solid (305 mg, 70.2 μmol, yield=82%).

Rf 0.49 (Acetone/Cyclohexane, 6/4, v/v).

RMN $^1H$ (300 MHz, $CDCl_3$) δ 8.02 (d, J=8.1 Hz, 1H, H-3*), 7.92 (d, J=1.8 Hz, 1H, H-6*), 7.32 (dd, J=8.1, 1.8 Hz, 1H, H-4*), 6.87 (s, 2H, H-9*), 6.65 (s, 1H, H-11*), 5.42-5.20 (m, 14H, 14×H-3), 5.15 (d, J=12.7 Hz, 1H, H-7*), 5.12-5.06 (m, 7H, 6×H-1, H-7'*), 5.04 (d, J=3.3 Hz, 4H, 4×H-1), 4.99 (d, J=3.8 Hz, 2H, 2×H-1), 4.86 (d, J=2.7 Hz, 2H, 2×H-1A), 4.83-4.67 (m, 12H, 12×H-2), 4.65-4.40 (m, 18H, 2×CH2benz, 14×H-6), 4.38-3.99 (m, 28H, 14×H-6', 14×H-5), 3.96 (s, 3H, OCH3), 3.81-3.59 (m, 12H, 12×H-4), 3.57 (t, J=9.4 Hz, 2H, 2×H-4A), 3.36 (dd, J=10.1, 2.9 Hz, 2H, 2×H-2A), 2.10, 2.09, 2.08, 2.06, 2.05, 2.04, 2.03, 2.01 (s, 102H, 34×COCH3), 1.95 (s, 6H, 2×COCH3), 1.90 (s, 6H, 2×COCH3), 1.80 (s, 6H, 2×COCH3).

RMN $^{13}C$ (75 MHz, $CDCl_3$) δ 170.96, 170.91, 170.89, 170.85, 170.80, 170.75, 170.57, 170.55, 170.51, 170.49, 170.4, 169.6, 169.51, 169.46, 169.4 (s, 40C, 40×COCH3), 167.0 (1C, COOCH3), 159.1 (1C, C-8*), 141.52 (1C, C-3*), 139.9 (2C, 2×C-10*), 137.5, 135.5 (2C, C-5*, C-1*), 131.48 (1C, C-4*), 129.49 (1C, C-6*), 118.2 (1C, C-11*), 113.0 (2C, C-9*), 98.8 (2C, 2×C-1A), 97.3, 97.1, 96.9, 96.7, 96.5 (s, 12C, 12×C-1), 92.9 (1C, C-2*), 79.1 (2C, 2×C-4), 78.6 (2C, 2×C-2A), 78.0 (2C, 2×C-4A), 76.93, 76.85, 76.8, 76.2, 75.9 (10C, 10×C-4), 72.7 (4C, 2×CH2benz, 2×C-3), 71.03, 70.97, 70.8, 70.7, 70.6, 70.48, 70.45, 70.2, 69.8, 69.6, 69.50 (s, 34C, 14×C-3, 12×C-2, 14×C-5), 68.47 (1C, C-7*), 62.9, 62.7, 62.61, 62.58, 62.5 (14C, 14×C-6), 52.8 (1C, COOCH3), 21.0, 20.91, 20.87 (34C, 34×COCH3), 20.82 (2C, 2×COCH3), 20.76 (2C, 2×COCH3), 20.7 (2C, 2×COCH3).

TOF-HRMS (ESI+) calculated for $[C_{181}H_{233}INaO_{113}]^+$: 4364.1428, found: 4364.1494.

Methyl 4-{[3,5-Bis(2'$^{A}$-{3'$^{A}$,6'$^{A}$-di-O-acetyl-hexakis-[2',3',6'-tri-O-acetyl]-cyclomalto-heptaosoxy}methyl)phenoxy]methyl}-2-iodobenzoate S8

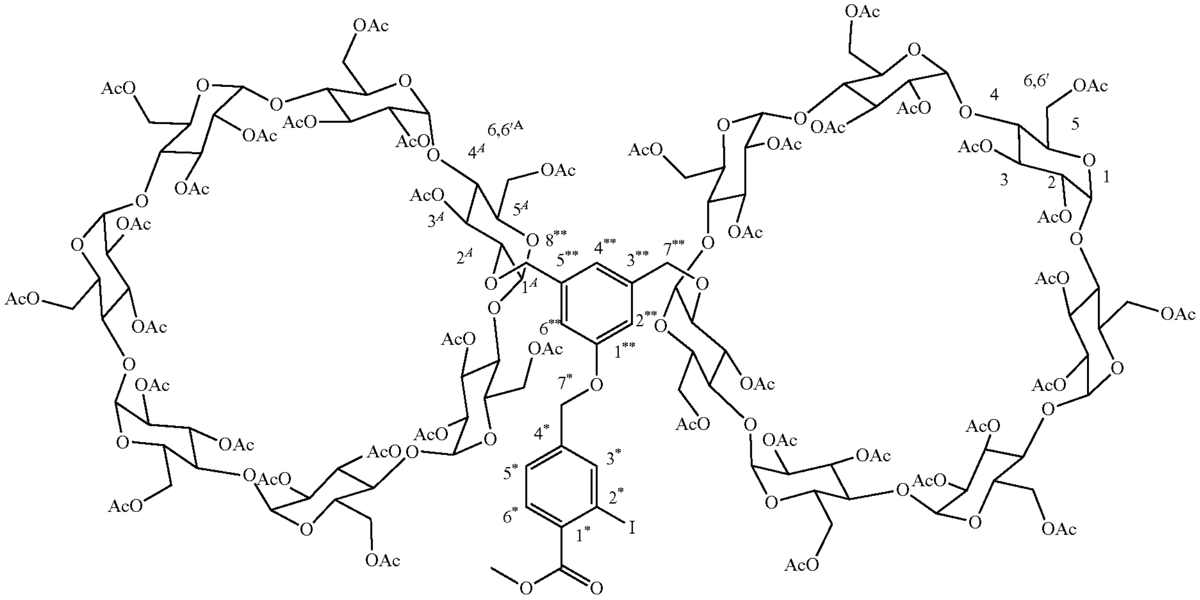

In a 50 mL flask under an argon atmosphere, compound S6 (290 mg, 71.3 μmol, 1 eq.) was dissolved in 13.4 mL of distilled acetone. Then, methyl 4-(bromomethyl)-2-iodobenzoate (51 mg, 142 μmol, 2 eq.) was added to the medium, followed by potassium carbonate (39.4 mg, 285 μmol). The medium was heated to 60° C. After 16 h of stirring at 60° C., the medium was allowed to return to RT. The solid was extracted by filtration. The filtrate was concentrated under reduced pressure. The residue was purified on 75 mL silica gel using a mixture of cyclohexane and acetone as eluents (1/1, v/v) to provide the product in the form of a cream-white solid (215 mg, 49.5 μmol, yield=69%).

Rf 0.36 (Acetone/Cyclohexane, 6/4, v/v).

$^{1}$H NMR (300 MHz, $CDCl_3$) δ 8.07 (s, 1H, H-3*), 7.83 (d, J=8.0 Hz, 1H, H-6*), 7.45 (d, J=8.0 Hz, 1H, H-5*), 7.34 (d, J=7.6 Hz, 2H, H-3, H-5), 7.18 (t, J=7.6 Hz, 1H, H-4**), 5.38-5.16 (m, 14H, 14xH-3), 5.10 (d, J=4.4 Hz, 2H, 2xH-1), 5.07 (d, J=4.6 Hz, 2H, 2xH-1), 5.03 (d, J=3.1 Hz, 4H, 4xH-1), 5.01 (d, J=4.2 Hz, 2H, 2xH-1), 4.91-4.62 (m, 16H, 2xH-1$^{A}$, H-7*, 12xH-2, H-7*'), 4.66 (d, J=12.4 Hz, 2H, H-7, H-8), 4.60-4.39 (m, 14H, 14xH-6), 4.44 (d, J=12.4 Hz, 2H, H-7', H-7'), 4.37-4.04 (m, 26H, 14xH-6', 12xH-5), 4.04-3.95 (m, 2H, 2xH-5$^{A}$), 3.91 (s, 3H, $OCH_3$), 3.76-3.58 (m, 10H, 10xH-4), 3.62 (t, J=9.5 Hz, 2H, 2xH-4), 3.62 (t, J=8.8 Hz, 2H, 2xH-4$^{A}$), 3.32 (dd, J=10.1, 2.7 Hz, 2H, 2xH-2$^{A}$), 2.11, 2.10, 2.08, 2.07, 2.06, 2.04, 2.02, 2.01, 1.98, 1.97 (s, 108H, 36x$COCH_3$), 1.91 (s, 6H, 2x$COCH_3$), 1.77 (s, 6H, 2x$COCH_3$).

$^{13}$C NMR (75 MHz, $CDCl_3$) δ 171.01, 170.96, 170.8, 170.62, 170.59, 170.53, 170.48, 170.46, 170.4, 170.24, 169.6, 169.5, 169.44, 169.42, 169.39, 169.2 (40C, 40x$COCH_3$), 166.4 (1C, $COOCH_3$), 153.9 (1C, C-1**), 141.8 (1C, C-4*), 139.5 (1C, C-3*), 134.9 (1C, C-1*), 131.4 (1C, C-6*), 131.1 (2C, C-2, C-6), 129.6 (2C, C-3, C-5), 126.4 (1C, C-5*), 125.1 (1C, C-4**), 98.0 (2C, 2xC-1$^{A}$), 97.2, 97.1, 97.0, 96.70, 96.6, 96.5 (12C, 12xC-1), 94.5 (1C, C-2*), 78.4 (2C, 2xC-2$^{A}$), 78.3 (2C, 2xC-4$^{A}$), 77.7, 77.0, 76.8, 76.5, 76.2 (12C, 12xC-4), 74.6 (1C, C-7*), 72.7 (2C, 2xC-3), 71.6, 71.2, 71.0, 70.9, 70.7, 70.6, 70.5, 70.4, 70.2 (38C, 10xC-3, 2xC-3$^{A}$, 12xC-2, 14xC-5), 70.01 (s), 69.68 (s), 69.55 (s), 69.44 (s), 67.3 (2C, C-7, C-8), 62.9, 62.6, 62.4 (14C, 14xC-6), 52.7 (1C, $COOCH_3$), 20.99, 20.97, 20.85, 20.6 (40C, 40x$COCH_3$).

TOF-HRMS (ESI+) calculated for $[C_{181}H_{233}INaO_{113}]+$: 4364.1428, found: 4364.1611.

Methyl 5-(3-[3,5-Bis(2'^A-{3'^A,6'^A-di-O-acetyl-hexakis-[2',3',6'-tri-O-acetyl]-cyclomaltoheptaosoxy}methyl)phenoxy]propyl}-2-iodobenzoate S9

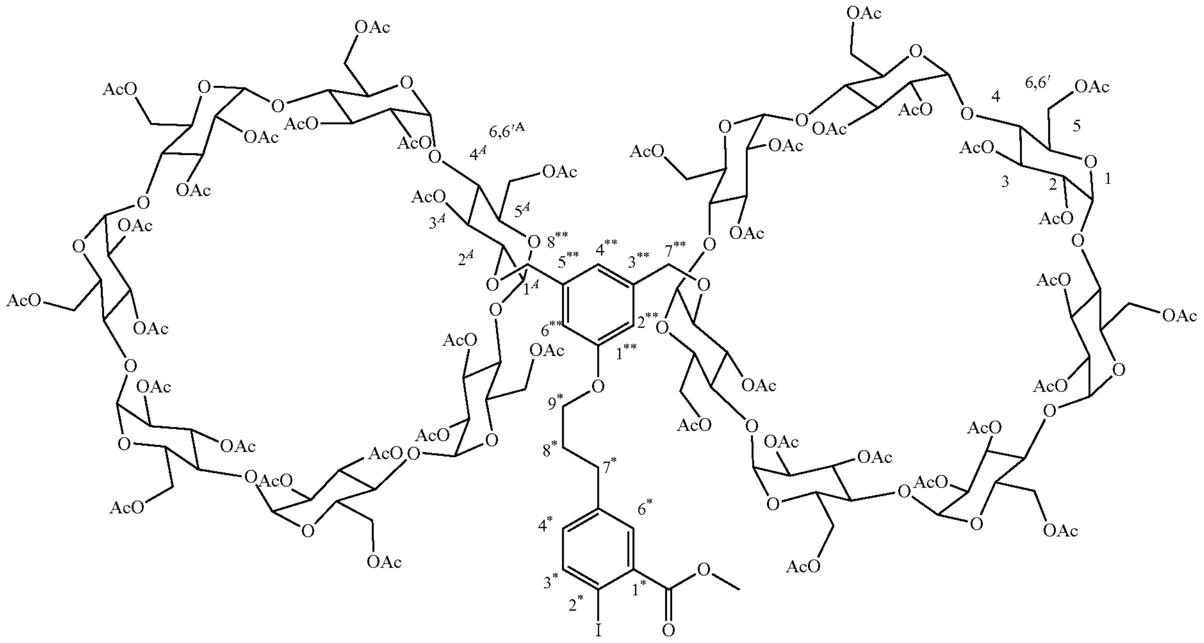

In a 50 mL flask under an argon atmosphere, compound S6 (336 mg, 82.6 μmol, 1 eq.) was dissolved in 15 mL of distilled acetone. Then, methyl 5-(bromopropyl)-2-iodobenzoate (63 mg, 165 μmol, 2 eq.) was added to the medium, followed by potassium carbonate (45.6 mg, 330 μmol). The medium was heated to 60° C. After 16 h of stirring at 60° C., the medium was allowed to return to RT. The solid was extracted by filtration. The filtrate was concentrated under reduced pressure. The residue was purified on 75 mL silica gel using a mixture of cyclohexane and acetone as eluents (13/12-1/1, v/v) to provide the product in the form of a cream-white solid (181 mg, 41.4 μmol, yield=50%).

Rf 0.38 (Acetone/Cyclohexane, 6/4, v/v).

$^1$H NMR (300 MHz, $CDCl_3$) δ 7.87 (d, J=8.1 Hz, 1H, H-4*), 7.62 (d, J=2.0 Hz, 1H, H-6*), 7.04 (dd, J=8.1, 2.0 Hz, 1H, H-3*), 6.75 (s, 2H, H-2, H-6), 6.64 (s, 1H, H-4**), 5.39-5.16 (m, 14H, 12×H-3, 2×H-$3^A$), 5.12-5.00 (m, 10H, 10×H-1), 4.98 (d, J=3.8 Hz, 2H, 2×H-1), 4.84-4.62 (m, 14H, 12×H-2, 2×H-$1^A$), 4.60-4.37 (m, 18H, 12×H-6, 2×H-$6^A$, 2×CH2benz), 4.36-4.18 (m, 14H, 12×H-6', 2×H-$6^{A}$'), 4.16-3.91 (m, 16H, 12×H-5, 2×H-$5^A$, H-9*, H-9*'), 3.89 (s, 3H, $OCH_3$), 3.80-3.50 (m, 14H, 12×H-4, 2×H-$4^A$), 3.30 (dd, J=10.1, 2.6 Hz, 2H, 2×H-$2^A$), 2.77 (dd, J=7.4, 8.1 Hz, 2H, H-7*, H-7*'), 2.20-2.00 (m, 98H, 32×$COCH_3$, H-8*, H-8*'), 2.00 (s, 6H, 2×$COCH_3$), 1.96 (s, 12H, 4×$COCH_3$), 1.83 (s, 6H, 2×$COCH_3$).

$^{13}$C NMR (75 MHz, $CDCl_3$) δ 171.0, 170.9, 170.81, 170.78, 170.77, 170.7, 170.6, 170.52, 170.47, 170.44, 170.41, 170.3, 169.6, 169.46, 169.45, 169.42, 169.39, 169.2 (s, 40C, 40×$COCH_3$), 167.1 ($COOCH_3$), 159.54 (C-1**), 141.9 (C-1*), 141.4 (C-6*), 139.7 (2C, C-3, C-5), 135.2 (C-5*), 133.3 (C-3*), 131.1 (C-4*), 118.7 (C-4), 113.1 (2C, C-2, C-6**), 98.5 (2C, 2×C-$1^A$), 97.3, 97.1, 96.9, 96.7, 96.6, 96.5 (12C, 12×C-1), 90.7 (C-2*), 78.9 (2C, 2×C-4), 78.5 (2C, 2×C-$2^A$), 77.8 (2C, 2×C-$4^A$), 76.9, 76.7, 76.5, 76.1 (10C, 10×C-4), 72.8 (2C, 2×C-$3^A$), 72.7 (2C, C-7, C-8), 71.3, 70.8, 70.7, 70.61, 70.55, 70.20, 70.1, 69.9, 69.7, 69.61, 69.55, 69.5, 69.4 (38C, 12×C-4, 12×C-2, 12×C-5, 2×C-$5^A$), 67.0 (C-9*), 62.9, 62.7, 62.5, 62.4 (14C, 12×C-6, 2×C-$6^A$), 52.51 ($COOCH_3$), 31.6 (C-7*), 30.6 (C-8*), 21.0, 20.9, 20.8, 20.6 (40C, 40×$COCH_3$).

TOF-HRMS (ESI+) calculated for $[C_{133}H_{237}INaO_{113}]$+: 4392.1741, found: 4392.1836.

5-({3,5-Bis[2'^A-cyclomalto-heptaosoxymethyl] phenoxy}methyl)-2-iodosylbenzoic acid S1

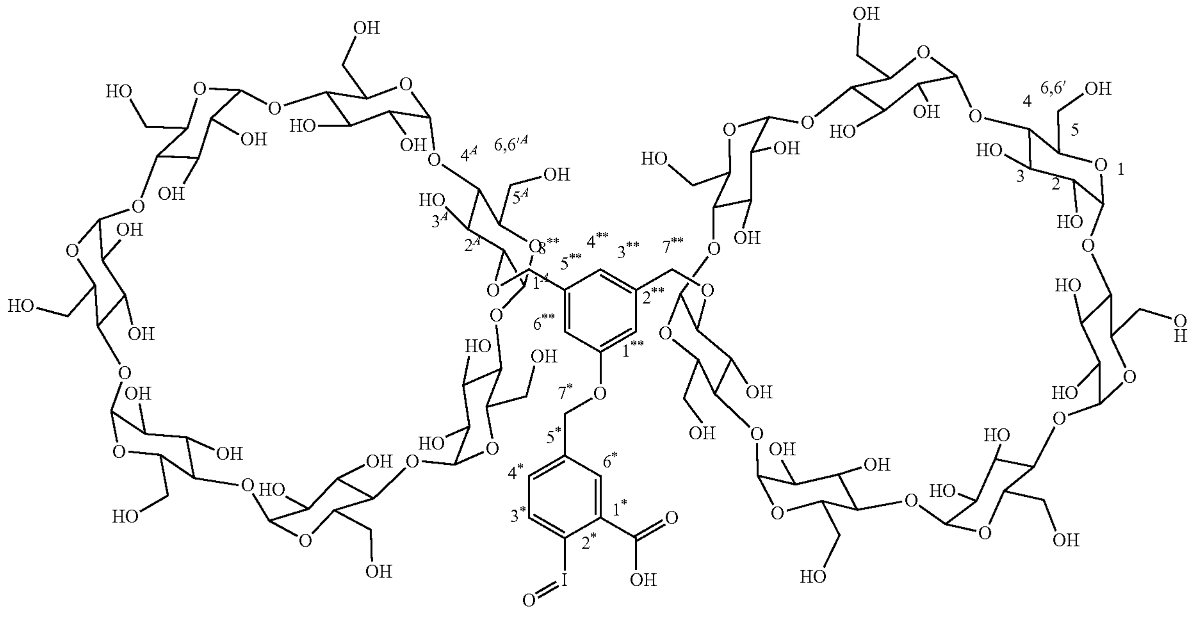 [SMILES: O=Ic1ccc(COc2cc(COC3C4OC(CO)C(OC5OC(CO)C(OC6OC(CO)C(OC7OC(CO)C(OC8OC(CO)C(OC9OC(CO)C(OC%10OC(CO)C(O4)C(O)C%10O)C(O)C9O)C(O)C8O)C(O)C7O)C(O)C6O)C(O)C5O)C3O)cc(COC3C4OC(CO)C(OC5OC(CO)C(OC6OC(CO)C(OC7OC(CO)C(OC8OC(CO)C(OC9OC(CO)C(OC%10OC(CO)C(O4)C(O)C%10O)C(O)C9O)C(O)C8O)C(O)C7O)C(O)C6O)C(O)C5O)C3O)c2)cc1C(=O)O]

In a test tube heated by water bath at 45° C., compound S7 (160 mg, 36.8 μmol, 1 eq.) was dissolved in 1.5 mL glacial acetic acid, then 1.5 mL water was added. Finally, sodium periodate (788 mg, 3.68 mmol, 100 eq.) was added. The medium was left to be stirred at 45° C. for 19 h. The medium was then diluted in 5 mL MilliQ water. It was then extracted three times with 25 mL ethyl acetate. The organic phases were combined, washed with 30 mL of a saturated aqueous sodium bicarbonate solution, 30 mL of a saturated aqueous sodium chloride solution, dried over anhydrous sodium sulphate, filtered, and concentrated under reduced pressure. In a 50 mL flask, the resultant crude product was suspended in 10 mL MilliQ water. Then, soda (84.4 mg, 2.11 mmol, 57 eq.) was added to the suspension. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution. The solution obtained was deposited on 4.5 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3, v/v). The product (75 mg, 28.1 μmol, yield=76%) was obtained in the form of a white solid following lyophilisation of the fractions containing the product.

RMN $^1H$ (300 MHz, $D_2O$) δ 8.16 (s large, 1H, H-6*), 8.07 (d large, J=8.2 Hz, 1H, H-4*), 7.89 (d large, J=8.2 Hz, 1H, H-3*), 7.20-7.09 (m, 3H, H-11*, 2×H-9*), 5.43 (s large, 2H, H-7*), 5.12 (d large, J=2.0 Hz, 2H, 2×H-1A), 5.20-4.98 (m, 12H, 12×H-1), 4.86-4.75 (signal under HDO, 4H, 2×CH2benz), 4.10-3.99 (m, 4H, 4×H-3A), 3.99-3.37 (m, 80H, 14×H-6, 14×H-6'. 12×H-3, 14×H-2, 14×H-4).

RMN $^{13}C$ (75 MHz, $D_2O$) δ 170.70 (1C, COO), 158.7 (s, 1C, C-8*), 141.6 (s, 1C, C-2*), 139.9 (s, 2C, 2×C-10*), 139.6 (s, 1C, C-5*), 134.4 (s, 1C, C-4*), 131.5 (s, 1C, C-1*), 130.8 (s, C-6*), 120.7 (s, 1C, C-3*), 122.7 (C-11*), 115.6 (s, 2C, 2×C-9*), 102.8-102.2 (m, 12C, 12×C-1), 100.75 (s, 2C, 2×C-1A), 82.4-81.4 (m, 12C, 12×C-4), 80.6 (s, 2C, 2×C-4A), 74.5 (s, 2C, 2×CH2benz), 74.2-73.5 (m, 12C, 12×C-3), 73.3 (s, 2C, 2×C-3A), 73.1-72.0 (m, 28C, 14×C-2, 14×C-5), 69.0 (s, 1C, C-7*), 61.2-60.5 (m, 14C, 14×C-6).

TOF-HRMS (ESI+) calculated for $[C_{100}H_{151}INaO_{74}]^+$: 2685.6995, found: 2685.7048.

5-({3,5-Bis[$2'^{A}$-cyclomalto-heptaosoxymethyl]phenoxy}methyl)-2-iodosylbenzoic acid

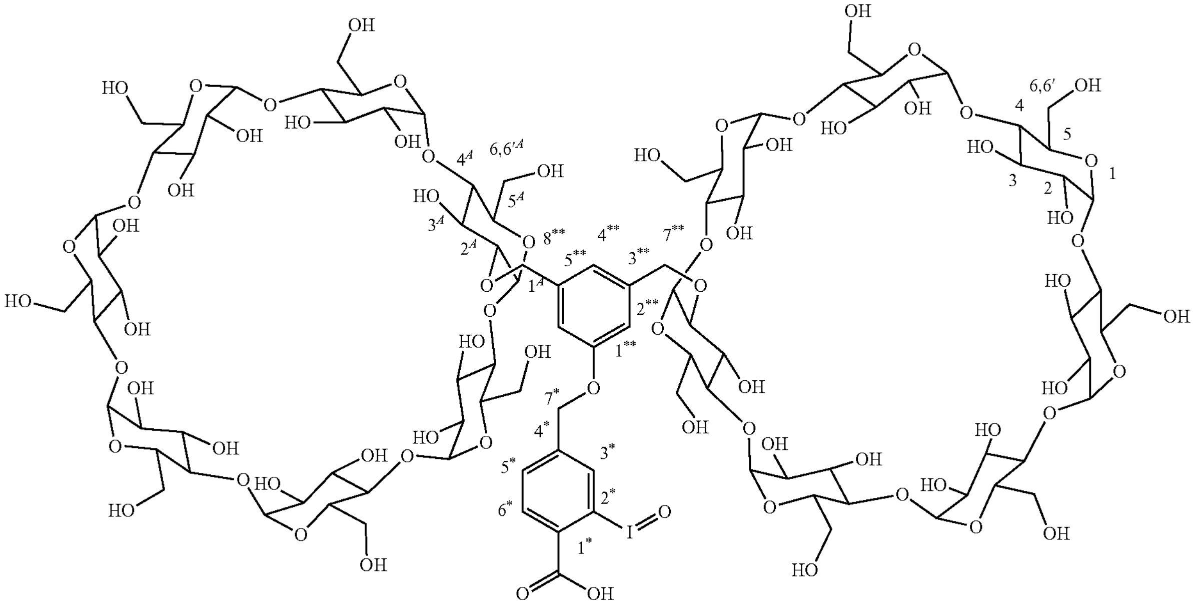 [SMILES: O=Ic1cc(COc2cc(COC3C4OC(CO)C(OC5OC(CO)C(OC6OC(CO)C(OC7OC(CO)C(OC8OC(CO)C(OC9OC(CO)C(OC%10OC(CO)C(O4)C(O)C%10O)C(O)C9O)C(O)C8O)C(O)C7O)C(O)C6O)C(O)C5O)C3O)cc(COC3C4OC(CO)C(OC5OC(CO)C(OC6OC(CO)C(OC7OC(CO)C(OC8OC(CO)C(OC9OC(CO)C(OC%10OC(CO)C(O4)C(O)C%10O)C(O)C9O)C(O)C8O)C(O)C7O)C(O)C6O)C(O)C5O)C3O)c2)ccc1C(=O)O]

In a test tube heated by water bath at 45° C., compound S8 (183 mg, 42.1 μmol, 1 eq.) was dissolved in 1.7 mL glacial acetic acid, then 1.7 mL water was added. Finally, sodium periodate (901 mg, 4.21 mmol, 100 eq.) was added. The medium was left to be stirred at 45° C. for 19 h. The medium was then diluted in 5 mL MilliQ water. It was then extracted three times with 25 mL ethyl acetate. The organic phases were combined, washed with 30 mL of a saturated aqueous sodium bicarbonate solution, 30 mL of a saturated aqueous sodium chloride solution, dried over anhydrous sodium sulphate, filtered, and concentrated under reduced pressure. The crude product obtained was purified on silica gel (20 mL) using a mixture of cyclohexane and acetone as eluents (4/1-0/1, v/v) to provide a partially deacetylated white product. In a 50 mL flask, this product was suspended in 10 mL MilliQ water. Then, soda (84.4 mg, 2.11 mmol, 57 eq.) was added to the suspension. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution. The solution obtained was deposited on 4.5 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3, v/v). The product (72 mg, 27.0 μmol, yield=64%) was obtained in the form of a white solid following lyophilisation of the fractions containing the product.

RMN $^{1}H$ (600 MHz, $D_2O$) δ 8.23 (d, J=7.1 Hz, 1H, H-3*), 7.95-7.76 (m, 2H, H-6*, H-5*), 7.03 (s large, 3H, H-2, H-6, H-4**), 5.39 (s, 2H, H-7*, H-7'*), 5.20-4.92 (m, 14H, H-7, H-8, 12xH-1, 2xH-1A), 4.74 (d, J=11.2 Hz, 2H, H-7', H-8'), 4.10-3.67 (m, 56H, 12xH-3, 2xH-3A, 12xH-5, 2xH-5A, 12xH-6, 2xH-6A, 12xH-6', 12xH-$6'^{A}$), 3.67-3.46 (m, 26H, 12xH-2, 2xH-2A, 10xH-4, 2xH-4A), 3.45-3.38 (m, 2H, 2xH-4).

RMN $^{13}C$ (151 MHz, $D_2O$) δ 170.3 (1C, COO), 158.1 (1C, C-1**), 141.4 (1C, C-4*), 139.4 (2C, C-3, C-5), 131.9 (1C, C-6*), 130.6 (1C, C-1*), 129.2 (1C, C-5*), 128.2 (1C, C-3*), 123.6 (1C, C-4**), 120.1 (1C, C-2*), 114.7 (2C, C-2, C-6), 101.9, 101.8, 101.8, 101.7 (12C, 12xC-1), 100.2 (2C, 2xC-1A), 81.2, 81.1, 80.9 (14C, 12xC-4, 2xC-4A), 79.7 (2C, 2xC-2A), 73.3, 73.21, 73.15, 73.12, 73.09, 72.7 (14C, 12xC-3, 2xC-3A, C-7*), 71.99, 71.96, 71.9, 71.8, 71.7, 71.50, 71.47 (26C, 12xC-2, 12xC-5, 2xC-5A), 69.2 (2C, C-7, C-8), 60.3, 60.2, 60.1 (14C, 12xC-6, 2xC-6A).

TOF-HRMS (ESI+) calculated for $[C_{100}H_{151}INaO_{74}]^+$: 2685.6995, found: 2685.7026.

5-({3,5-Bis[2'$^{A}$-cyclomalto-heptaosoxymethyl] phenoxy}propyl)-2-iodosylbenzoic acid S3

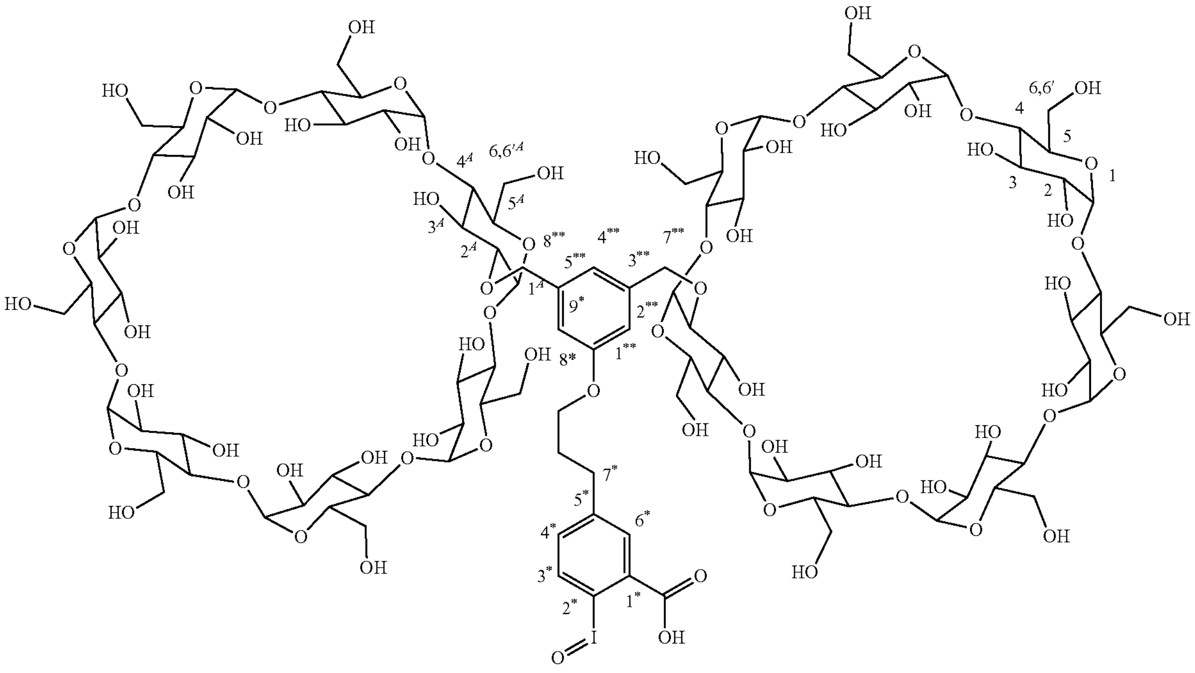 [SMILES: O=Ic1ccc(CCCOc2cc(COC3C4OC(CO)C(OC5OC(CO)C(OC6OC(CO)C(OC7OC(CO)C(OC8OC(CO)C(OC9OC(CO)C(OC%10OC(CO)C(O4)C(O)C%10O)C(O)C9O)C(O)C8O)C(O)C7O)C(O)C6O)C(O)C5O)C3O)cc(COC3C4OC(CO)C(OC5OC(CO)C(OC6OC(CO)C(OC7OC(CO)C(OC8OC(CO)C(OC9OC(CO)C(OC%10OC(CO)C(O4)C(O)C%10O)C(O)C9O)C(O)C8O)C(O)C7O)C(O)C6O)C(O)C5O)C3O)c2)cc1C(=O)O]

In a test tube heated by water bath at 45° C., compound S9 (150 mg, 34 μmol, 1 eq.) was dissolved in 1.5 mL glacial acetic acid, then 1.5 mL water was added. Finally, sodium periodate (734 mg, 3.43 mmol, 100 eq.) was added. The medium was left to be stirred at 45° C. for 19 h. The medium was then diluted in 5 mL MilliQ water. It was then extracted three times with 25 mL ethyl acetate. The organic phases were combined, washed with 30 mL of a saturated aqueous sodium bicarbonate solution, 30 mL of a saturated aqueous sodium chloride solution, dried over anhydrous sodium sulphate, filtered, and concentrated under reduced pressure. In a 50 mL flask, the resultant crude product was suspended in 10 mL MilliQ water. Then, soda (82.3 mg, 2.05 mmol, 57 eq.) was added to the suspension. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution. The solution obtained was deposited on 4.5 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3, v/v). The product (77 mg, 28.6 μmol, yield=84%) was obtained in the form of a white solid following lyophilisation of the fractions containing the product.

RMN $^{1}$H (600 MHz, $D_2O$) δ 7.92 (s, 1H, H-6*), 7.83 (d, J=8.2 Hz, 1H, H-3*), 7.76 (d, J=8.1 Hz, 1H, H-4*), 7.06 (s large, 3H, H-2, H-6, H-4), 5.16-4.95 (m, 16H, 12xH-1, 2xH-1A, H-7, H-8), 4.75 (d, J=12.3 Hz, 2H, H-7', H-8'**), 4.16 (s large, 2H, 2xH-3), 4.04 (d, J=12.3 Hz, 2H, 2xH-3A), 3.99-3.68 (m, 54H, 10xH-3, 12xH-5, 2xH-5A, 12xH-6, 2xH-6A, 12xH-6', 2xH-6'$^{A}$, H-9*, H-9'*), 3.68-3.43 (m, 28H, 12xH-2, 2xH-2A, 12xH-4, 2xH-4A), 3.04 (s large, 2H, H-7*, H-7'*), 2.20 (s large, 2H, H-8*, H-8'*).

RMN $^{13}$C (151 MHz, $D_2O$) δ 170.3 (1C, COO), 158.3 (1C, C-1**), 145.7 (1C, C-5*), 139.2 (2C, C-3, C-5), 135.0 (1C, C-3*), 131.1 (1C, C-6*), 130.6 (1C, C-1*), 125.7 (2C, C-4*, C-4**), 117.0 (C-2*), 114.6 (2C, C-2, C-6), 101.9, 101.83, 101.76, 101.71, 101.69 (12C, 12xC-1), 100.2 (2C, 2xC-1A), 81.4, 81.0, 80.90, 80.85, 80.80, 80.78, 80.76 (14C, 12C, 12xC-4, 12xC-4A), 79.62 (2C, 2xC-2A), 73.7 (2C, C-7, C-8), 73.2 (12C, 12xC-3), 72.7 (2C, 2xC-3A), 72.2 (1C, C-9*), 72.0, 71.9, 71.8, 71.6, 71.5 (26C, 12xC-2, 12xC-5, 2xC-5A), 60.1 (14C, 12xC-6, 2xC-6A), 31.2 (1C, C-7*), 30.9 (1C, C-8*).

TOF-HRMS (ESI+) calculated for $[C_{102}H_{155}INaO_{74}]^+$: 2713.7308, found: 2713.7302.

Example 2: Synthesis of Various Cyclodextrin Dimers as Scavengers—Synthesis of 'NORD' Compounds (N1-3)

1-(Allyloxy)-2.6-bis($2'^A$-{$3'^A$,$6'^A$-di-O-acetyl-hexakis-[2',3'6'-tri-O-acetyl]-cyclomalto-heptaosoxy}-methyl)-benzene N5

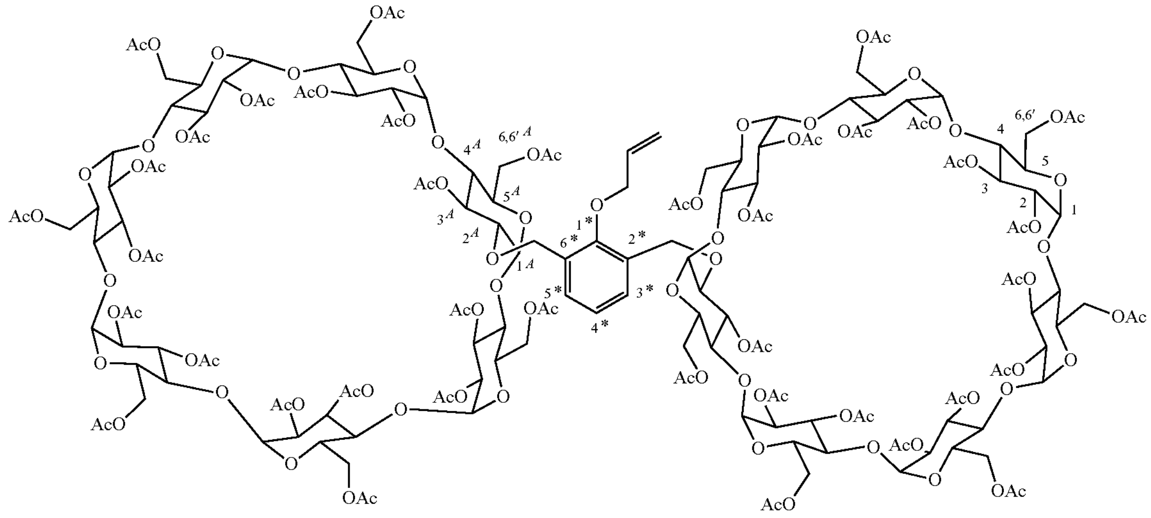

In a 100 mL flask under an argon atmosphere, b-cyclodextrin (2.27 g, 2 mmol, 2 eq.) was dissolved in 30 mL of anhydrous DMSO. The medium was heated to 55° C., then sodium hydroxide (800 mg, 20 mmol, 20 eq.) was added to the medium once all of the cyclodextrin was dissolved. Half an hour later, 1-(allyloxy)-2.6-bis(bromomethyl)benzene (320 mg, 1 mmol, 1 eq.), dissolved in 10 mL anhydrous DMSO, was added dropwise to the medium for 5 mmo. After two hours of stirring at 55° C., the medium was allowed to return to RT. Then the medium was transferred dropwise to 1 L acetone with vigorous stirring. The precipitate obtained was recovered by filtration on a Büchner funnel. The precipitate was rinsed with 200 mL acetone. The precipitate was dried under high vacuum (vane pump). In a 100 mL flask under an argon atmosphere, the dried product was dissolved in freshly distilled pyridine (23.4 mL, 289 mmol). The medium was cooled by an ice bath. Then, acetic anhydride (23.4 mL, 248 mmol) was added dropwise to the medium. The medium was allowed to return to RT and left to stir for 4 d. The reaction was stopped by evaporating the solvents under high vacuum (vane pump). The crude product was dissolved in 400 mL dichloromethane. The organic phase obtained was successively washed with 200 mL water, 200 mL of a saturated aqueous ammonium chloride solution, 200 mL of a saturated sodium chloride solution, then dried over sodium sulphate, filtered, and concentrated under reduced pressure. The residue was purified on 600 mL silica gel using a mixture of cyclohexane and acetone as eluents (1/1, 10/11, 5/6 v/v) to provide the product in the form of a white solid (576 mg, 140 μmol, yield=14% in 2 steps).

Rf 0.41 (Acetone/Cyclohexane, 1/1, v/v).

RMN $^1$H (300 MHz, $CDCl_3$) δ 7.27 (d, J=7.5 Hz, 2H, H-3*, H-5*), 7.11 (t, J=7.5 Hz, 1H, H-4*), 6.02 (ddt, J=17.2, 10.3, 5.1 Hz, 1H, OCH2CH═CH2), 5.43 (d large, J=17.2 Hz, 1H, OCH2CH═CH2), 5.38-5.15 (m, 15H, 12×H-3, 2×H-3A, OCH2CH═CH2), 5.10 (d, J=3.9 Hz, 2H, 2×H-1), 5.08 (d, J=3.9 Hz, 2H, 2×H-1), 5.07-5.02 (m, 6H, 6×H-1), 5.01 (d, J=4.1 Hz, 2H, 2×H-1), 4.89 (d, J=2.6 Hz, 2H, 2×H-1A), 4.84-4.63 (m, 14H, 12×H-2, OCH2benz), 4.63-4.38 (m, 14H, 14×H-6), 4.44 (d, J=12.1 Hz, OCH2benz), 4.38-4.04 (m, 28H, 14×H-6', 12×H-5, OCH2CH═CH2), 4.04-3.94 (m, 2H, 2×H-5), 3.78-3.61 (m, 12H, 12×H-4), 3.60 (t, J=9.8 Hz, 2H, 2×H-4A), 3.33 (dd, J=10.1, 2.8 Hz, 2H, 2×H-2A), 2.11, 2.09, 2.07, 2.06, 2.05, 2.04, 2.03, 2.02 (s, 102H, 34×COCH3), 1.99 (s, 12H, 4×COCH3), 1.76 (s, 6H, 2×COCH3).

RMN $^{13}$C (75 MHz, $CDCl_3$) δ 171.1, 171.0, 170.82, 170.79, 170.77, 170.63, 170.59, 170.52, 170.50, 170.46, 170.4, 170.2, 169.6, 169.47, 169.46, 169.42, 169.2 (40C, 40×COCH3), 154.5 (C1*), 133.4 (OCH2CH═CH2), 131.0 (2C, C-2*, C-6*), 129.4 (2C, C-3*, C-5*), 124.6 (C-4*), 117.6 (OCH2CH═CH2), 98.0 (2C, 2×C-1A), 97.2, 97.1, 97.0, 96.7, 96.6, 96.5 (12C, 12×C-1), 78.5, 78.4 (4C, 2×C-4, 2×C-2A), 77.4 (2C, C-4A), 77.0, 76.6, 76.2 (12C, 12×C-4), 75.6 (OCH2CH═CH2), 72.8 (2C, 2×C-3A), 71.6, 71.0, 70.9, 70.8, 70.69, 70.65, 70.5, 70.3, 70.0, 69.8, 69.63, 69.57, 69.51, 69.4, 69.3 (38C, 12×C-3, 12×C-2, 14×C-5), 67.3 (2C, 2×OCH2benz), 63.0, 62.6, 62.4 (14C, 14×C-6), 21.1, 21.0, 20.8, 20.5 (40C, 40×COCH3).

TOF-HRMS (ESI+) calculated for $[C_{175}H_{230}NaO_{111}]^+$: 4130.2251, found: 4130.2378.

2.6-Bis($2'^{A}$-{$3'^{A}$,$6'^{A}$-di-O-acetyl-hexakis-[2',3',6'-tri-O-acetyl]-cyclomalto-heptaosoxy}-methyl)phenol N6

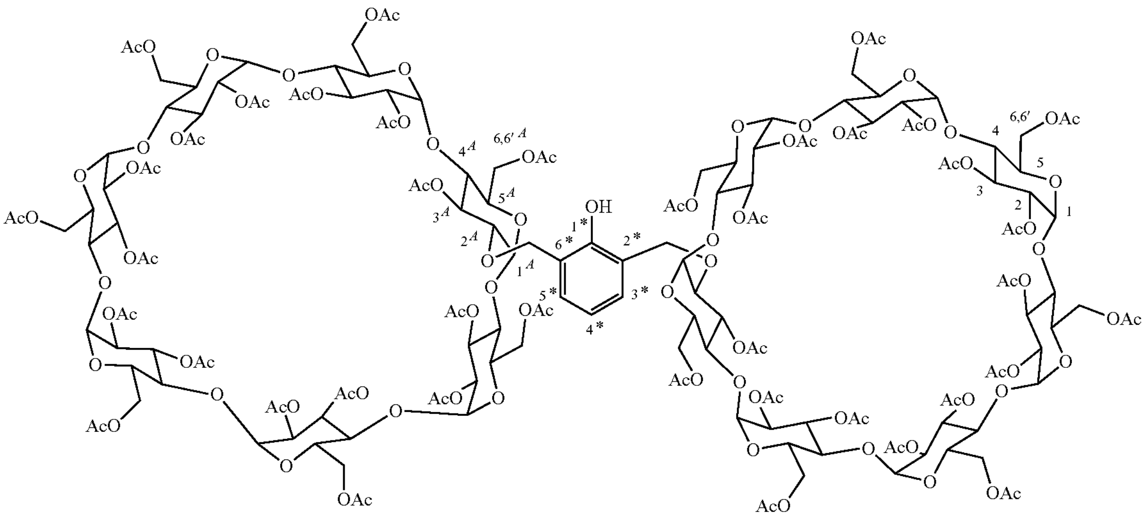

In a 50 mL flask under an argon atmosphere, compound N5 (928 mg, 225 μmol, 1 eq.) was dissolved in 17 mL of anhydrous THF. The medium was degassed for 10 min under an argon flow. Then, tetrakis(triphenylphosphine) palladium (78.3 mg, 68 μmol, 0.3 eq.) and dimethylbarbituric acid (351 mg, 2.25 mmol, 10 eq.) were added to the medium. The medium was then brought to reflux. Following one hour of stirring at 75° C., the medium was allowed to return to RT, and the reaction was stopped by adding 12.5 mL of a saturated aqueous sodium bicarbonate solution. The medium was extracted with 170 mL ethyl acetate. The organic phase obtained was washed three times with 17 mL water, 25 mL of a saturated sodium chloride solution, dried over anhydrous sodium sulphate, filtered, and concentrated under reduced pressure. The residue was purified on 200 mL silica gel using a mixture of acetone and cyclohexane as eluents (1/1, 11/10, 6/5, v/v) to provide the product (784 mg, 192.6 μmol, yield=86%) in the form of a yellow solid.

Rf 0.39 (Acetone/Cyclohexane, 6/4, v/v).

RMN $^{1}H$ (300 MHz, $CDCl_3$) δ 7.12 (d, J=7.5 Hz, 2H, H-2*, H-3*), 6.89 (s, 1H, OH phenolic), 6.85 (t, J=7.5 Hz, 1H, H-4*), 5.40-5.16 (m, 14H, 12×H-3, 2×H-3A), 5.11 (d, J=4.2 Hz, 2H, 2×H-1), 5.09 (d, J=4.0 Hz, 2H, 2×H-1), 5.06 (d, J=3.3 Hz, 2H, 2×H-1), 5.04 (d, J=4.0 Hz, 2H, 2×H-1), 4.99 (d, J=4.0 Hz, 2H, 2×H-1), 4.91 (d, J=2.9 Hz, 2H, 2×H-1A), 4.86-4.68 (m, 12H, 12×H-2), 4.68 (d, J=12.8 Hz, 2H, CH2benz), 4.62-4.43 (m, 16H, 12×H-6, 2×H-6A, CH2benz), 4.43-4.18 (m, 14H, 12×H-6', 2×H-6A'), 4.18-3.94 (m, 14H, 12×H-5, 2×H-5A), 3.78-3.62 (m, 12H, 12×H-4), 3.59 (t, J=9.4 Hz, 2H, 2×H-4A), 3.38 (dd, J=10.1, 2.9 Hz, 2H, 2×H-2A), 2.11, 2.10, 2.09, 2.07, 2.05, 2.04, 2.02, 1.99 (s, 114H, 38×COCH3), 1.87 (s, 6H, 2×COCH3).

RMN $^{13}C$ (75 MHz, $CDCl_3$) δ170.99, 170.95, 170.83, 170.81, 170.63, 170.59, 170.54, 170.49, 170.43, 170.35, 169.7, 169.5, 169.43, 169.40 (40C, 40×COCH3), 153.5 (C-1*), 129.4 (2C, C-3*, C-5*), 123.74 (2C, C-2*, C-6*), 120.3 (C-4*), 97.8 (2×C-1A), 97.2, 97.0, 96.7, 96.5 (12C, 12×C-1), 78.4 (2C, 2×C-4), 78.0 (2C, 2×C-2A), 77.7 (2C, 2×C-4A), 77.4, 77.0, 76.7, 76.4, 76.1 (10C, 10×C-4), 72.4, 71.5, 71.0, 70.9, 70.7, 70.5, 70.2, 69.8, 69.7, 69.6, 69.5 (40C, 12×C-4, 2×C-4A, 12×C-2, 12×C-5, 2×C-5A), 69.3 (2C, 2×CH2benz), 62.9, 62.6 (14C, 12×C-6, 2×C-6A), 20.97, 20.95, 20.9, 20.6 (40C, 40×COCH3).

TOF-HRMS (ESI+) calculated for $[C_{175}H_{230}NaO_{111}]^{+}$: 4090.1937, found: 4090.1980.

Methyl 5-{[2.6-Bis($2'^{A}$-{$3'^{A}$,$6'^{A}$-di-O-acetyl-hexakis-[2',3',6'-tri-O-acetyl]-cyclomalto-heptaosoxy}methyl)phenoxy]methyl}-2-iodobenzoate N7

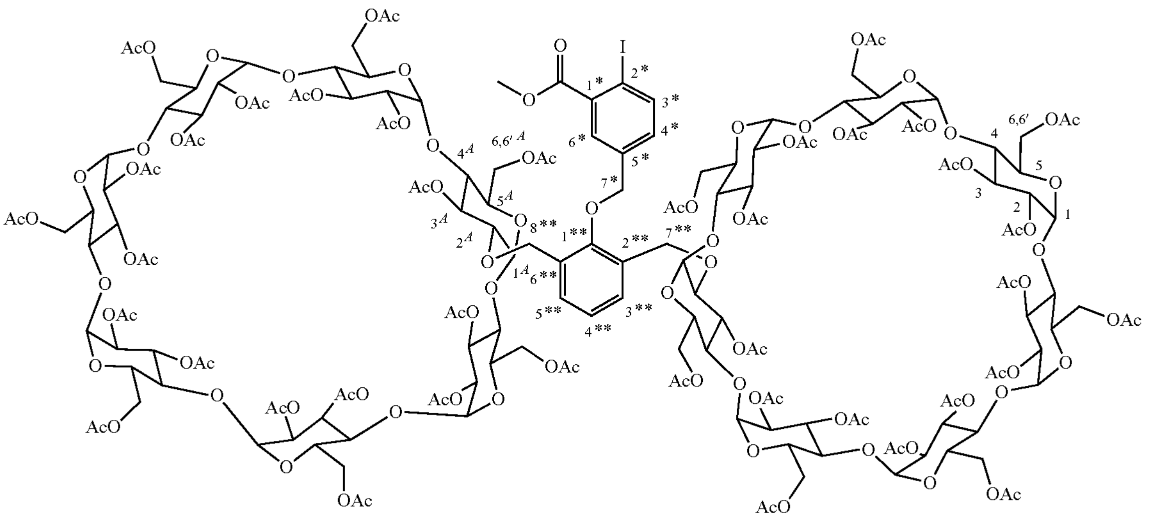

In a 50 mL flask under an argon atmosphere, compound N6 (240 mg, 59 µmol, 1 eq.) was dissolved in 10.5 mL of distilled acetone. Then, methyl 5-(bromomethyl)-2-iodobenzoate (42 mg, 118 µmol, 2 eq.) was added to the medium, followed by potassium carbonate (32.6 mg, 236 µmol). The medium was heated to 60° C. After 16 h of stirring at 60° C., the medium was allowed to return to RT. The solid was extracted by filtration. The filtrate was concentrated under reduced pressure. The residue was purified on 50 mL silica gel using a mixture of cyclohexane and acetone as eluents (1/1, v/v) to provide the product in the form of a cream-white solid (191 mg, 44 µmol, yield=75%).

Rf 0.39 (Acetone/Cyclohexane, 6/4, v/v).

$^{1}H$ NMR (300 MHz, $CDCl_3$) δ 8.01 (d, J=8.1 Hz, 1H, H-3*), 7.81 (d, J=1.8 Hz, 1H, H-6*), 7.34 (d, J=7.6 Hz, 2H, H-3, H-5), 7.22 (dd, J=8.1, 1.8 Hz, 1H, H-4*), 7.18 (d, J=7.6 Hz, 1H, H-4**), 5.40-5.16 (m, 14H, 14×H-3), 5.10 (d, J=3.5 Hz, 4H, 4×H-1), 5.08 (d, J=1.8 Hz, 2H, 2×H-1), 5.07-5.03 (m, 4H, 4×H-1), 5.00 (d, J=4.0 Hz, 2H, 2×H-1), 4.88 (d, J=2.8 Hz, 2H, 2×H-$1^{A}$), 4.85-4.62 (m, 14H, 12×H-2, H-7*, H-7*'), 4.66 (d, J=12.5 Hz, 2H, H-7, H-8), 4.61-4.40 (m, 14H, 14×H-6), 4.44 (d, J=12.5 Hz, 2H, H-7', H-8'), 4.38-4.04 (m, 26H, 14×H-6', 12×H-5), 4.05-3.96 (m, 2H, 2×H-$5^{A}$), 3.92 (s, 3H, $OCH_3$), 3.80-3.58 (m, 12H, 12×H-4), 3.56 (t, J=8.9 Hz, 2H, 2×H-$4^{A}$), 3.31 (dd, J=10.1, 2.8 Hz, 2H, 2×H-$2^{A}$), 2.12, 2.11, 2.09, 2.08, 2.07, 2.05, 1.97, 1.96 (s, 108H, 36×$COCH_3$), 1.91 (s, 6H, 2×$COCH_3$), 1.77 (s, 6H, 2×$COCH_3$).

$^{13}C$ NMR (75 MHz, $CDCl_3$) δ 171.02, 170.97, 170.8, 170.63, 170.61, 170.55, 170.50, 170.49, 170.4, 170.3, 169.6, 169.49, 169.47, 169.44, 169.42, 169.2 (s, 40C, 40×$COCH_3$), 166.7 (1C, $COOCH_3$), 153.9 (1C, C-1**), 141.7 (1C, C-3*), 137.1, 136.1 (2C, C-1*, C-5*), 131.3 (1C, C-4*), 131.1 (2C, C-2, C-6), 129.6, 129.5 (3C, C-3, C-5, C-6*), 125.1 (1C, C-4**), 98.0 (2C, 2×C-$1^{A}$), 97.2, 97.1, 97.0, 96.7, 96.6, 96.5 (12C, 12×C-1), 93.5 (1C, C-2*), 78.4 (2C, 2×C-$2^{A}$), 78.3 (2C, 2×C_$4^{A}$), 77.7, 77.0, 76.8, 76.6, 76.2 (12C, 12×C-4), 75.3 (1C, C-7*), 72.7 (2C, 2×C-3), 71.6, 71.2, 71.0, 70.9, 70.7, 70.64, 70.55, 70.5, 70.2, 70.1, 69.7, 69.6, 69.5 (s, 38C, 12×C-3, 12×C-2, 14×C-5), 67.3 (2C, C-7, C-8), 63.0, 62.7, 62.6, 62.4 (14C, 14×C-6), 52.7 (1C, $COOCH_3$), 20.93, 20.87, 20.8, 20.6 (s, 40C, 40×$COCH_3$).

TOF-HRMS (ESI+) calculated for $[C_{181}H_{233}INaO_{113}]^+$: 4364.1428, found: 4364.1484.

Methyl 4-{[2.6-Bis(2'$^A$-{3'$^A$,6'$^A$-di-O-acetyl-hexakis-[2',3',6'-tri-O-acetyl]-cyclomalto-heptaosoxy}methyl)phenoxy]methyl}-2-iodobenzoate N8

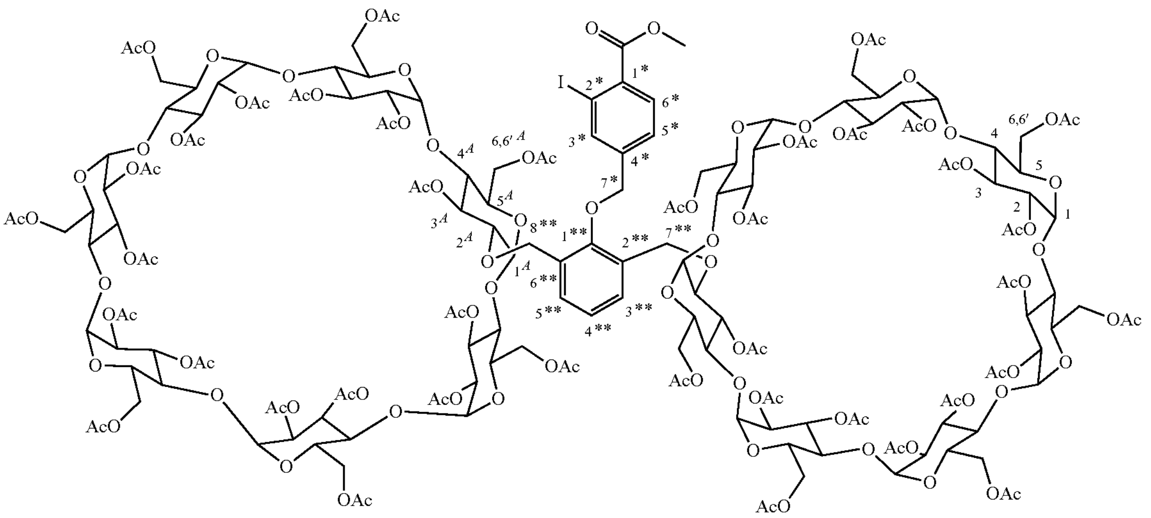

In a 50 mL flask under an argon atmosphere, compound N6 (240 mg, 59 μmol, 1 eq.) was dissolved in 10.5 mL of distilled acetone. Then, methyl 4-(bromomethyl)-2-iodobenzoate (42 mg, 118 μmol, 2 eq.) was added to the medium, followed by potassium carbonate (32.6 mg, 236 μmol). The medium was heated to 60° C. After 16 h of stirring at 60° C., the medium was allowed to return to RT. The solid was extracted by filtration. The filtrate was concentrated under reduced pressure. The residue was purified on 50 mL silica gel using a mixture of cyclohexane and acetone as eluents (1/1, v/v) to provide the product in the form of a cream-white solid (191 mg, 44 μmol, yield=75%).

Rf 0.39 (Acetone/Cyclohexane, 6/4, v/v).

$^1$H NMR (300 MHz, $CDCl_3$) δ 8.07 (s, 1H, H-3*), 7.83 (d, J=8.0 Hz, 1H, H-6*), 7.45 (d, J=8.0 Hz, 1H, H-5*), 7.34 (d, J=7.6 Hz, 2H, H-3, H-5), 7.18 (t, J=7.6 Hz, 1H, H-4**), 5.38-5.16 (m, 14H, 14×H-3), 5.10 (d, J=4.4 Hz, 2H, 2×H-1), 5.07 (d, J=4.6 Hz, 2H, 2×H-1), 5.03 (d, J=3.1 Hz, 4H, 4×H-1), 5.01 (d, J=4.2 Hz, 2H, 2×H-1), 4.91-4.62 (m, 16H, 2×H-1$^A$, H-7*, 12×H-2, H-7*'), 4.66 (d, J=12.4 Hz, 2H, H-7, H-8), 4.60-4.39 (m, 14H, 14×H-6), 4.44 (d, J=12.4 Hz, 2H, H-7', H-7'), 4.37-4.04 (m, 26H, 14×H-6', 12×H-5), 4.04-3.95 (m, 2H, 2×H-5$^A$), 3.91 (s, 3H, $OCH_3$), 3.76-3.58 (m, 10H, 10×H-4), 3.62 (t, J=9.5 Hz, 2H, 2×H-4), 3.62 (t, J=8.8 Hz, 2H, 2×H-4$^A$), 3.32 (dd, J=10.1, 2.7 Hz, 2H, 2×H-2$^A$), 2.11, 2.10, 2.08, 2.07, 2.06, 2.04, 2.02, 2.01, 1.98, 1.97 (s, 108H, 36×$COCH_3$), 1.91 (s, 6H, 2×$COCH_3$), 1.77 (s, 6H, 2×$COCH_3$).

$^{13}$C NMR (75 MHz, $CDCl_3$) δ 171.01, 170.96, 170.8, 170.62, 170.59, 170.53, 170.48, 170.46, 170.4, 170.24, 169.6, 169.5, 169.44, 169.42, 169.39, 169.2 (40C, 40×$COCH_3$), 166.4 (1C, $COOCH_3$), 153.9 (1C, C-1**), 141.8 (1C, C-4*), 139.5 (1C, C-3*), 134.9 (1C, C-1*), 131.4 (1C, C-6*), 131.1 (2C, C-2, C-6), 129.6 (2C, C-3, C-5), 126.4 (1C, C-5*), 125.1 (1C, C-4**), 98.0 (2C, 2×C-1$^A$), 97.2, 97.1, 97.0, 96.70, 96.6, 96.5 (12C, 12×C-1), 94.5 (1C, C-2*), 78.4 (2C, 2×C-2$^A$), 78.3 (2C, 2×C-4$^A$), 77.7, 77.0, 76.8, 76.5, 76.2 (12C, 12×C-4), 74.6 (1C, C-7*), 72.7 (2C, 2×C-3), 71.6, 71.2, 71.0, 70.9, 70.7, 70.6, 70.5, 70.4, 70.2 (38C, 10×C-3, 2×C-3$^A$, 12×C-2, 14×C-5), 70.01 (s), 69.68 (s), 69.55 (s), 69.44 (s), 67.3 (2C, C-7, C-8), 62.9, 62.6, 62.4 (14C, 14×C-6), 52.7 (1C, $COOCH_3$), 20.99, 20.97, 20.85, 20.6 (40C, 40×$COCH_3$).

TOF-HRMS (ESI+) calculated for $[C_{181}H_{233}INaO_{113}]$+: 4364.1428, found: 4364.1646.

Methyl 5(3-[2.6-Bis($2'^{A}$-{$3'^{A}$,$6'^{A}$-di-O-acetyl-hexakis-[2',3',6'-tri-O-acetyl]-cyclomalto-heptaosoxy) methyl)phenoxy]propyl}-2-iodobenzoate N9

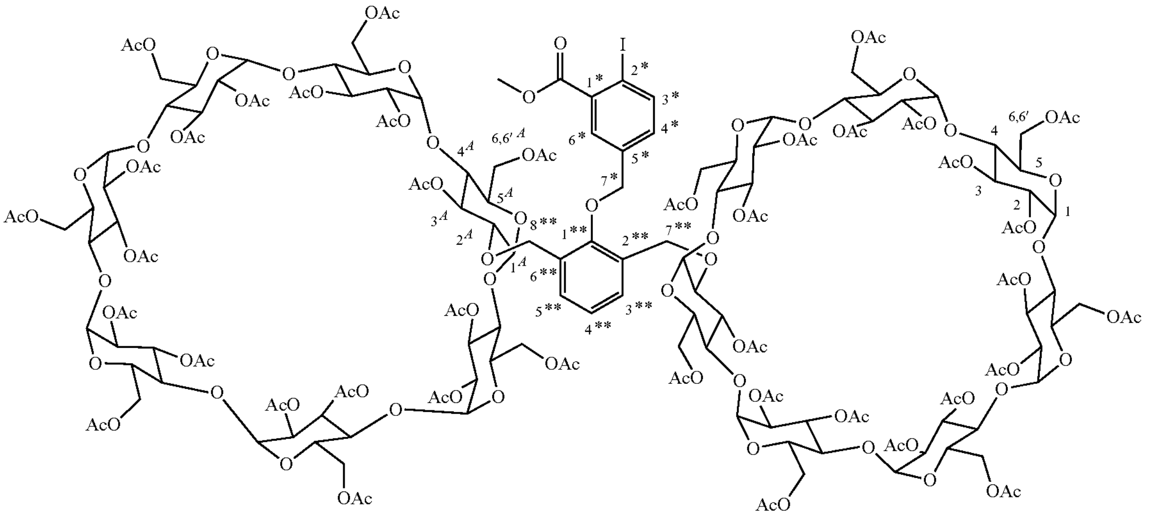

In a 50 m as under an argon atmosphere, compound N6 (254 mg, 62.4 μmol, 1 eq.) was dissolved in 11 mL of distilled acetone. Then, methyl 5-(bromopropyl)-2-iodobenzoate (47.8 mg, 125 μmol, 2 eq.) was added to the medium, followed by potassium carbonate (34.5 mg, 250 μmol). The medium was heated to 60° C. After 40 h of stirring at 60° C., the medium was allowed to return to RT. The solid was extracted by filtration. The filtrate was concentrated under reduced pressure. The residue was purified on 50 mL silica gel using a mixture of cyclohexane and acetone as eluents (1/1, v/v) to provide the product in the form of a cream-white solid (198 mg, 45.6 μmol, yield=73%).

Rf 0.41 (Acetone/Cyclohexane, 6/4, v/v).

$^{1}$H NMR (300 MHz, $CDCl_3$) δ 7.88 (d, J=8.1 Hz, 1H, H-4*), 7.63 (d, J=2.1 Hz, 1H, H-6*), 7.30 (d, J=7.6 Hz, 2H, H-3, H-5), 7.13 (t, J=7.6 Hz, 1H, H-4), 7.04 (dd, J=8.1, 2.1 Hz, 1H, H-3), 5.39-5.16 (m, 14H, 14×H-3), 5.09 (d, J=3.4 Hz, 2H, 2×H-1), 5.08 (d, J=3.9 Hz, 2H, 2×H-1), 5.07 (d, J=5.0 Hz, 2H, 2×H-1), 5.03 (d, J=3.5 Hz, 4H, 4×H-1), 5.01 (d, J=4.1 Hz, 2H, 2×H-1), 4.91 (d, J=2.2 Hz, 2H, 2×H-$1^{A}$), 4.83 (dd, J=9.4, 4.0 Hz, 2H, 2×H-2), 4.84-4.68 (m, 1 OH, 10×H-2), 4.67 (d, J=12.6 Hz, 2H, H-7, H-8), 4.61-4.41 (m, 16H, 14×H-6, H-7', H-8'), 4.38-4.20 (m, 14H, 14×H-6'), 4.20-3.95 (m, 14H, 14×H-5), 3.89 (s, 3H, $OCH_3$), 3.79-3.55 (m, 14H, 12×H-4, H-9*, H-9*'), 3.61 (t, J=9.7 Hz, 2H, 2×H-$4^{A}$), 3.32 (dd, J=10.1, 2.7 Hz, 2H, 2×H-$2^{A}$), 2.80 (dd, J=8.0, 7.6 Hz, 2H, H-7*, H-7*'), 2.18-1.92 (m, 116H, 38×$COCH_3$, H-8*, H-8*'), 1.79 (s, 6H, 2×$COCH_3$).

$^{13}$C NMR (75 MHz, $CDCl_3$) δ 170.99, 170.96, 170.79, 170.77, 170.61, 170.58, 170.52, 170.47, 170.45, 170.4, 170.2, 169.54, 169.46, 169.43, 169.42, 169.38, 169.2 (40C, 40×$COCH_3$), 167.0 (1C, $COOCH_3$), 154.1 (1C, C-1**), 141.48, 141.45 (2C, C-3*, C-1*), 135.6 (1C, C-5*), 132.8 (1C, C-4*), 130.98 (2C, C-2, C-6), 130.92 (1C, C-6*), 129.0 (2C, C-3, C-5), 124.6 (1C, C-4**), 97.99 (2C, 2×C-$1^{A}$), 97.2, 97.1, 97.0, 96.7, 96.6, 96.5 (12C, 12×C-1), 91.0 (1C, C-2*), 78.4 (2C, 2×C-$2^{A}$), 78.3 (2C, 2×C-$4^{A}$), 77.8, 77.0, 76.8, 76.5, 76.2 (12C, 12×C-4), 74.0 (1C, C-9*), 72.8, 71.6, 71.1, 71.0, 70.8, 70.7, 70.6, 70.4, 70.2, 70.0, 69.7, 69.6, 69.5, 69.4 (40C, 14×C-3, 12×C-2, 14×C-5), 67.2 (2C, C-7, C-8), 63.0, 62.6, 62.4 (14C, 14×C-6), 52.6 (1C, $COOCH_3$), 31.8, 31.7 (2C, C-8*, C-7*), 21.0, 20.90, 20.87, 20.8, 20.6 (40C, 40×$COCH_3$).

TOF-HRMS (ESI+) calculated for $[C_{133}H_{237}INaO_{113}]^+$: 4392.1741, found: 4392.1943.

5-({2.6-Bis[2'$^{A}$-cyclomalto-heptaosoxymethyl] phenoxy}methyl)-2-iodosylbenzoic acid N1

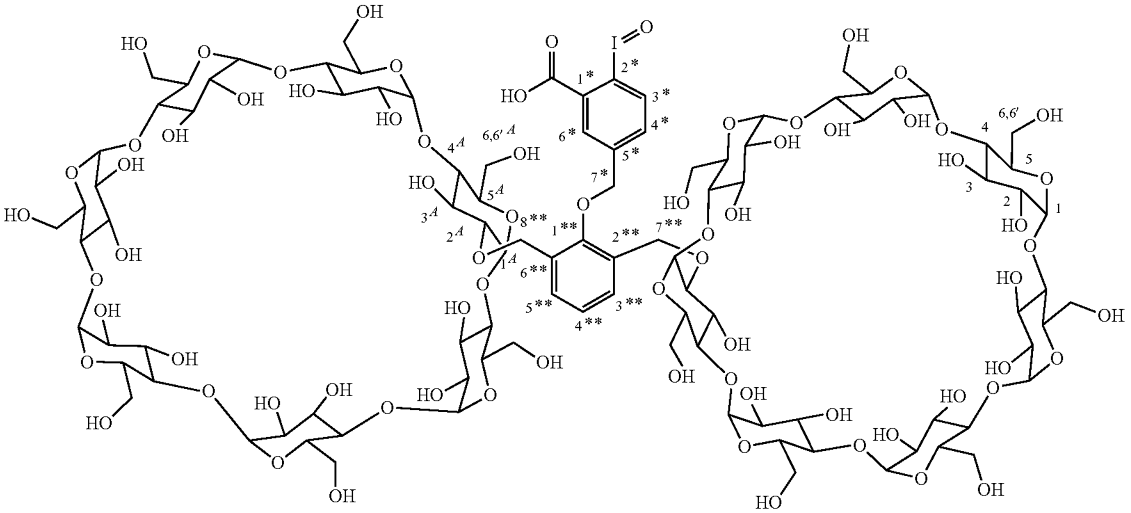

In a test tube heated by water bath at 45° C., compound N7 (170 mg, 39.1 μmol, 1 eq.) was dissolved in 1.6 mL glacial acetic acid, then 1.6 mL water was added. Finally, sodium periodate (836 mg, 3.91 mmol, 100 eq.) was added. The medium was left to be stirred at 45° C. for 19 h. The medium was then diluted in 5 mL MilliQ water. It was then extracted three times with 25 mL ethyl acetate. The organic phases were combined, washed with 30 mL of a saturated aqueous sodium bicarbonate solution, 30 mL of a saturated aqueous sodium chloride solution, dried over anhydrous sodium sulphate, filtered, and concentrated under reduced pressure. The crude product obtained was purified on silica gel (20 mL) using a mixture of cyclohexane and acetone as eluents (4/1-0/1, v/v) to provide a partially deacetylated white product. In a 50 mL flask, this product was suspended in 10 mL MilliQ water. Then, soda (66 mg, 1.67 mmol, 57 eq.) was added to the suspension. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution. The solution obtained was deposited on 4.5 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3, v/v). The product (67 mg, 25.1 μmol, yield=64%) was obtained in the form of a white solid following lyophilisation of the fractions containing the product.

RMN $^{1}$H (600 MHz, $D_2O$) δ 8.29 (s, 1H, H-6*), 8.20 (d, J=8.4 Hz, 1H, H-3*), 7.93 (d, J=8.4 Hz, 1H, H-4*), 7.53 (d, J=7.7 Hz, 2H, H-3, H-5), 7.30 (t, J=7.7 Hz, 1H, H-4**), 5.33 (s, 2H, H-7*), 5.13 (d, J=10.7 Hz, 2H, H-8, H-7), 5.07 (d, J=3.8 Hz, 2H, 2xH-1), 5.06 (d, J=4.1 Hz, 2H, 2xH-1), 5.05-5.03 (m, 4H, 2xH-1, 2xH-1A), 5.02 (d, J=3.8 Hz, 2H, 2xH-1), 5.01 (d, J=4.0 Hz, 2H, 2xH-1), 4.99 (d, J=3.7 Hz, 2H, 2xH-1), 4.67 (d, J=10.7 Hz, 2H, H-8', H-7'), 4.00 (t, J=9; 4 Hz, 2H, 2xH-3A), 3.96 (t, J=9; 5 Hz, 2H, 2xH-3), 3.93-3.73 (m, 50H, 10xH-3, 12xH-5, 2xH-5A, 12xH-6, 10xH-6', 2xH-6A, 2xH-6'$^{A}$), 3.71 (dd, J=12.6, 4.7 Hz, 2H, 2xH-6'), 3.67-3.46 (m, 26H, 12xH-2, 2xH-2A, 10xH-4, 2xH-4A), 3.43 (t, J=9.3 Hz, 2H, 2xH-4).

RMN $^{13}$C (151 MHz, $D_2O$) δ 170.7 (1C, COO), 156.2 (1C, C-1**), 140.4 (1C, C-5*), 134.0 (1C, C-3*), 132.6 (2C, C-3, C-5), 130.7 (1C, C-1*), 130.43 (2C, C-2, C-6), 130.1 (1C, C-6*), 125.8 (1C, C-4*), 125.5 (1C, C-4**), 118.75 (C-2*), 102.0, 101.9, 101.84, 101.82, 101.7, 101.5 (12C, 12xC-1), 100.0 (2C, 2xC-1A), 81.43, 81.38, 81.2, 81.1, 81.04, 80.99, 80.9 (14C, 12xC-4, 2xC-4A), 79.3 (2C, 2xC-2A), 75.6 (1C, C-7*), 73.2, 73.11, 73.07, 73.01, 72.97, 72.85 (14C, 12xC-3, 2xC-3A), 72.1, 72.0, 71.94, 71.92, 71.84, 71.79, 71.76, 71.69, 71.6, 71.5, 71.3 (26C, 12xC-2, 12xC-5, 2xC-5A), 69.3 (2C, C-7, C-8), 60.23, 60.15 (14C, 12xC-6, 2xC-6A).

TOF-HRMS (ESI+) calculated for $[C_{100}H_{151}INaO_{74}]^{+}$: 2685.6995, found: 2685.7061.

4-({2.6-Bis[2'A-cyclomalto-heptaosoxymethyl] phenoxy}methyl)-2-iodosylbenzoic acid N2

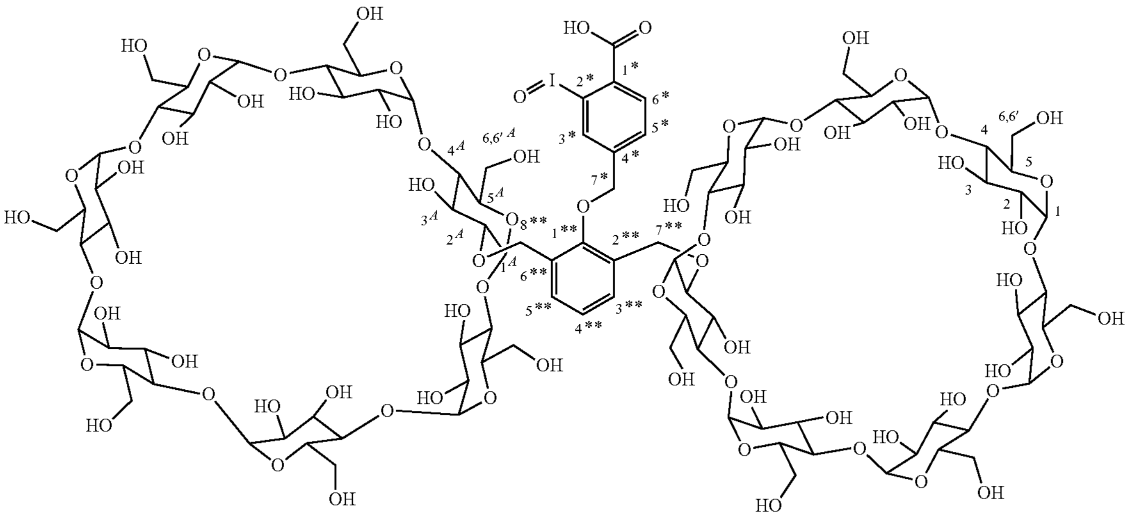

In a test tube heated by water bath at 45° C., compound N8 (150 mg, 34.5 μmol, 1 eq.) was dissolved in 1.5 mL glacial acetic acid, then 1.5 mL water was added. Finally, sodium periodate (738 mg, 3.45 mmol, 100 eq.) was added. The medium was left to be stirred at 45° C. for 19 h. The medium was then diluted in 5 mL MilliQ water. It was then extracted three times with 25 mL ethyl acetate. The organic phases were combined, washed with 30 mL of a saturated aqueous sodium bicarbonate solution, 30 mL of a saturated aqueous sodium chloride solution, dried over anhydrous sodium sulphate, filtered, and concentrated under reduced pressure. The crude product obtained was purified on silica gel (20 mL) using a mixture of cyclohexane and acetone as eluents (5/6-0/1, v/v) to provide a partially deacetylated white product. In a 50 mL flask, this product was suspended in 10 mL MilliQ water. Then, soda (49 mg, 1.21 mmol, 57 eq.) was added to the suspension. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution. The solution obtained was deposited on 4.5 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3, v/v). The product (48 mg, 18 μmol, yield=52%) was obtained in the form of a white solid following lyophilisation of the fractions containing the product.

RMN $^1$H (600 MHz, $D_2O$) δ 8.24 (d, J=7.7 Hz, H-6*), 8.14 (s, 1H, H-5*), 7.83 (s, 1H, H-2*), 7.51 (d, J=7.6 Hz, 2H, H-3, H-5), 7.28 (t, J=7.6 Hz, 1H, H-4**), 5.29 (d, J=13.1 Hz, 1H, H-7*), 5.19 (d, J=11.0 Hz, 2H, H-7, H-8), 5.07 (d, J=3.9 Hz, 2H, 2xH-1), 5.06 (d, J=3.4 Hz, 2H, 2xH-1), 5.05 (d, J=3.8 Hz, 2H, 2xH-1), 5.04 (d, J=4.1 Hz, 2H, 2xH-1), 5.03 (d, J=3.5 Hz, 2H, 2xH-1), 5.02 (d, J=3.1 Hz, 2H, 2xH-1), 5.01-4.99 (m, 1H, H-7*), 4.94 (d, J=3.2 Hz, 2H, 2xH-1A), 4.69 (d, J=11.0 Hz, 2H, H-7', H-8'), 4.04-3.74 (m, 56H, 12xH-3, 2xH-3A, 12xH-5, 2xH-5A, 12xH-6, 12xH-6', 2xH-6A, 2xH-6'A), 3.68-3.44 (m, 28H, 12xH-2, 2xH-2A, 12xH-4, 2xH-4A).

RMN $^{13}$C (75 MHz, $D_2O$) δ 170.6 (1C, COO), 156.0 (1C, C-1**), 145.7 (1C, C-4*), 139.9 (1C, C-1*), 132.6 (2C, C-3, C-5), 131.6 (1C, C-6*), 130.1 (2C, C-2, C-6), 129.1 (1C, C-5*), 127.4 (1C, C-3*), 125.2 (1C, C-4**), 120.2 (C-2*), 102.0, 101.9, 101.7, 101.4 (12C, 12xC-1), 99.9 (2C, 2xC-1A), 81.4, 81.2, 81.1, 80.9, 80.7, 80.5 (14C, 12xC-4, 2xC-4A), 79.2 (2C, 2xC-2A), 74.6 (1C, C-7*), 73.3, 73.2, 73.12, 73.08, 73.00, 72.7 (14C, 12xC-3, 2xC-3A), 72.1, 72.03, 71.96, 71.9, 71.82, 71.75, 71.7, 71.6, 71.46, 71.44 (26C, 12xC-2, 12xC-5, 2xC-5A), 69.8 (2C, C-7, C-8), 60.3, 60.23, 60.19, 60.1 (14C, 12xC-6, 2xC-6A).

TOF-HRMS (ESI+) calculated for $[C_{100}H_{151}INaO_{74}]^+$: 2685.6995, found: 2685.7073.

5-({2.6-Bis[2'$^A$-cyclomalto-heptaosoxymethyl] phenoxy}propyl)-2-iodosylbenzoic acid S3

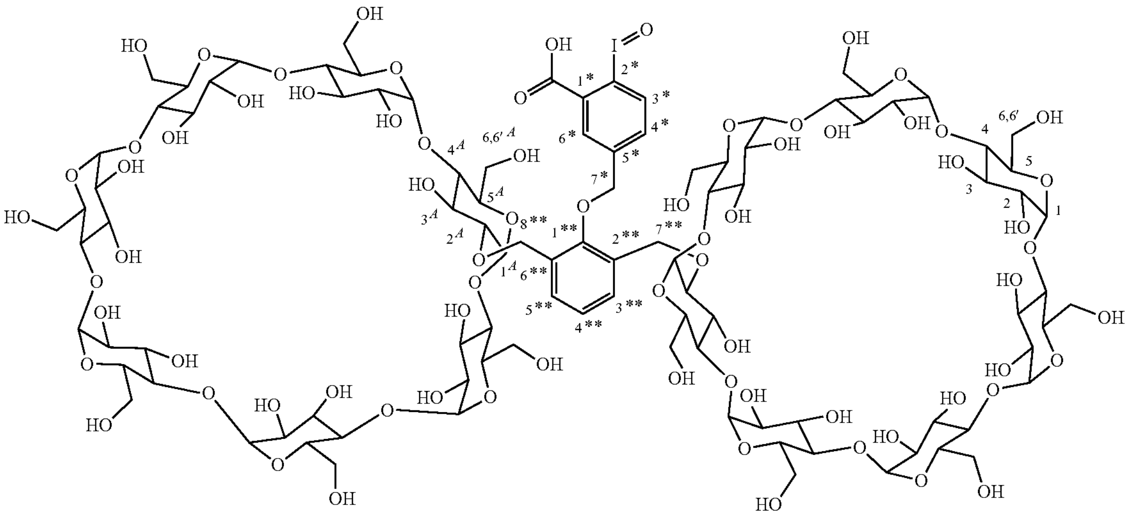

In a test tube heated by water bath at 45° C., compound N9 (166 mg, 38 μmol, 1 eq.) was dissolved in 1.6 mL glacial acetic acid, then 1.6 mL water was added. Finally, sodium periodate (812 mg, 3.8 mmol, 100 eq.) was added. The medium was left to be stirred at 45° C. for 19 h. The medium was then diluted in 5 mL MilliQ water. It was then extracted three times with 25 mL ethyl acetate. The organic phases were combined, washed with 30 mL of a saturated aqueous sodium bicarbonate solution, 30 mL of a saturated aqueous sodium chloride solution, dried over anhydrous sodium sulphate, filtered, and concentrated under reduced pressure. In a 50 mL flask, the resultant crude product was suspended in 10 mL MilliQ water. Then, soda (89 mg, 2.22 mmol, 57 eq.) was added to the suspension. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution. The solution obtained was deposited on 4.5 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3, v/v). The product (83 mg, 30.8 μmol, yield=81%) was obtained in the form of a white solid following lyophilisation of the fractions containing the product.

RMN $^1$H (600 MHz, $D_2O$) δ 8.01 (s large, 1H, H-6*), 7.88 (d large, J=7.9 Hz, 1H, H-3*), 7.82 (d, J=7.9 Hz, 1H, H-4*), 7.51 (d, J=7.6 Hz, 2H, H-3, H-5), 7.26 (t large, J=7.6 Hz, 1H, H-4), 5.12 (d, J=11.2 Hz, 2H, H-7, H-8), 5.07 (d, J=3.7 Hz, 2H, 2xH-1), 5.09-4.97 (m, 14H, 10xH-1, 2xH-1A, H-7', H-8'**), 4.10-4.03 (m, 2H, 2xH-3), 4.00 (t, J=9.2 Hz, 2H, 2xH-3A), 3.97-3.65 (m, 54H, 10xH-3, 12xH-5, 2xH-5A, 12xH-6, 12xH-6', 2xH-6A, 2xH-6'A, 2xH-9*), 3.70-3.37 (m, 28H, 12xH-2, 2xH-2A, 12xH-4, 2xH-4A), 3.14-2.97 (m, 2H, 2xH-7*), 2.47-2.32 (m, 2H, 2xH-8*).

RMN $^{11}$C (151 MHz, $D_2O$) δ 170.3 (1C, COOH), 155.9 (1C, C-1**), 145.3 (1C, C-5*), 134.0 (1C, C-3*), 132.0 (2C, C-3, C-5), 131.3 (1C, C-6*), 130.80 (1C, C-1*), 130.2 (2C, C-2, C-6), 125.6 (1C, C-4*), 125.1 (1C, C-4**), 116.33 (1C, C-2*), 101.9, 101.8, 101.7, 101.6 (12C, 12xC-1), 100.22 (2C, 2xC-1A), 81.2, 81.02, 80.95, 80.9, 80.8 (14C, 12xC-4, 2xC-4A), 79.6 (2C, 2xC-2A), 73.23, 73.19, 73.13, 72.92 (14C, 12xC-3, 2xC-3A), 72.32 (1C, C-9*), 72.01, 71.99, 71.92, 71.90, 71.84, 71.80, 71.76, 71.7, 71.6, 71.5, 71.4 (26C, 12xC-5, 2xC-5A, 12xC-2), 69.2 (2C, C-7, C-8), 60.11 (14C, 12xC-6, 2xC-6A), 31.3 (1C, C-7*), 31.1 (1C, C-8*).

TOF-HRMS (ESI+) calculated for $[C_{102}H_{155}INaO_{74}]^+$: 2713.7308, found: 2713.7341.

Example 3: Synthesis of Various Cyclodextrin Dimers as Scavengers—Hydroxamic Acid Compounds 1-(Azomethyl)-3,5-bis($2^{IA}$-{$3^{IA}$,$6^{IA}$-di-O-acetyl-hexakis-[2',3',6'-tri-O-acetyl]-cyclomalto-heptaosoxy}-methyl)-benzene AH5

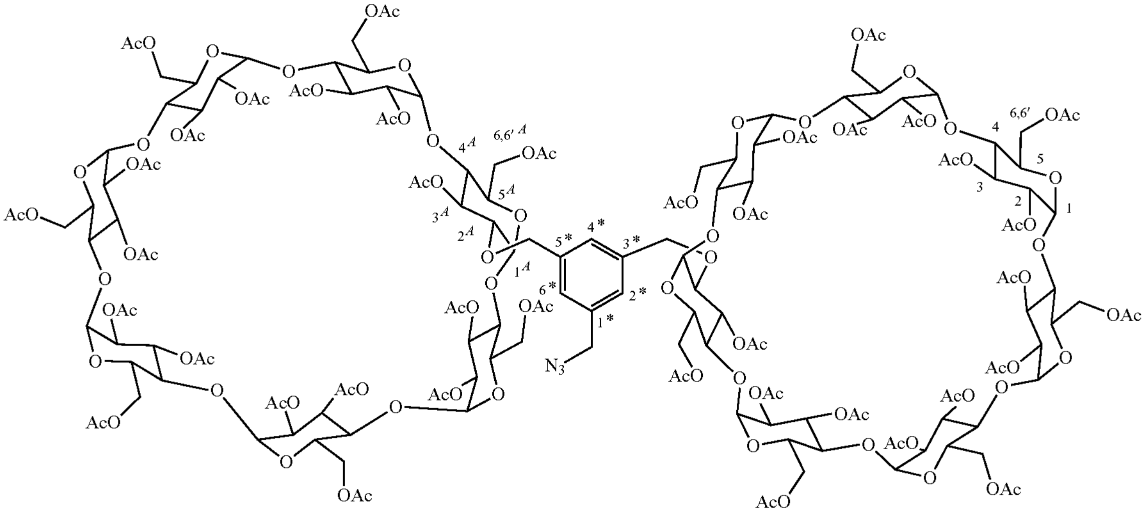

In a 100 mL flask under an argon atmosphere, b-cyclodextrin (1,844 g, 1,625 mmol, 2 eq.) was dissolved in 22 mL of anhydrous DMSO. The medium was heated to 55° C., then sodium hydroxide (0.65 g, 16.25 mmol, 20 eq.) was added to the medium once all of the cyclodextrin was dissolved. An hour later, 1-(azomethyl)-3,5-bis(bromomethyl)benzene (260 mg, 812 mmol, 1 eq.), dissolved in 8 mL anhydrous DMSO, was added dropwise to the medium for 5 min. The medium was left to be stirred at 55° C. for 2 h. After the medium was allowed to return to RT, it was transferred dropwise into 1.65 L acetone with vigorous stirring. The precipitate obtained was recovered by filtration on a Büchner funnel. The precipitate was washed twice with 300 mL acetone. The precipitate was dried under high vacuum (vane pump). In a 100 mL flask under an argon atmosphere, the dried product was dissolved in anhydrous pyridine (23.4 mL, 289 mmol). The medium was cooled by an ice bath. Then, acetic anhydride (23.4 mL, 248 mmol) was added dropwise to the medium. It was allowed to return to RT and left to stir for 4 d. The solvents were evaporated under high vacuum (vane pump). The medium was dissolved in 200 mL ethyl acetate and 100 mL water. The organic phase was recovered, and the aqueous phase was extracted with 2×100 mL ethyl acetate. The organic phases were combined, washed with 100 mL of a saturated ammonium chloride solution and 100 mL brine, dried over sodium sulphate, filtered, and concentrated under reduced pressure. The residue was purified on 500 mL silica gel using a mixture of cyclohexane and acetone as eluents (1/1, v/v) to provide the product (642 mg, 156 μmol, yield=19%) in the form of a white solid.

Rf 0.14 (Acetone/Cyclohexane, 1/1, v/v).

RMN $^{1}H$ (300 MHz, $CDCl_3$) δ 7.22 (s, 2H, H-2*, H-6*), 7.02 (s, 1H, H-4*), 5.40-5.17 (m, 14H, 12×H-4, 2×H-4A), 5.13-5.00 (10H, 10×H-1), 4.98 (d, J=3.9 Hz, 2H, 2×H-1), 4.91-4.81 (m, 4H, 2×H-1A, 2×H-2), 4.81-4.66 (m, 10H, 10×H-2), 4.65-4.38 (m, 19H, 2×CH2BenzO, 12×H-6, 2×H-6A, 1×CH2N3), 4.37-4.16 (m, 15H, 1×CH2N3,12×H-6', 2×H-6'A), 4.16-3.96 (m, 14H, 12×H-5, 2×H-5A), 3.78-3.63 (m, 12H, 12×H-4), 3.59 (dd, J=11.5, 7.6 Hz, 2H, 2×H-4A), 3.34 (dd, J=10.1, 2.8 Hz, 2H, 2×H-2A), 2.10, 2.09, 2.08, 2.06, 2.04, 2.03, 2.01, 1.99, 1.97 (s, 114H, 38×COCH3), 1.80 (s, 6H, 2×COCH3).

RMN $^{13}C$ (75 MHz, $CDCl_3$) δ 171.0, 170.9, 170.8, 170.57, 170.55, 170.49, 170.46, 170.4, 170.3, 169.6, 169.5, 169.4, 169.2 (40C, 40×COCH3), 138.8 (2C, C-3*, C-5*), 136.6 (C-1*), 126.7 (C-2*, C-6*), 126.1 (C-4*), 98.2 (2C, C-1A), 97.2, 97.1, 96.9, 96.7, 96.6, 96.5 (12C, 12×C-1), 78.6 (2C, 2×C-4), 78.4 (2C, 2×C-2A), 77.8 (2C, 2×C-4A), 77.4, 76.9, 76.6, 76.2 (10C, 10×C-4), 72.7 (2C, 2×C-3A), 72.5 (2C, 2×CH2benz), 71.4, 71.0, 70.8, 70.7, 70, 70.23, 70.20, 69.7, 69.6, 69.5 (38C, 12×C-3, 12×C-2, 12×C-5, 2×C-5A), 62.9, 62.6, 62.4 (14C, 12×C-6, 2×C-6A), 54.4 (CH2N3), 20.94, 20.91, 20.82, 20.77, 20.6 (40C, 40×COCH3).

TOF-HRMS (ESI+) calculated for $[C_{173}H_{227}N_3Na_2O_{110}]^{2}$+: 2076.1028, found: 2076.1035.

Methyl 6-((benzyloxy)carbamoyl)picolinate

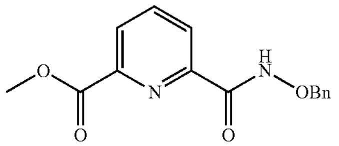 [SMILES: COC(=O)c1cccc(C(=O)NOCc2ccccc2)n1]

In a 50 mL flask under an argon atmosphere O-benzylhydroxyamine hydrochloride (907 mg, 5.68 mmol, 1 eq.), 6-(methoxycarbonyl)picolinic acid (1.03 g, 5.68 mmol, 1 eq.), and 2-(1H-benzotriazole-1-yl)-1,1,3,3-tetramethyluronium tetrafluoroborate (1.83 g, 5.68 mmol, 1 eq.) were suspended in 9 mL of anhydrous dichloromethane. Then, diisopropylethylamine (3 mL, 17.06 mmol, 3 eq.) was added dropwise to the medium. Following 16 h of stirring at RT, the solvents were evaporated. The residue was quickly purified on 200 mL silica gel using a mixture of ethyl acetate and cyclohexane containing three drops of triethylamine as eluents (100/400, 150/350, 250/250, v/v) to provide the product (796 mg, 2.78 mmol, yield=49%) in the form of a white solid.

Rf 0.29 (Ethyl acetate/Cyclohexane, 1/1, v/v).

RMN $^1H$ (300 MHz, $CDCl_3$) δ δ 10.9 (s, 1H, NH), 8.34 (d, J=7.8 Hz, 1H, H-5), 8.20 (d, J=7.8 Hz, 1H, H-3), 7.99 (t, J=7.8 Hz, 1H, H-4), 7.50-7.44 (m, 2H, Haromatics), 7.41-7.30 (m, 3H, Haromatics), 5.06 (s, 2H, OCH2), 3.96 (s, 3H, OCH3).

RMN $^{13}C$ (75 MHz, $CDCl_3$) δ 164.9 (CO2CH3), 161.2 (CONH), 149.6 (C-2), 146.5 (C-6), 138.8 (C-4), 135.3 (Cqaromatic), 129.4 (2C, 2×CHaromatics), 128.8 (CHaromatic), 128.6 (2C, 2×CHaromatics), 127.7 (C-3), 125.7 (C-5), 78.7 (CH2benzylic), 53.1 (CO2CH3).

HRMS (ESI+) calculated for $[C_{15}H15N_2O_4]^+$: 287.1031, found: 287.1032.

6-((Benzyloxy)carbamoyl)picolinic acid

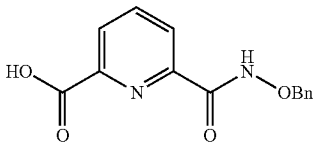 [SMILES: O=C(O)c1cccc(C(=O)NOCc2ccccc2)n1]

In a 50 mL flask, methyl6-((benzyloxy)carbamoyl)picolinate (796 mg, 2.78 mmol, 1 eq.) was dissolved in 24 mL methanol, then soda (111 mg, 2.78 mmol, 1 eq.) was added, followed by 8 mL water. The medium was heated to reflux (app. 88° C.) for 17 h. The medium was allowed to return to RT. The solvents were evaporated under reduced pressure. The crude product was purified on 90 mL silica gel using a mixture of ethyl acetate, isopropanol, and water (120/80/10, v/v/v) to provide the product in the form of a light-pink solid (605 mg, 2.22 mmol, yield=80%).

RMN $^1H$ (300 MHz, MeOD) δ 8.24 (d, J=7.6 Hz, 1H, H-5), 8.15 (d, J=7.6 Hz, 1H, H-3), 8.06 (t, J=7.6 Hz, 1H, H-5), 7.55-7.45 (d, J=6.2 Hz, 2H, Haromatics), 7.44-7.29 (m, 3H, Haromatics), 5.02 (s, 2H, OCH2).

RMN $^{11}C$ (75 MHz, MeOD) δ 170.5 (COOH), 163.6 (CONH), 152.6 (C-2), 149.7 (C-6), 139.8 (C-4), 136.9 (Cqaromatic), 130.4 (2C, 2×CHaromatics), 129.7 (CHaromatic), 129.5 (2C, 2×CHaromatics), 128.10 (C-3), 124.9 (C-5), 79.4 (CH2benzylic).

HRMS (ESI-) calculated for $[C_{14}H_{11}N_2O_4^-$: 271.0719, found: 271.0722.

N2-(3,5-bis(2'A-{3'A,6'A-di-O-acetyl-hexakis-[2',3',6'-tri-O-acetyl]-cyclomalto-heptaosoxy}-methyl))-N-benzyloxypvridine-2,6-dicarboxamide AH6

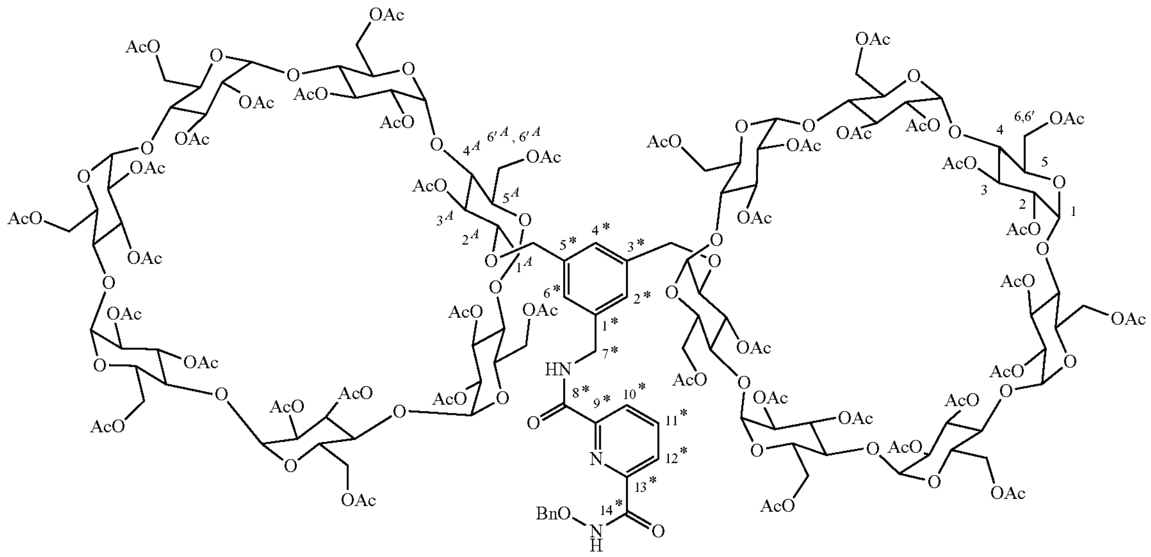

In a 25 mL flask under an argon atmosphere, product AH5 (200 mg, 48.7 mmol, 1 eq.) was dissolved in 12 mL methanol and 4 mL toluene. After the mixture was purged 3 times with argon, palladium on carbon (10 mass %, 52 mg, 48.7 μmol, 1 eq.) was added to the reaction medium. After the medium was again purged with argon, the reaction medium was purged 3 times with hydrogen. After 16 h of stirring at RT, the reaction was stopped by purging with argon. The medium was filtered over Celite©, which was rinsed with 20 mL methanol. The filtrate was concentrated under reduced pressure to provide the hydrogenation product (189 mg, 46.2 μmol, 95%) in the form of a white solid. In a 10 mL flask under an argon atmosphere, 6-((benzyloxy)carbamoyl)picolinic acid (28 mg, 95 μmol) and chlorotripyrrolidinophosphonium hexafluorophosphate (52 mg, 123 μmol) were dissolved in 1 mL of anhydrous dimethylformamide. Then, diisopropylethylamine (40 μL, 229 μmol) was added to the medium. Following 3 h of stirring at RT, the hydrogenation product (185 mg, 45 μmol) and diisopropylethylamine (23 μL, 136 μmol) dissolved in 1.5 mL of anhydrous dimethylformamide were added dropwise to the medium. Following 16 h of stirring at RT, the solvents were evaporated under reduced pressure (vane pump). The residue was purified on 40 mL silica gel using a mixture of dichloromethane and methanol as eluents (99/1, 49/1, 39/1, v/v) to provide the product (101 mg, 23.2 μmol, yield=51%) in the form of a colourless solid.

Rf 0.17 (Dichloromethane/Methanol, 97/3, v/v).

RMN $^1H$ (300 MHz, $CDCl_3$) δ 10.78 (s large, 1H, NHOBn), 8.75 (s large, 1H, NHCH2benz), 8.34 (d, J=7.7

Hz, 1H, H-12*), 8.28 (d, J=7.7 Hz, 1H, H-10*), 8.03 (t, J=7.7 Hz, 1H, H-11*), 7.52-7.42 (m, 2H, 2×Haromatics), 7.39-7.27 (m, 5H, 3×Haromatics, H-6*, H-2*), 7.00 (s, 1H, H-4*), 5.44-5.18 (m, 14H, 12×H-3, 2×H-3A), 5.14-5.01 (m, 12H, 10×H-1, NOCH2Ph), 4.99 (d, J=3.3 Hz, 2H, 2×H-1), 4.91-4.61 (m, 15H, 2×H-1A, 12×H-2, 1×CH2NH), 4.61-4.40 (m, 19H, 1×CH2NH, 12×H-6, 2×H-6A, 2×CH2Benz), 4.40-4.18 (m, 14H, 12×H-6', 2×H-6A'), 4.18-4.00 (m, 14H, 12×H-5, 2×H-5A), 3.80-3.53 (m, 14H, 12×H-4, 2×H-4A), 3.32 (d large, J=9.2 Hz, 2H, 2×H-2A), 2.10, 2.07, 2.06, 2.04, 2.03, 2.00, 1.98 (s, 114H, 38×COCH3), 1.80 (s, 6H, 2×COCH3).

RMN $^{13}C$ (75 MHz, $CDCl_3$) δ 171.2, 171.02, 170.95, 170.9, 170.81, 170.77, 170.58, 170.55, 170.5, 170.4, 169.60, 169.55, 169.53, 169.51, 169.46 (40C, 40×COCH3), 163.8 (C-8*), 161.5 (C-14*), 148.9 (C-13*), 148.2 (C-9*), 139.8 (C-1*), 139.2 (C-11*), 138.5 (2C, C-3*, C-5*), 135.3 (Cqaromatic), 129.6 (2C, CHaromatics), 128.9 (CHaromatics), 128.6 (2C, CHaromatics), 126.8 (2C, C-2*, C-6*), 125.7 (C-4*), 125.24, 125.18 (2C, C-10*, C-12*), 98.5 (2C, 2×C-1A), 97.4, 97.2, 96.9, 96.7, 96.6 (12C, 12×C-1), 78.8 (2C, 2×C-4), 78.7 (CH2ONH), 78.5 (2C, 2×C-2A), 77.9 (2C, 2×C-4A), 76.9, 76.7, 76.4, 76.3 (10C, 10×C-4), 73.0 (2C, 2×C-3A), 72.9 (2C, 2×CH2benz), 71.2, 71.1, 71.0, 70.8, 70.7, 70.6, 70.4, 70.3, 70.2, 70.1, 70.0, 69.9, 69.7, 69.3, 69.5 (38C, 12×C-3, 12×C-2, 12×C-5, 2×C-5A), 62.9, 62.8, 62.7, 62.6, 62.5 (14C, 12×C-6, 2×C-6A), 43.5 (C-7*), 21.0, 20.9, 20.8, 20.7 (40C, 40×COCH3).

TOF-HRMS (ESI+) calculated for [$C_{187}H_{23}9N_3Na_2O1_{13}$] 2'$^{0}$: 2190.1421, found: 2190.1411.

N$^2$-(3,5-bis(2'$^A$-{3'$^A$,6'$^A$-di-O-acetyl-hexakis-[2',3',6'-tri-O-acetyl]-cyclomalto-heptaosoxy}-methyl))-N$^6$-hydroxypyridine-2,6-dicarboxamide AH7

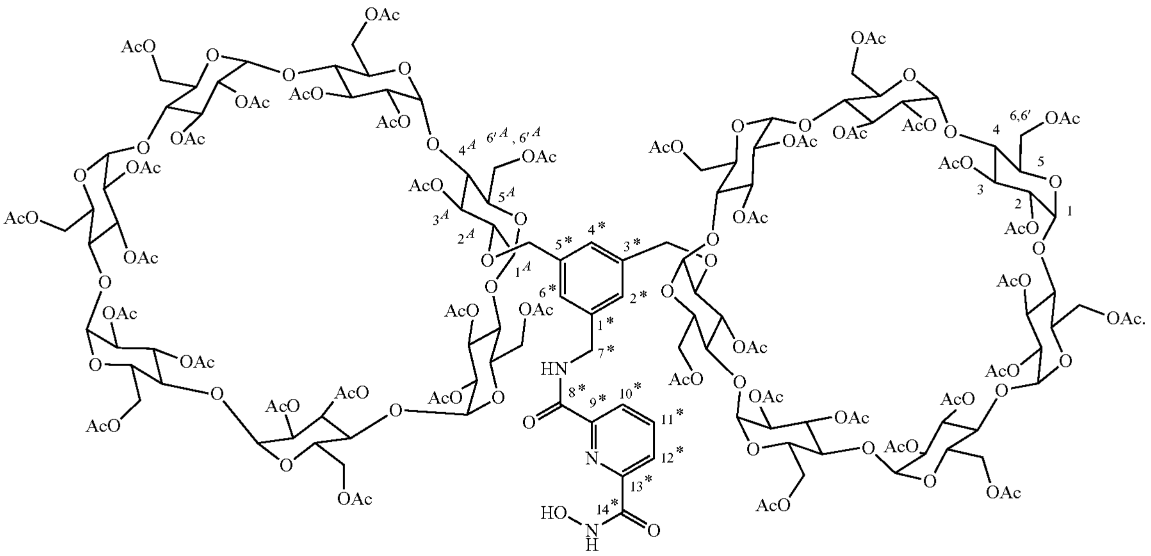

In a 50 mL flask, compound AH6 (250 mg, 60 μmol, 1 eq.) was dissolved in a mixture of 13 mL methanol and 9 mL toluene. The medium was purged with argon, then palladium on carbon (10 mass %, 127 mg, 120 μmol, 2 eq.) was added. The medium was again purged with argon, then 3 times with hydrogen. The reaction was stopped by purging with argon. The reaction medium was filtered over Celite©, which was rinsed with a mixture of dichloromethane and methanol. The filtrate was concentrated under reduced pressure. The crude product was purified on 25 mL silica gel using a mixture of dichloromethane and methanol as eluents (99/1, 98/2, 97/3, 96/4, 95/5, v/v) to provide the product (100 mg, 23.5 mg, yield=39%) in the form of a white solid.

Rf 0.50 (Dichloromethane/Methanol, 95/5, v/v).

RMN $^{1}H$ (300 MHz, $CDCl_3$) δ 11.55 (s large, 1H, NHOBn), 9.36 (t large, J=5.9 Hz, 1H, NHCH2benz), 8.31 (d, J=7.8 Hz, 1H, H-12*), 8.26 (d, J=7.0 Hz, 1H, H-10*), 8.01 (t, J=7.8 Hz, 2H, H-11*), 7.33 (s, 2H, H-6*, H-2*), 6.94 (s, 1H, H-4*), 5.42-5.19 (m, 14H, 12×H-3, 2×H-3A), 5.14-5.04 (m, 10H, 10×H-1), 5.02 (d, J=3.9 Hz, 2H, 2×H-1), 4.95 (d, J=2.9 Hz, 2H, 2×H-1A), 4.83 (dd, J=3.9, 9.6 Hz, 2H, 2×H-2), 4.81-4.70 (m, 10H, 10×H-2), 4.69-4.43 (m, 20H, CH2NH, 12×H-6, 2×H-6A, 2×CH2Benz), 4.39-4.23 (m, 14H, 12×H-6', 2×H-6A'), 4.23-4.05 (m, 14H, 12×H-5, 2×H-5A), 3.82-3.66 (m, 12H, 12×H-4), 3.63 (t, J=9.4 Hz, 2H, 2×H-4A), 3.39 (dd, J=10.1, 3.0 Hz, 2H, 2×H-2A), 2.24-1.97 (m, 108H, 36×COCH3), 1.92 (s, 6H, 2×COCH3), 1.72 (s, 6H, 2×COCH3).

RMN $^{13}C$ (75 MHz, $CDCl_3$) δ 170.7, 170.53, 170.48, 170.4, 170.2, 170.03, 170.01, 169.97, 169.90, 169.86, 169.81, 169.76 (40C, 40×COCH3), 163.8 (C-8*), 160.7 (C-14*), 149.0 (C-13*), 148.3 (C-9*), 138.7 (C-1*), 138.5 (C-11*), 138.3 (2C, C-3*, C-5*), 126.5 (2C, C-2*, C-6*), 125.0, 124.6 (2C, C-10*, C-12*), 123.9 (C-4*), 98.9 (2C, 2×C-1A), 97.4, 97.0, 96.8, 96.64, 96.6 (12C, 12×C-1), 78.6 (2C, 2×C-2A), 78.5 (2C, 2×C-4A), 78.1-76.1 (peaks hidden by deuterated chloroform, 12C, 12×C-4), 73.05 (2C, 2×CH2benz), 72.9 (2C, 2×C-3A), 71.9-68.7 (38C, 12×C-3, 12×C-2, 12×C-5, 2×C-5A), 62.9, 62.7, 62.6, 62.53, 62.46 (14C, 12×C-6, 2×C-6A), 43.2 (C-7*), 20.9, 20.8, 20.7, 20.6 (40C, 40×COCH3).

TOF-HRMS (ESI+) calculated for [$C_{180}H_{233}N_3Na_2O_{113}$]$^{2+}$:2145.1182, found: 2145.1179.

$N^2$-(3,5-Bis($2^{\prime A}$-cyclomalto-hetaosoxymethyl)-$N^6$-hydroxypyridine-2,6-dicarboxamide AH8

TOF-HRMS (ESI+) calculated for $[C_{100}H_{153}N_3Na_2O_{73}]^{2+}$: 1304.9073, found: 1304.9053.

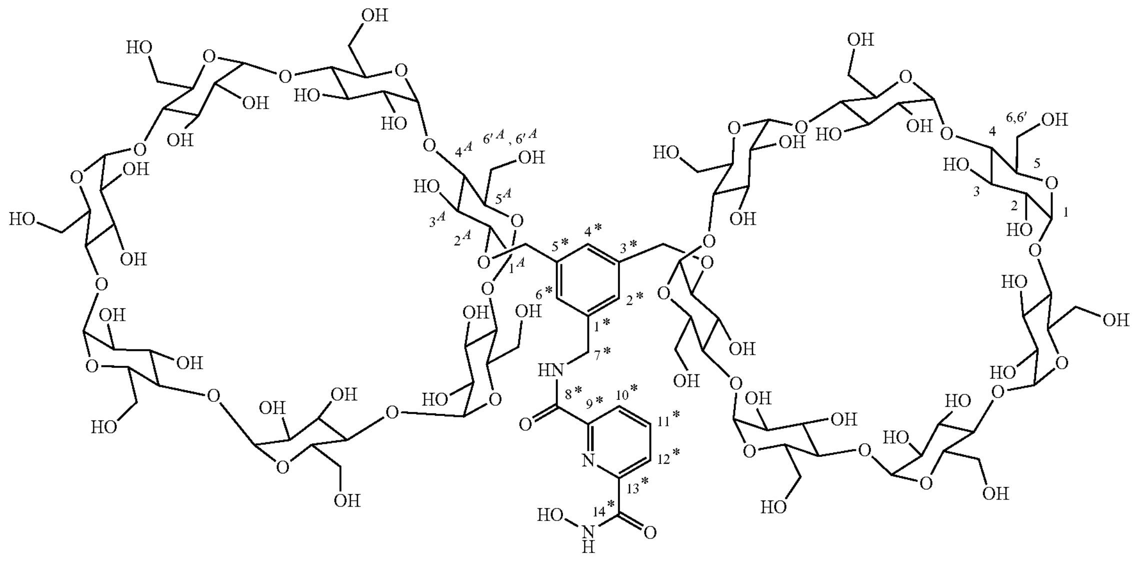

In a 50 mL flask, compound AH7 (106 mg, 25 μmol, 1 eq.) was suspended in 10 mL MilliQ water. Then, soda (60 mg, 1.5 mmol, 60 eq.) was added to the medium. The reaction medium was left to stir at RT for 16 h (solution pH 10-11). The reaction was stopped by adding glacial acetic acid (pH adjusted to 7). The solution was diluted with 10 of a 25 mM aqueous ammonium hydrogen carbonate solution (0.988 mg in 0.5 L MilliQ water). The medium was deposited on 3.6 g silica gel (ZEOPREP C18). The column was eluted with a gradient of a 25 mM aqueous solution of ammonium hydrogen carbonate and acetonitrile (50 mL fraction, I/O, 95/5, 9/1, 85/15, 8/2, 75/25, 7/3). The product (43 mg, 16.7 μmol, 67%) was obtained in the form of a white solid following lyophilisation.

RMN $^1H$ (600 MHz, $D_2O$) δ 8.23 (s, 1H, H-12*), 8.21 (s, 1H, H-10*), 8.01 (s large, 1H, H-11*), 7.58 (s, 2H, H-2*, H-6*), 7.56 (s, 1H, H-4*), 5.16 (d, J=2.3 Hz, 10H, 10×H-1), 5.07 (d, J=3.6 Hz, 2H, 2×H-1), 5.04 (d, J=1.4 Hz, 2H, 2×H-1A), 4.96 (d, J=11.8 Hz, 2H, 2×Hbenz), 4.90 (d, J=11.8 Hz, 2H, 2×Hbenz), 4.91-4.86 (m, 1H, H-7), 4.65 (d, J=14.4 Hz, 1H, H-7'), 4.21 (t, J=9.5 Hz, 2H, 2×H-3A), 4.09-4.02 (m, 8H, 8×H-3), 4.02-3.78 (m, 46H, 12×H-6, 12×H-6', 2×H-6A, 2×H-6'A, 4×H-3, 12×H-5, 2×H-5A), 3.78-3.71 (m, 10H, 10×H-2), 3.71-3.58 (m, 14H, 8×H-4, 2×H-4A, 2×H-2A, 2×H-2), 3.61 (t, J=9.0 Hz, 2H, 2×H-4), 3.43 (t, J=9.5 Hz, 2H, 2×H-4).

RMN $^{13}C$ (151 MHz, $D_2O$) δ 165.8 (1C, C-14*), 161.2 (1C, C-8*), 148.3, 148.0 (2C, C-13*, C-9*), 139.9 (1C, C-11*), 139.1 (1C, C-1*), 137.9 (2C, C-3*, C-5*), 128.7 (2C, C-2*, C-6*), 128.1 (1C, C-4*), 124.6, 124.4 (2C, C-10*, C-12*), 102.00, 101.98, 101.94, 101.88 (12C, 12×C-1), 100.3 (2C, 2×C-1A), 81.7, 81.4, 81.32, 81.30, 81.25, 81.22 (14C, 12×C-4, 2×C-4A), 79.6 (2C, 2×C-2A), 73.8 (2C, 2×CH2benz), 73.3, 73.2, 73.14, 73.10, 73.0 (10C, 10×C-3), 72.5 (2C, 2×C-3A), 72.24, 72.21, 72.13, 72.08, 71.90, 71.85, 71.68, 71.64 (28C, 2×C-3, 12×C-2, 12×C-5, 2×C-5A), 60.5, 60.40, 60.37, 60.3 (14C, 12×C-6, 2×C-6A), 43.0 (1C, C-7*).

Example 4: Relative Efficacy of Various Scavengers as Determined by UV-Visible Spectrophotometric Monitoring of the Hydrolysis of Methyl Paraoxon Preparation of the Stock Solutions (1) A 20.62 mM phosphate buffer solution (pH 7.65) was prepared by dissolving 2.93 g of anhydrous disodium phosphate in 1 L MilliQ water. The pH was adjusted to 7.65 with a phosphoric acid solution and checked with a pH meter.

(2) A 13.4 mM cetyltrimethylammonium chloride solution containing 3% v/v of dimethylsulphoxide in a phosphate buffer solution was prepared by dissolving 2.144 g of the product in 200 mL of the solution prepared in (1), then adding 15 mL dimethylsulphoxide. The volume was brought up to 500 mL using the solution prepared in (1).

(3) A solution of 16.67 mM methyl paraoxon in methanol was prepared by dissolving 41.18 mg methyl paraoxon in 10 mL of anhydrous methanol. This solution was stored in a sealed flask and kept at −20° C.

(4) 2.5 mM solutions of cyclodextrin derivatives in a phosphate buffer solution were prepared by dissolving 10 μmol of each compound in 4 mL of the solution prepared in (2).

Monitoring the Hydrolysis Kinetics of Methyl Paraoxon

The hydrolysis hydrolysis of methyl paraoxon was monitored on a Varian® Cary 50 single-beam UV-visible spectrophotometer at a constant temperature of 25° C.

(5) A 1 mM solution of cyclodextrin derivative in a phosphate buffer solution was prepared by diluting 1.6 mL of the solution prepared in (4) in 2.4 mL of the solution prepared in (2).

(6) A 0.5 mM solution of cyclodextrin derivative in a phosphate buffer solution was prepared by diluting 0.8 mL of the solution prepared in (4) in 3.2 mL of the solution prepared in (2).

(7) A 0.25 mM solution of cyclodextrin derivative in a phosphate buffer solution was prepared by diluting 0.4 mL of the solution prepared in (4) in 3.6 mL of the solution prepared in (2).

(8) 30 μL of the solution prepared in (3) was added to 970 μL of the solution prepared in (5). The final concentrations of cyclodextrin derivative and methyl paraoxon were 1 mM and 0.5 mM, respectively. The hydrolysis of methyl paraoxon was measured for 30 min by monitoring the release of the para-nitrophenol leaving group at a wavelength of λ=400 nm. Each experiment was carried out 3 times.

(9) 30 μL of the solution prepared in (3) was added to 970 μL of the solution prepared in (6). The final concentrations of cyclodextrin derivative and methyl paraoxon were 0.5 mM. The hydrolysis of methyl paraoxon was measured for 30 min by monitoring the release of the para-nitrophenol leaving group at a wavelength of λ=400 nm. Each experiment was carried out 3 times.

(10) 30 μL of the solution prepared in (3) was added to 970 μL of the solution prepared in (7). The final concentrations of cyclodextrin derivative and methyl paraoxon were 0.25 mM and 0.5 mM, respectively. The hydrolysis of methyl paraoxon was measured for 30 min by monitoring the release of the para-nitrophenol leaving group at a wavelength of λ=400 nm. Each experiment was carried out 3 times.

(11) 30 μL of the solution prepared in (3) was added to 970 v of the solution prepared in (2). The final methyl paraoxon concentration was 0.5 mM. The spontaneous hydrolysis of methyl paraoxon was measured for 30 min by monitoring the release of the para-nitrophenol leaving group at a wavelength of A=400 nm. Each experiment was carried out 3 times.

(12) The absorption values obtained in (11) during the spontaneous hydrolysis of organophosphate pesticides were subtracted from those found in (8), (9), and (10).

The results are shown in FIG. 1.

The hydrolysis rate is greater when the reactive group is in the (S) position, because derivatives S1-3 are more active than their respective homologues N 1-3. This parameter appeared to be the main factor for the pesticide hydrolysis activity, because S2, the least active scavenger of the S series, is more effective than N3, the most active compound of the N series. Of the two series, S3 and N3 are respectively of greater interest than S1 and N1. The pesticide degradation rate depends on the length of the spacer arm between the benzene core and the α-nucleophilic group, with the flexibility of the spacer arm promoting better positioning in relation to the substrate. AH8, for its part, slightly accelerates the hydrolysis of methyl paraoxon.

When the scavenger concentration was divided by 2 for S3 (0.25 mM), its efficacy was nearly identical to that of de S1, which was used at a greater concentration (0.5 mM). On the other hand, doubling the concentration of S3 (1 mM) resulted in limited improvement due to the inclusion of para-nitrophenol (hydrolysis product of methyl paraoxon) in the cyclodextrin cavity. Moreover, the tests conducted with S1-S2 and N1-N2 showed that the position of the iodoso moiety had an influence on the hydrolysis process of methyl paraoxon, resulting in a greater acceleration when the iodine atom was in the para position of the spacer arm.

Example 5: Relative Efficacy of Various Scavengers as Determined by $^{31}P$ NMR Monitoring of the Hydrolysis of Dichlorvos Preparation of the Stock Solutions (1) A buffer solution of 109.9 mM tris-hydroxymethylmethylammonium chloride (TRIS·HCl) and 14.29 mM cetyltrimethylammonium chloride (CTAC) in deuterated water was prepared by dissolving 259.80 mg TRIS·HCl and 68.50 mg CTAC in 15 mL deuterated water. The pH was adjusted to 7.65 with a hydrochloric acid solution diluted in deuterated water, and checked with a pH meter.

(2) A solution of 16.67 mM dichlorvos in anhydrous methanol was prepared by dissolving 36.77 mg dichlorvos in 10 mL of anhydrous methanol. This solution was stored in a sealed flask and kept at −20° C.

Monitoring the Hydrolysis Kinetics of Methyl Paraoxon and Dichlorvos

The hydrolysis kinetics of dichlorvos were monitored using a RMN Bruker Spectrospin 300© spectrometer. The program used for the acquisition of the 31P spectrum was the N P31CPD program, which had been previously installed on the device (Fig.)

(3) 1.65 mM solutions of cyclodextrin derivatives N3 and S3 in a Tris·HCl buffer solution were prepared by dissolving 2.5 μmol of each compound in 1.47 mL of the solution prepared in (1).

(4) 455 μL of each solution prepared in (3) was added to 45 μL of the solution prepared in (2). The final concentrations of cyclodextrin derivative and dichlorvos were 1.5 mM. The hydrolysis of dichlorvos was measured every 30 min. Each NMR reading consisted of 64 scans. The NMR tubes containing the hydrolysis experiments were stored in a bath at a constant temperature of 25° C. Each experiment was carried out 3 times. The signal at −3.23 ppm was that of $^{31}P$ in dichlorvos, the signal 3.25 ppm that of dimethylphosphate (hydrolysis product of phosphates).

An analysis of the commercially available source of dichlorvos used for the dosages showed a single signal at 3.25 ppm in Tris-HCl buffer in $D_2O$ (pH 7.65, 25° C.). In the presence of scavenger S3, a second signal at 3.85 ppm, which was attributed to dimethyl phosphate (HO)P(O)$(OCH_3)_2$, was detected after 30 min. The relative amount of this hydrolysis product increased progressively with a concomitant decrease in the amount of dichlorvos. A large amount of pesticide was hydrolysed after a first rapid phase (280 min), then the reaction was continued until the initial substrate completely disappeared after 1080 min. By way of comparison, no spontaneous hydrolysis of dichlorvos was detected after 1440 min (24 h). The scavenger N3 yielded similar results, but the chemical conversion to dimethyl phosphate was slower than that previously observed, with the signal corresponding to the $^{31}P$ of dichlorvos no longer appearing after 1680 min.

Example 6: Relative Efficacy of Various Scavengers on Various Chemical Weapons G (Soman, Tabun, Cyclosarin, Sarin)

(1) The efficacy of each cyclodextrin derivative was evaluated by indirect dosage of the organophosphate substrate via an enzymatic method based on the activity of the enzyme acetylcholinesterase. By promoting the hydrolysis of the organophosphate substrate, the addition of a cyclodextrin derivate causes a partial reversal of the acetylcholinesterase inhibition by the organophosphate substrate. By remaining active, acetylcholinesterase is able to hydrolyse acetylthiocholine to thiocholine and acetic acid. The thiocholine released is dosed using the Ellman reagent (DTNB: 5,5'-dithio-bis-(2-nitrobenzoic acid)) using UV-visible spectrophotometry at 412 nm.

(2) More precisely, the method consists of first contacting the organophosphate substrate with the cyclodextrin derivative for various incubation times (10, 20, 30, 40, 50, and 60 min, respectively) at 37° C. In a second period of time, the organophosphate is placed in the presence of the enzyme acetylcholinesterase for 3 min at 37° C. Finally, acetylcholinesterase is evaluated using operating procedure DGAMNRBC 200574 S-SAT.

(3) Two control samples were also analysed. One was prepared by replacing the cyclodextrin derivative with its solvent (phosphate buffer, 0.1 M pH 7), the other using a phosphate buffer solution (0.1 M pH 7) that only contained the organophosphate substrate.

(4) The working concentrations were as follows:
organophosphate substrate: 500 nM for soman, sarin, and cyclosarin; 500 nM and 5 M for tabun.
cyclodextrin derivative: 250 M
acetylcholinesterases (from human erythrocytes, reference C-5400, Sigma Aldrich@) at 1 IU/ml in a phosphate buffer (0.1 M pH 8).

Figure 2:
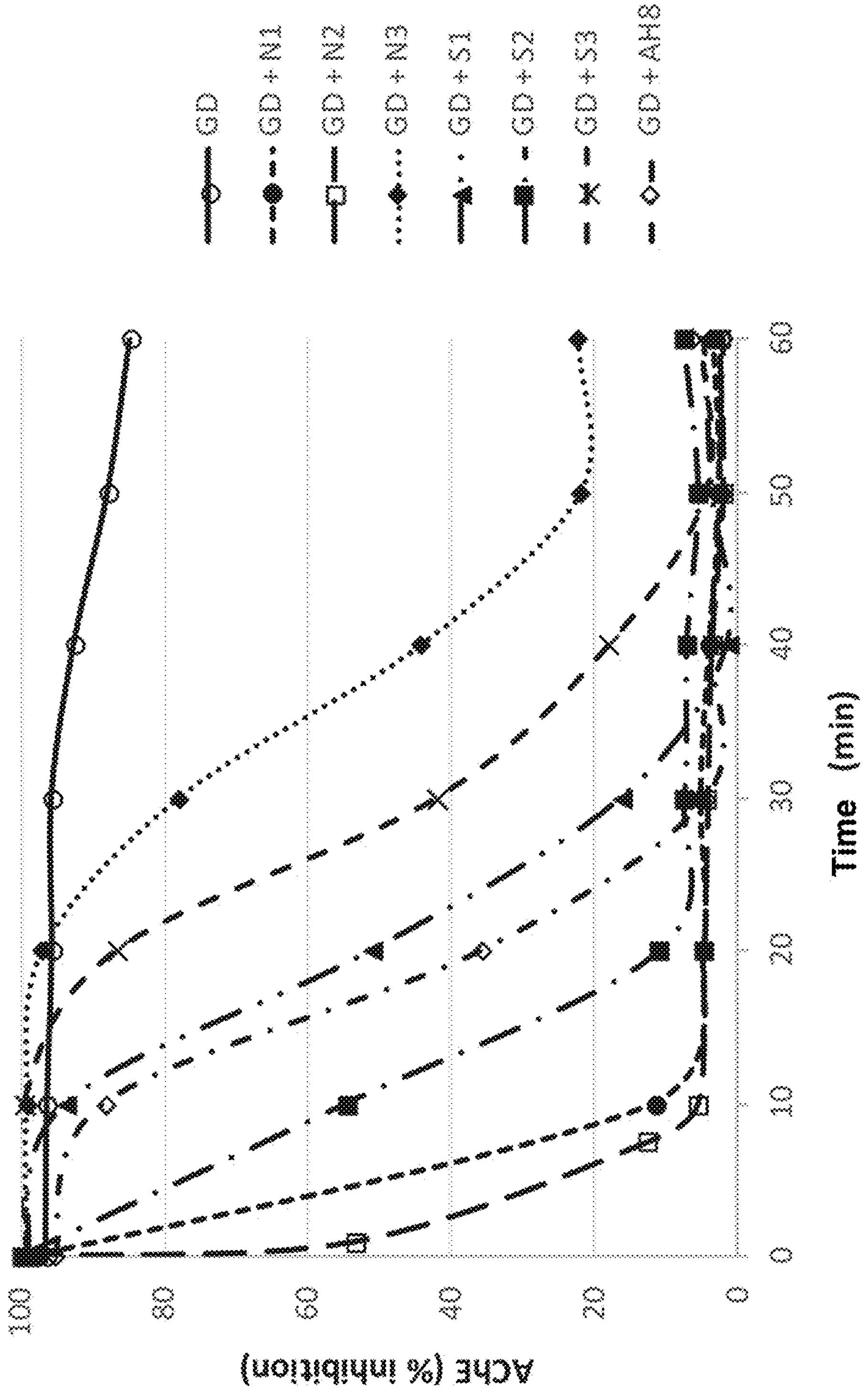
FIG. 2 shows the relative efficacy of scavengers according to the invention against soman (GD).

According to FIG. 2, with regard to efficacy against soman, the cyclodextrin derivative N2 has significant catalytic activity, because it reduces acetylcholinesterase inhibition by soman by 50% after the first minute of contact and by 95% after 10 min. The derivatives N1 and S2 are also quite active, given that they allow for a 90% decrease in acetylcholinesterase inhibition by soman after 10 and 20 min of contact, respectively. The activity of AH8 is not as rapid, because it reduces acetylcholinesterase inhibition by soman after 30 min of contact.

Figure 3:
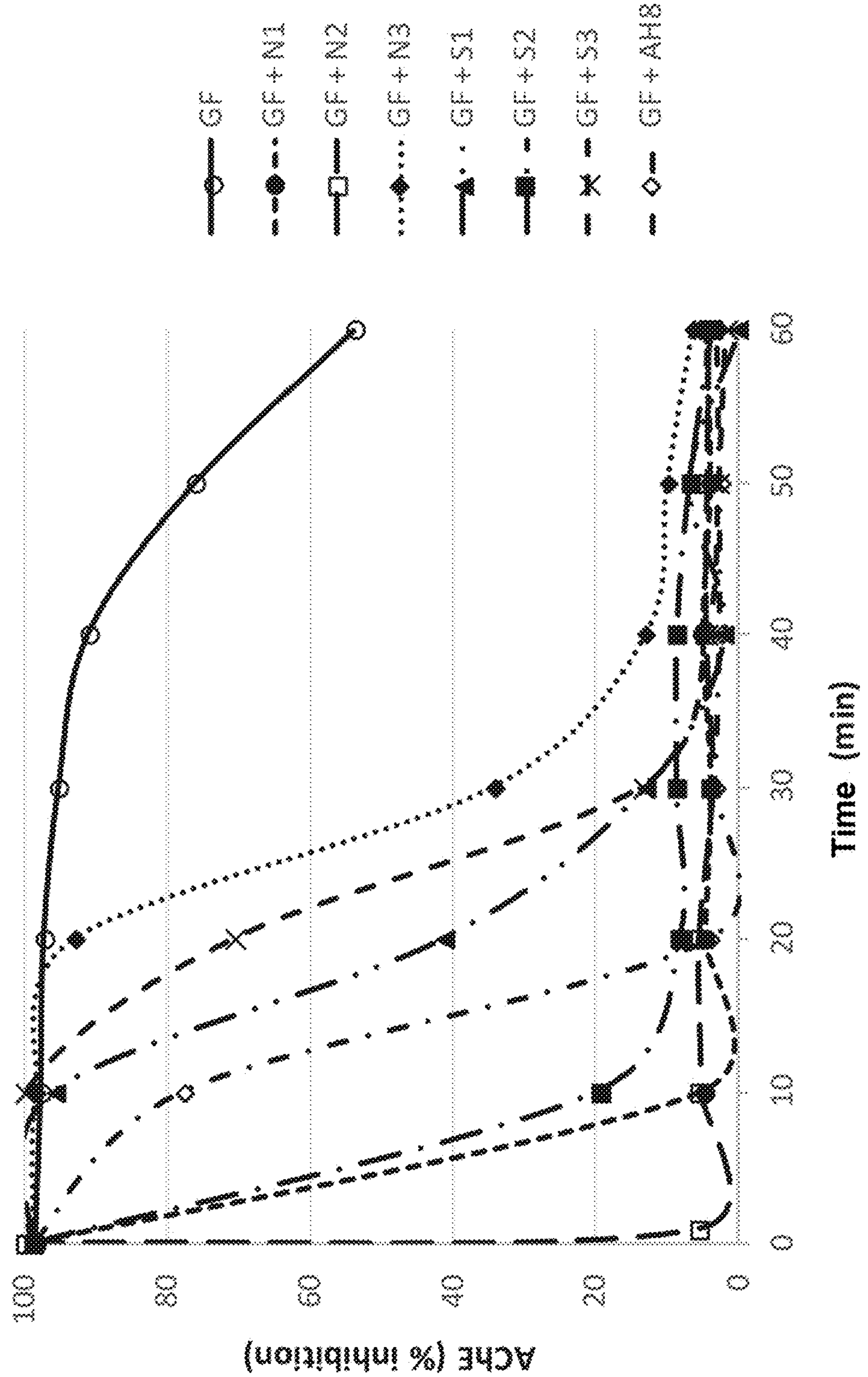
FIG. 3 shows the relative efficacy of scavengers according to the invention against cyclosarin (GF).

According to FIG. 3, with regard to efficacy against cyclosarin, the derivative N2 provides a 95% reduction in acetylcholinesterase inhibition by cyclosarin after only 1 min of contact. Thus, it has significant catalytic power in degrading cyclosarin. To a lesser extent, the derivatives N1 and S2 have good catalytic activity, because they allow for a 95% decrease in acetylcholinesterase inhibition by cyclosarin after only 10 and 20 min of contact, respectively. AH8 reduces inhibition by cyclosarin by more than 95% after 20 min of contact.

Figure 4:
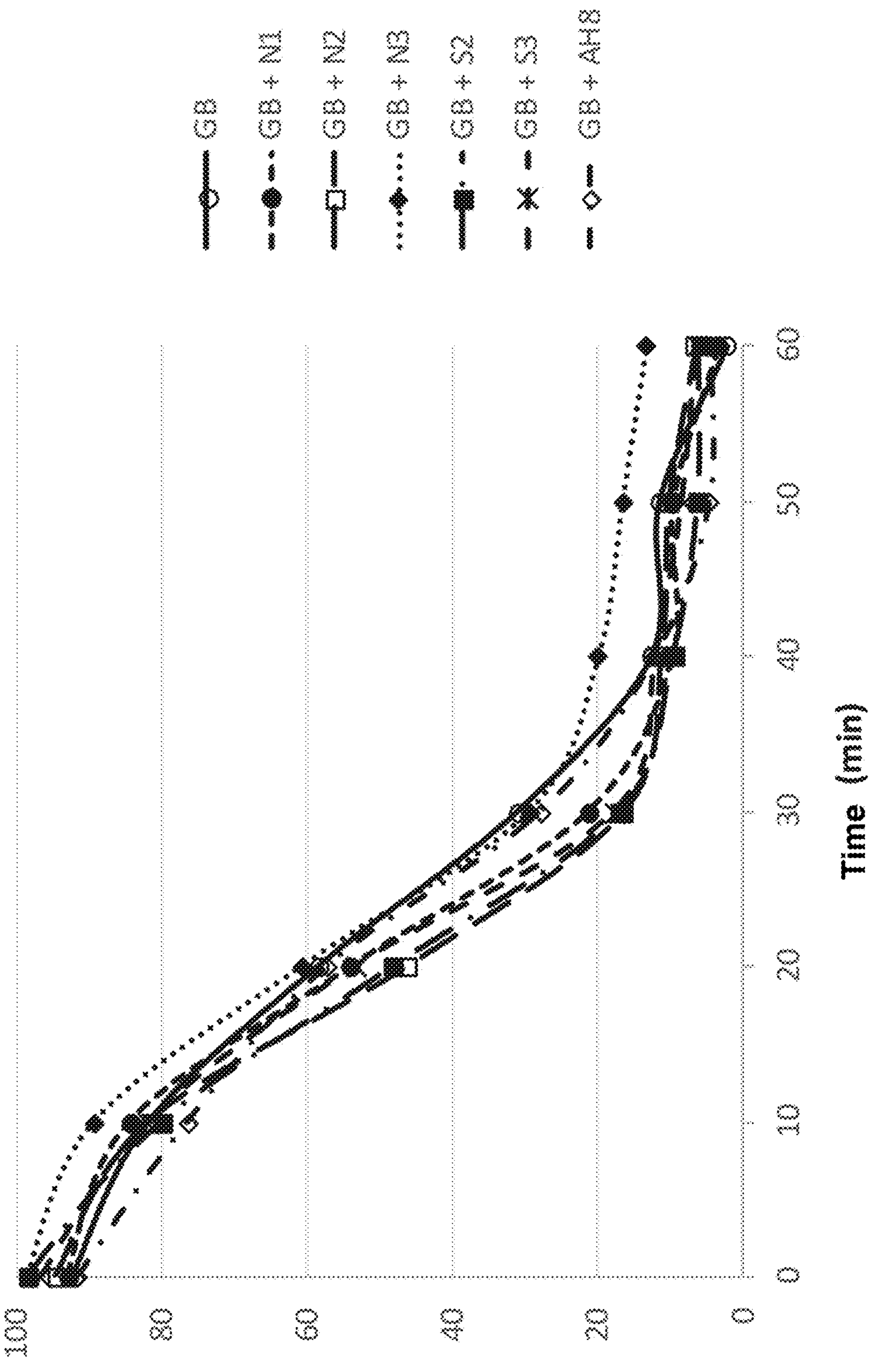
FIG. 4 shows the relative efficacy of scavengers according to the invention against sarin (GB).

According to FIG. 4, with regard to efficacy against sarin, a significant degradation of sarin is observed over the course of the experiment, with 70% of the sarin having disappeared after 30 min of incubation. The kinetics of acetylcholinesterase inhibition by the cyclodextrin derivatives N1-3, S1, S3, and AH8 overlap with the natural breakdown kinetics, and none of the cyclodextrin derivatives appears to have any catalytic activity on sarin.

Figure 5:
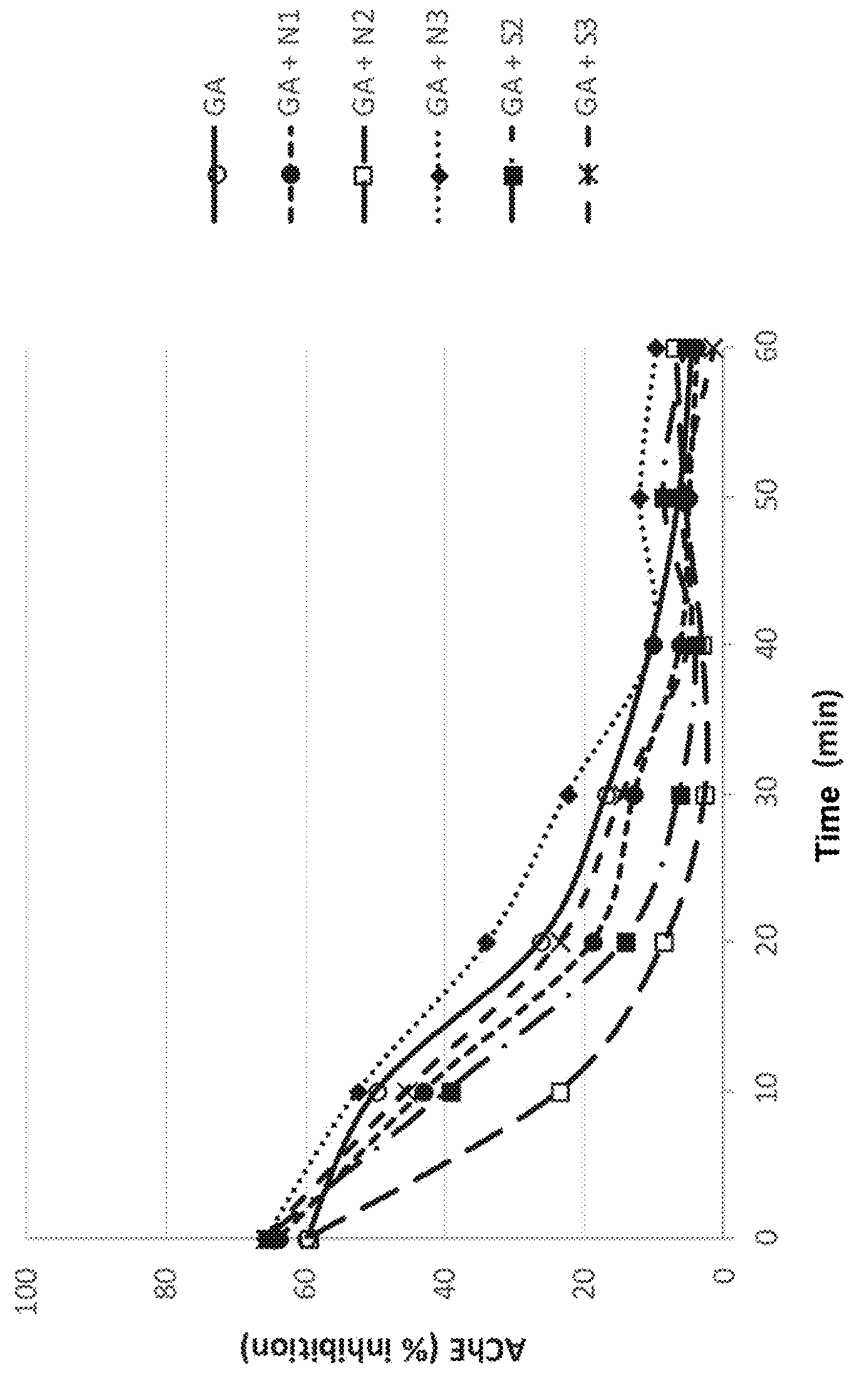
FIG. 5 shows the relative efficacy of scavengers according to the invention against tabun (GA).

According to FIG. 5, with regard to efficacy against tabun, at a concentration of 500 nM, tabun degrades spontaneously, given that, after 1 h of incubation, only 5% remains. Thus, the potential effect of cyclodextrin derivatives is masked by this degradation of the organophosphate neurotoxin. Moreover, the amount of tabun does not appear sufficient to inhibit all of the cholinesterases, because only an inhibition rate of 60% is initially observed.

Figure 6:
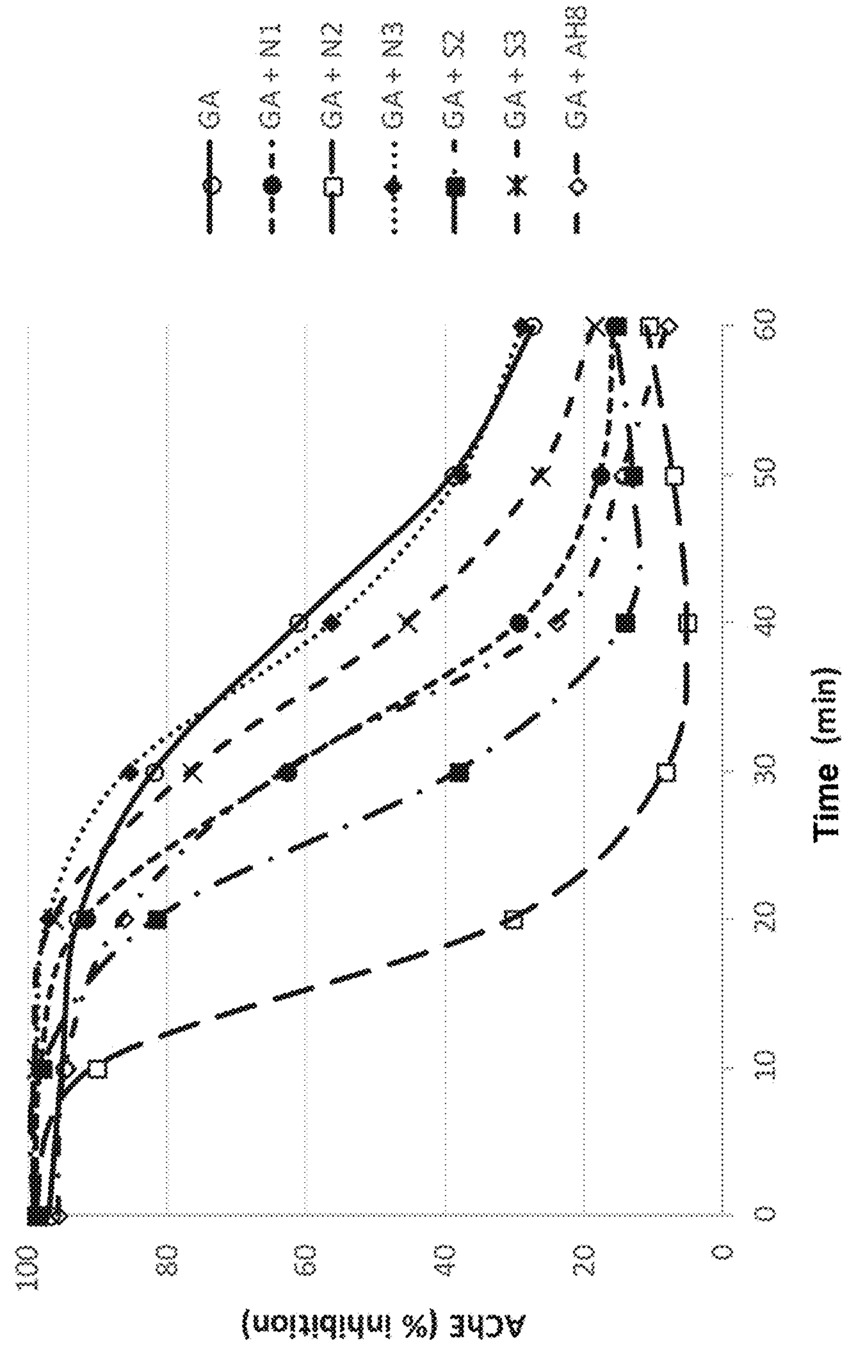
FIG. 6 shows the relative efficacy of scavengers according to the invention against tabun (GA).
Figure 7:
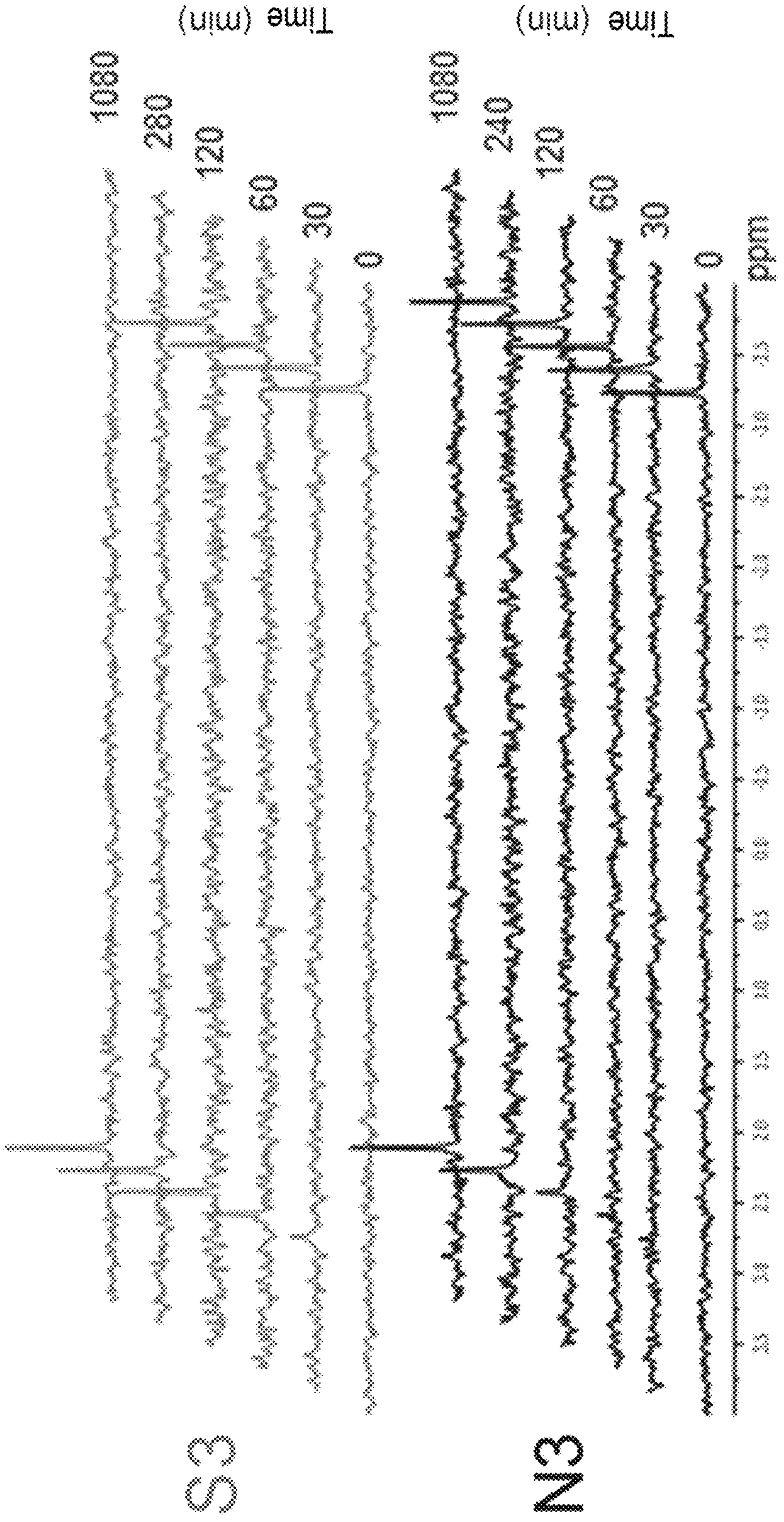
FIG. 7 shows the hydrolysis kinetics of dichlorvos by NMR.

In FIG. 6, the concentration of the toxin was multiplied by 10 (5 µM). Only derivative N3 showed no activity on tabun. Most effective was derivative N2, which reduced acetylcholinesterase inhibition by tabun by 90% after 30 min of contact.

Lastly, derivative N2 has catalytic activity to reduce acetylcholinesterase inhibition by soman, cyclosarin, and tabun, with very rapid action on soman and cyclosarin. Of the compounds tested, it is the most effective derivative. However, derivative N1 remains particularly active against soman and cyclosarin. Compounds N1 and S2 have less activity against tabun, with an advantage for derivative S2. Compound AH8, for its part, is less effective than N2 or S2, no matter which toxin was used.

The invention claimed is:

1. A compound having the following formula (I):

(I)

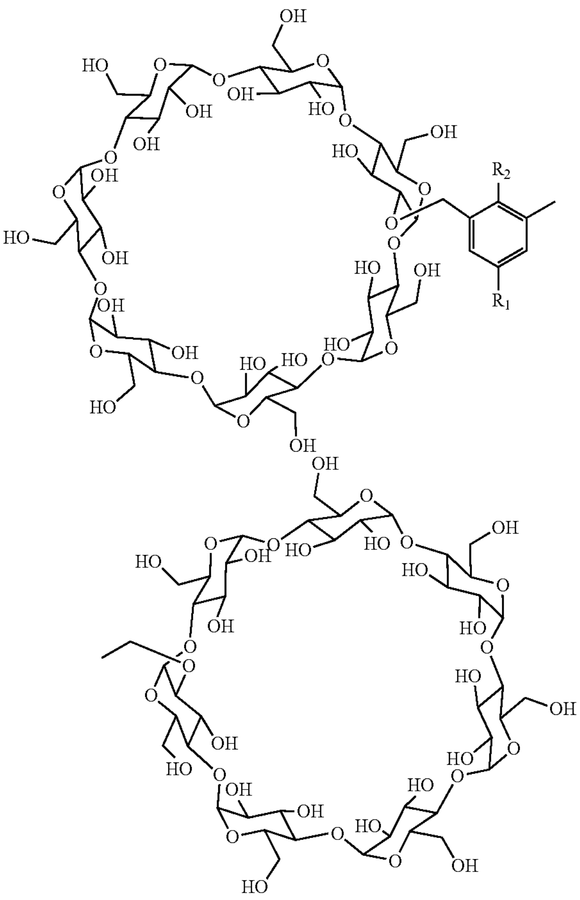

wherein either $R_1$ is a group of the formula —Y-Nu and $R_2$ is H; or $R_1$ is H and $R_2$ is a group of the formula —Y-Nu;

Y is a linker selected from the group consisting of the following groups:

—O—$(CH_2)_m$—, wherein m is 1, 2, or 3;

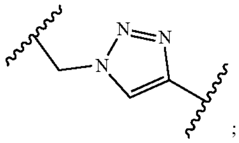 [SMILES: *Cn1cc(*)nn1]

;

—$(CH_2)_p$—NH—C(=O)—$(CH_2)_q$—, wherein p is 0 or 1, and q is 0, 1, or 2;

—CONH—$(CH_2)_r$—, wherein r is 1, 2, or 3;

—O—$(CH_2)_s$—C≡C—$(CH_2)_t$—, wherein s is 1, 2, 3, 4, 5, or 6, and t is 0, 1, 2, or 3;

Nu is selected from the following formulas: formula (II)

(II)

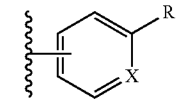

wherein either R is COOH, and X is C—I═O, or formula (I-a):

(I-a)

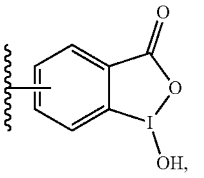

or R is CH═N—OH, and X is N or $N^{+}$—($C_1$-$C_6$) alkyl, or R is CO—NH—OH, and X is N.

2. The compound according to claim 1, wherein Y is the linker having the formula —O—$(CH_2)_m$—, wherein m is 1, 2, or 3, or Y is the linker having the formula —$(CH_2)_p$—NH—C(═O)—$(CH_2)_q$—, wherein p is 0 or 1, and q is 0, 1, or 2.

3. The compound according to claim 1, wherein Nu has the formula (II) according to claim 1, wherein either R is COOH and X is C—I═O, or R is CO—NH—OH and X is N.

4. The compound according to claim 1, wherein $R_1$ is H and $R_2$ is —Y-Nu, wherein Y is the linker having the formula —O—$(CH_2)_m$—, and wherein m is 1, 2, or 3.

5. The compound according to claim 1, wherein $R_1$ is —Y-Nu, wherein Y is the linker having the formula —O—$(CH_2)_m$—, wherein m is 1, 2, or 3, or a linker having the formula —$(CH_2)_p$—NH—C(═O)—$(CH_2)_q$—, wherein p is 0 or 1, q is 0, 1, or 2, and $R_2$ is H.

6. The compound according to claim 1, wherein —Y-Nu has any of the following formulae (III), (IV) (V), or (VI):

(III)

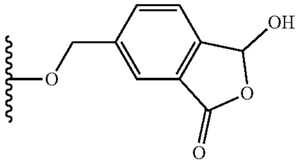

-continued (IV)

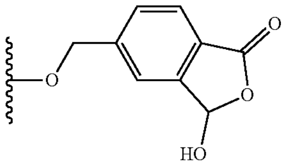

(V)

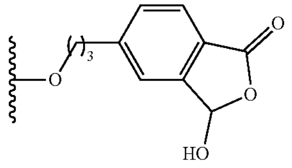

(VI)

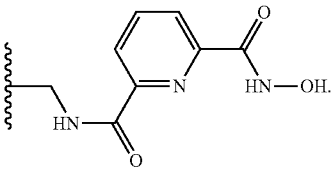

7. The compound according to claim 6, wherein $R_1$ is H, and $R_2$ has any of the formulae (III), (IV), or (V).

8. The compound according to claim 6, wherein $R_1$ has any of the formulae (III), (IV), or (V), and $R_2$ is H.

9. A method for preparing a compound having formula (I) according to claim 1, wherein the method comprises a step of reacting β-cyclodextrin with a reagent having the following formula (VII):

(VII)

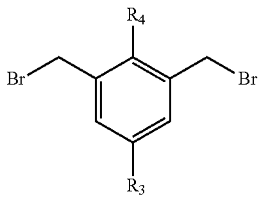

wherein either $R_4$ is H and $R_3$ is selected from the group consisting of —O—$CH_2$—CH═$CH_2$, —$CH_2$—$N_3$, and $COOR_5$, wherein $R_5$ is a ($C_1$-$C_6$)alkyl, trityl, or benzyl group; or $R_4$ is H and $R_3$ is H;

to obtain a compound having the following formula (VIII):

(VIII)
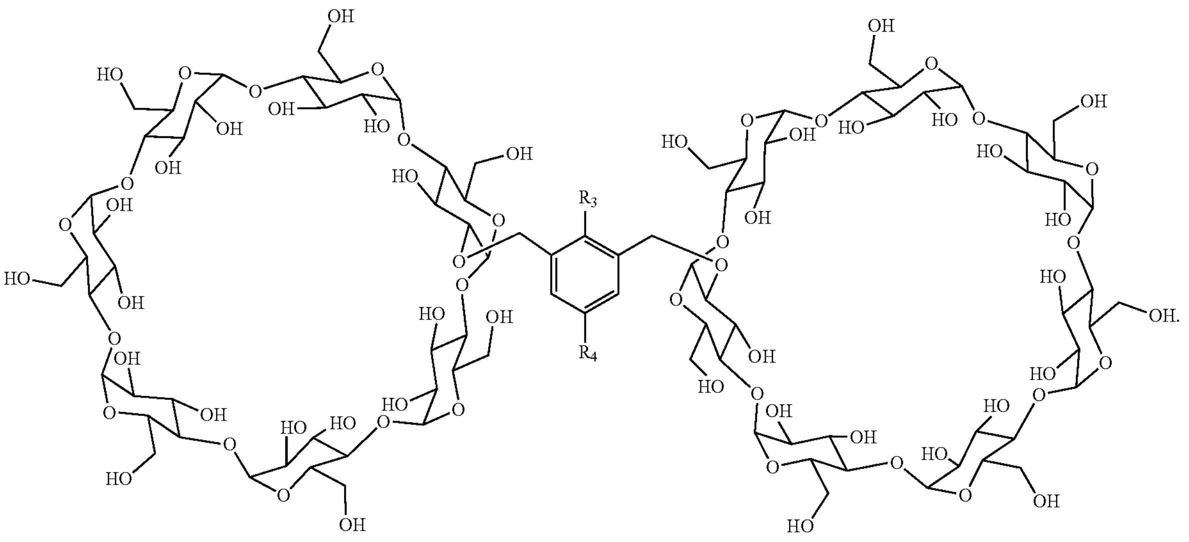
10. A compound having one of the formulae (X):
(X)
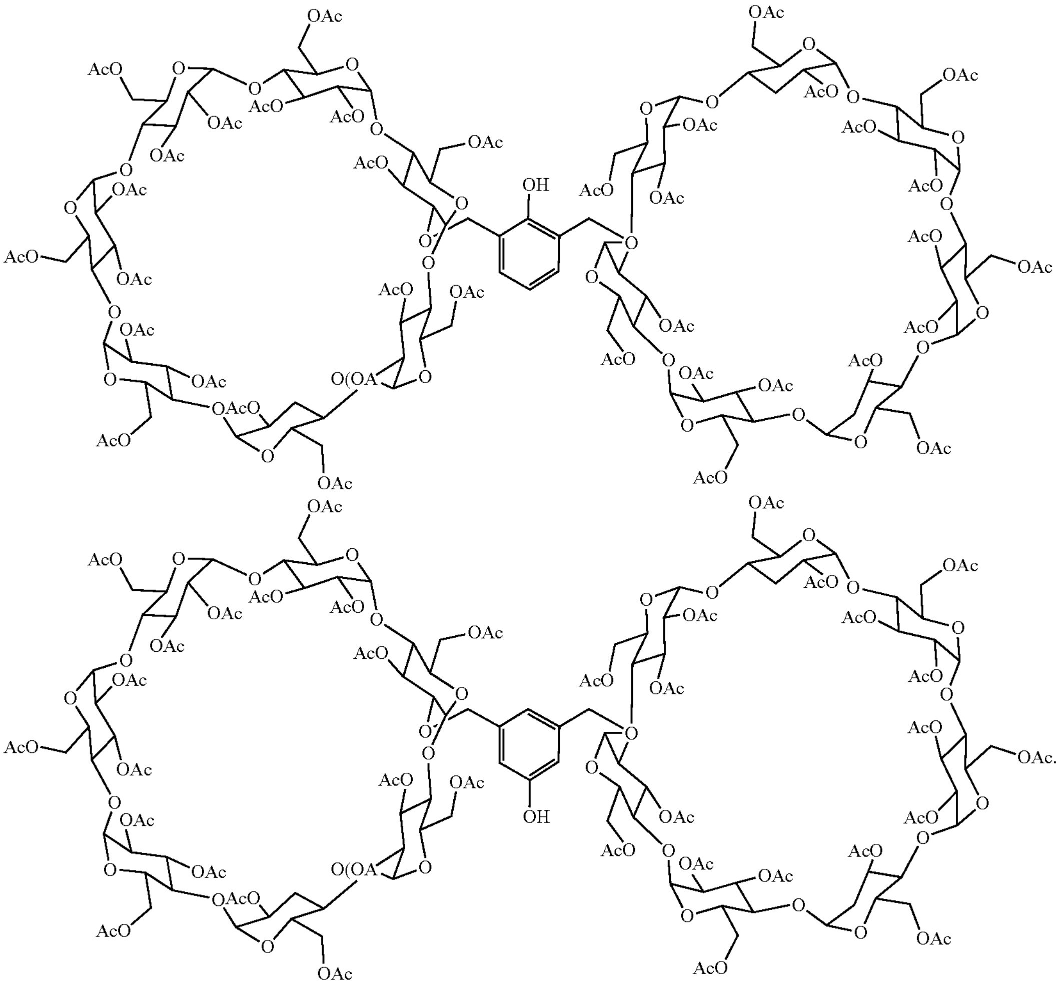

11. A method for decontaminating surfaces of objects, skin, or mucous membranes contaminated by organophosphate neurotoxic agents, comprising applying the compound of formula (I) according to claim 1 as a chemical scavenger onto the surfaces of the objects, the skin, or the mucous membranes.

12. A method for reducing the inhibition of acetylcholinesterase activity by organophosphate neurotoxic agents, comprising contacting the organophosphate neurotoxic agents with the compound of formula (I) according to claim 1.

* * * * *